United States Patent
Bade et al.

(10) Patent No.: US 7,613,599 B2
(45) Date of Patent: Nov. 3, 2009

(54) METHOD AND SYSTEM FOR VIRTUAL PROTOTYPING

(75) Inventors: Stephen L Bade, Lindon, UT (US);
Shay Ben-Chorin, Cupertino, CA (US);
Paul Caamano, San Mateo, CA (US);
Marcelo E Montoreano, Santa Cruz, CA (US); Ani Taggu, Campbell, CA (US); Filip C Theon, San Jose, CA (US); Dean C Wills, Corvallis, OR (US)

(73) Assignee: Synopsys, Inc., Mountain View, CA (US)

( * ) Notice: Subject to any disclaimer, the term of this patent is extended or adjusted under 35 U.S.C. 154(b) by 1747 days.

(21) Appl. No.: 09/872,435

(22) Filed: Jun. 1, 2001

(65) Prior Publication Data
US 2002/0059054 A1 May 16, 2002

Related U.S. Application Data

(60) Provisional application No. 60/208,900, filed on Jun. 2, 2000, provisional application No. 60/230,171, filed on Sep. 1, 2000.

(51) Int. Cl.
*G06F 17/50* (2006.01)

(52) U.S. Cl. .............................. 703/14; 703/15; 703/16; 716/18; 716/4; 716/2; 714/737; 714/734; 714/731; 714/755; 717/160; 717/161; 717/136

(58) Field of Classification Search .................. 716/11, 716/12, 2; 703/20, 22; 714/37, 25, 30; 717/135, 717/140
See application file for complete search history.

(56) References Cited

U.S. PATENT DOCUMENTS 5,197,016 A * 3/1993 Sugimoto et al. .............. 716/8

(Continued)

FOREIGN PATENT DOCUMENTS

EP  0 772 140 A  5/1997

(Continued)

OTHER PUBLICATIONS

Berry, Gérard, *An Implementation of Constructive Synchronous Programs in POLIS* (Nov. 2, 1998), pp. 1-22.

(Continued)

*Primary Examiner*—Kamini S Shah
*Assistant Examiner*—Cuong V Luu
(74) *Attorney, Agent, or Firm*—Bever, Hoffman & Harms, LLP; Jeanette S. Harms

(57) ABSTRACT

An integrated design environment (IDE) is disclosed for forming virtual embedded systems. The IDE includes a design language for forming finite state machine models of hardware components that are coupled to simulators of processor cores, preferably instruction set accurate simulators. A software debugger interface permits a software application to be loaded and executed on the virtual embedded system. A virtual test bench may be coupled to the simulation to serve as a human-machine interface. In one embodiment, the IDE is provided as a web-based service for the evaluation, development and procurement phases of an embedded system project. IP components, such as processor cores, may be evaluated using a virtual embedded system. In one embodiment, a virtual embedded system is used as an executable specification for the procurement of a good or service related to an embedded system.

43 Claims, 65 Drawing Sheets

U.S. PATENT DOCUMENTS

| | | | | |
|---|---|---|---|---|
| 5,548,717 | A * | 8/1996 | Wooldridge et al. | 717/124 |
| 5,870,308 | A * | 2/1999 | Dangelo et al. | 716/18 |
| 5,870,588 | A | 2/1999 | Rompaey et al. | |
| 5,946,474 | A * | 8/1999 | Skogby | 703/13 |
| 5,987,243 | A * | 11/1999 | Aihara | 703/17 |
| 6,052,524 | A | 4/2000 | Pauna | 395/500.43 |
| 6,094,654 | A * | 7/2000 | Van Huben et al. | 707/8 |
| 6,263,302 | B1 * | 7/2001 | Hellestrand et al. | 703/17 |
| 6,760,888 | B2 * | 7/2004 | Killian et al. | 716/1 |
| 2002/0038401 | A1 * | 3/2002 | Zaidi et al. | 710/305 |
| 2002/0138244 | A1 * | 9/2002 | Meyer | 703/14 |
| 2003/0069724 | A1 * | 4/2003 | Schubert et al. | 703/16 |
| 2003/0115564 | A1 * | 6/2003 | Chang et al. | 716/8 |
| 2004/0059678 | A1 * | 3/2004 | Stefik et al. | 705/51 |
| 2004/0226000 | A1 * | 11/2004 | Finch | 717/114 |
| 2004/0250083 | A1 * | 12/2004 | Schwab | 713/182 |
| 2005/0027973 | A1 * | 2/2005 | Barry et al. | 712/233 |
| 2005/0060549 | A1 * | 3/2005 | England et al. | 713/175 |
| 2005/0144641 | A1 * | 6/2005 | Lewis | 725/60 |
| 2005/0193280 | A1 * | 9/2005 | Schubert et al. | 714/47 |
| 2005/0234811 | A1 * | 10/2005 | Herman et al. | 705/37 |
| 2005/0273432 | A1 * | 12/2005 | Stefik et al. | 705/52 |
| 2005/0273433 | A1 * | 12/2005 | Stefik et al. | 705/57 |

FOREIGN PATENT DOCUMENTS

EP  0867 820 A2  9/1998

OTHER PUBLICATIONS

Lavagno, Luciano, *Models of Computation for Embedded System Design*; (Sep. 28, 1998), pp. 1-57.

"*Co-Verification Tools: A Market Focus*"; Daya Nadamuni; Embedded Systems, Programming; Sep. 1999; Miller Freeman, USA; vol. 12, No. 9; XP-001115094; ISSN: 1040-3272; p. 119-122.

"*Target Processor And Co-Verification Environment Independent Adapter-A Technology To Shorten Cycle-Time For Retargeting TI Processor Simulators In HW/SW Co-Verification Environments*"; Rajesh Shah, Ramesh SubbaRa; Software Development Systems, Texas Instruments, India; ASIC/SOC Conference 1999. Proceedings Twelfth Annual IEEE; International Washington, DC USA Sep. 15-18, 1999, Piscataway, NJ, USA, IEEE, US; Sep. 15, 1999; XP010360279A; ISBN: 0-7803-5632-2; pp. 37-41.

"*A Top-Down Hardware/Software Co-Simulation Method For Embedded Systems Based Upon A Component Logical Bus Architecture*"; Mitsuhiro Yasuda, Katsuhiko Seo, Hisao Koizumi, Mitsubishi Electric Corporation, Yokohama 220-81 Japan; Barry Shackleford, Hewlett-Packard Laboratories, Palo Alto, California 94304; Fumio Suzuki, Mitsubishi Electric Corporation, Amagasaki 661 Japan; Design Automation Conference. Proceedings of the ASP-DAC Asia And South Pacific; Feb. 10, 1998; IEEE; XP002169112A; pp. 169-175.

"*Hardware/Software Co-Verification, An IP Vendors Viewpoint*"; Tim Hopes, EDA Engineering Manager, ARM Ltd.; Computer Design: VLSI In Computers And Processors, 1998. ICCD '98. Proceedings. International Conference on Austin, TX, USA Oct. 5-7, 1998, Los Alamitos, California, USA, IEEE Comput. Soc., U.S.; Oct. 5, 1998, XPO10310269A; ISBN: 0-8186-9099-2; pp. 242-246.

"Datasheet: EnWave Digital Communications Design System," Cadence Design Systems, Inc., 1997, 5 pages.

"Datasheet: Interactive Simulation Library," Cadence Design Systems, Inc., 1997, 3 pages.

"Datasheet: Signal Processing Workstation with Convergence Simulation Architecture," Cadence Design Systems, Inc., 1997, 10 pages.

* cited by examiner

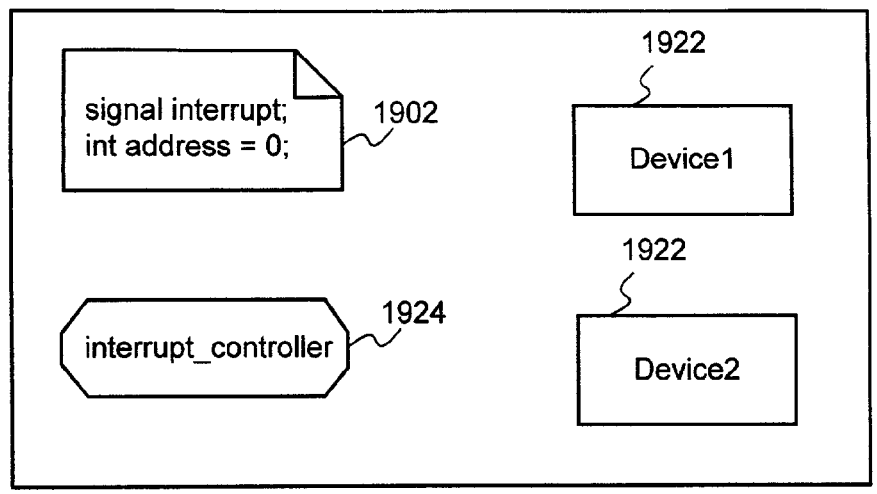
Fig. 16
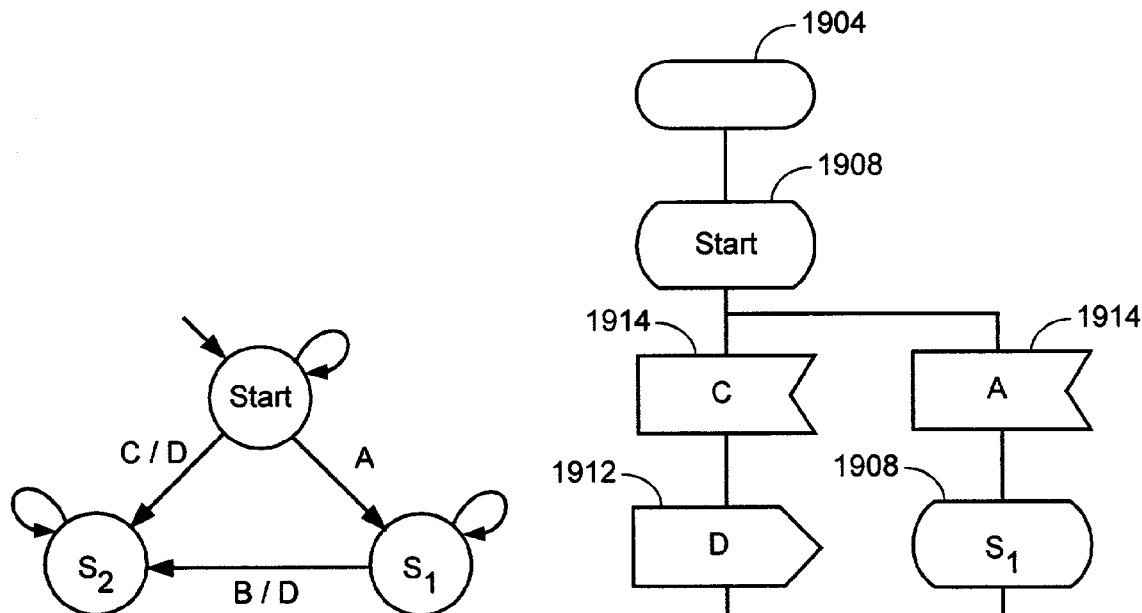
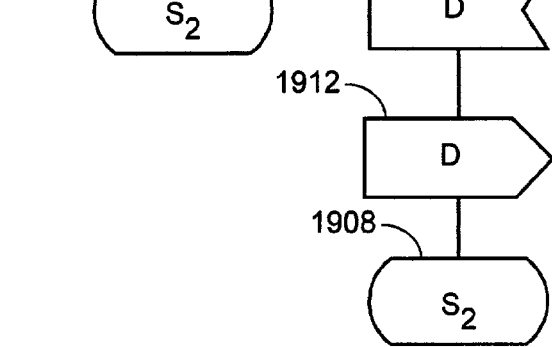
Fig. 17(a)
Fig. 17(b)

| Name | Graphical Symbol | Description |
|---|---|---|
| Declaration | int i; | defines local variables and signals. |
| Start | ◯ | Starting point of the Finite State Machine execution at initialization time |
| Task | i = x * 2 + 10; | Execution block, containing ANSI-C statements to be executed |
| State | ready | Location where FSM waits in until a triggering signal is received. |
| Decision | x > 0 | Directs execution flow based on the result of expression evaluation inside the decision construct. |
| Signal-Out | sig1 | Sending of a communication signal (with an optional payload) |
| Signal-In | sig1 | Receiving of a communication signal (with an optional payload) |
| Connector | conn1 | Allows to split designs over multiple pages, and connects the control flow between these different pages. |

| | | | |
|---|---|---|---|
| 1920 | Symbol | sym1<br>○─┤in1  out1├─○<br>sym1_1<br>○─┤in1  out2├─○ | Captures design hierarchy and structure. Communication is done through pins on the outline of the symbol. Allows to re-use functional behavior by supporting multiple instances |
| 1922 | Blocks | blk1 | Captures design hierarchy and structure. Communication is done through signals declared at higher scopes. Communication is done by signal name matching (rather than pin connection). A block can contain multiple processes. |
| 1924 | Process | a | Acts as leaf node in the design hierarchy, and captures a single FSM. By definition, all processes are concurrent at all times. |

Fig. 19B

Standard Toolbar

Message Window, Showing Different Message Tabs, and the Status Bar

| Name | Value |
|---|---|
| CPU | AmCPU |
| ┆----Speed | 100Mhz |
| ⊟---Events: CPU -> Simulation | |
| ┆  ┆---RESET Signal | Rest |
| ┆  └---BUS_ACK Signal | Bus_ack |
| ⊟---Events: Simulation -> CPU | |
| ┆  ┆---BUS_RQ | Bus_RQ |
| ┆  ⊟---Interrupt Support | Yes |
| ┆      ┆---FIRQ Signal | FIQ |
| ┆      └---IRQ Signal | IRQ |
| ⊟-----BUS | Memory |
| ┆-- Speed | 100Mhz |
| ┆-- Width | 4 |
| ┆-- Read Data Signal | Read_data |
| ⊟--Write Timing | Variable |
| ┆    └---Write Ack Signal | Write_Ack |
| ⊟--Range | Counter |
| ┆--- Type | Slave |
| ┆-- Start | CNT_START_ADDR |
| ┆-- End | CNT_END_ADDR |
| ┆-- Access Width | 4 |
| ┆-- Read Rq Signal | CNT_RD |
| └-- Write Rq Signal | CNT_WR |

Fig. 40

|  Clock_1 | Scope Name |
|---|---|
|  clk(int) | Signal name and declaration |
|  t | Timer or clock name and declaration |
|---|---|
|  clk | Local name of a signal coming from the upper scope (inherited) |
|  myClk | Timer or clock is being set |
|  | Signal is being sent |
|  | Signal is being received |
|  | Signal is being saved |
Fig. 45

Integrator Lab Screen Snap Shots - On-Line Enablement

Integrator Lab

| Design Name | Creation Date | Last Edit Date | Description | Delete Project |
|---|---|---|---|---|
| test | 02-May-01 | 29-May-01 | test | Delete |
| pcnetlink | 04-May-01 | 25-May-01 | asdasd | Delete |
| clonetutorial | 23-May-01 | 23-May-01 | testing cloning of build77 | Delete |
| clonehanoi | 25-Apr-01 | 31-May-01 | cloning hanoi | Delete |
| cloneatlas | 25-Apr-01 | 29-May-01 | cloning atlas | Delete |

New Design

My Invitees

Fig. 50

METHOD AND SYSTEM FOR VIRTUAL PROTOTYPING

This application claims priority from U.S. Provisional Application No. 60/208,900, entitled "Method and System For Online Virtual Prototyping," filed Jun. 2, 2000, and U.S. Provisional Application No. 60/230,171, entitled "Method and System For Online Virtual Prototyping With Walkthrough Function," filed Sep. 1, 2000. The entire contents of U.S. Provisional Application Nos. 60/230,171 and 60/208, 900 are hereby incorporated by reference in their entirety.

BACKGROUND OF THE INVENTION

1. Field of the Invention

The present invention relates generally to computer implemented electronic design automation techniques to evaluate, design, and simulate embedded systems. More particularly, the present invention is directed towards the use of computer implemented techniques for the evaluation of Intellectual Property components used in embedded systems, the design of embedded systems, and the procurement of goods and services related to an embedded system.

2. Description of Background Art

There is increasing interest in embedded systems. An embedded system is a specialized computer system that is typically part of a larger system or machine. An embedded system requiring custom software is also sometimes described as a "platform." Embedded systems are used in industrial control systems, consumer products (e.g., mobile phones and computer game consoles), and telecommunication systems.

An embedded system may include its own operating system or, in some cases, a single computer program. An embedded system commonly includes one or more microprocessors, peripheral hardware to perform input/output functions, and several software layers (e.g., device drivers, middleware, or applications). An embedded system having all of the hardware and software residing on a single chip is sometimes called a system on a chip (SOC). However, an embedded system can also be implemented as one or more printed circuit boards with the hardware components implemented as discrete integrated circuit chips.

Embedded system design includes the design of both hardware and software that must work together in the final product. Typically, the task of designing an embedded system is divided into the separate but complementary tasks of designing the hardware and the software, what is called the "hardware partition" and the "software partition." The design of the hardware partition is facilitated by using as many commercially available hardware components as practical. In particular, the design of an embedded system is increasingly characterized by the use of pre-designed intellectual property (IP) components. An IP component (sometimes also known as an "IP block") is commonly used to describe a component of an embedded system that is licensed to others as intellectual property. However, the term IP component is also sometimes used by engineers to describe a portion of an embedded system that is available from others. For example, a variety of companies license designs for a processor core. Thus, an embedded system designer may select a processor core suitable for an intended application and then design the remaining hardware (e.g., peripherals and buses) to implement the hardware portion. It is common for at least one portion of the hardware to be customized for a particular project. The software partition of an embedded systems project may use portions of software applications from other projects. However, typically a significant amount of code must be written for the software partition of a particular project.

FIG. 1 illustrates an exemplary embedded system design project 100 that may be divided into sequence of project phases. Exemplary times common for each phase are included on the left-hand side of the illustration. In a requirement definition phase 102, a set of requirements 104 is developed for a product idea 101. Key IP components must then be evaluated for possible use in the embedded system. Because of the nature of embedded system design, documentation alone is typically insufficient to understand how an IP component, such as a processor core, will function with a software application running user code. Consequently, the initial evaluation phase 106 may last up to several months in order to have sufficient time to identify useful IP components and to physically test the operation of software in a working test platform.

FIG. 2 is a flow chart showing in more detail some of the elements of a conventional evaluation phase 106. For the case of processor cores, this has conventionally involved identifying potential suppliers 202, contacting suppliers to request information 204, ordering and reviewing product information 206, ordering and purchasing an evaluation board 208, receiving the evaluation board, 210, installing the evaluation board 212, installing software development tools 214, customizing the evaluation board 216, running evaluation software on the test board 218, and selecting suppliers 220. Note that the supplier must also commit significant resources to provides services to prepare and send product information 222, receiving orders 224, processing orders 226, and shipping evaluation boards 228. Additionally, support must be provided to users to use the evaluation boards (not shown in FIG. 2). The resources that a vendor must devote also include the resources to design, manufacture, and keep in stock a supply of evaluation boards. In some cases, a significant time delay may be involved for a vendor to arrange for evaluation boards having custom silicon and printed circuit boards to be designed and manufactured. Moreover, each evaluation board may have a significant cost (e.g., thousands of dollars) such that a vendor will only maintain in stock a limited number of evaluation boards at any one moment of time. Consequently, in some cases embedded system designers may have to wait substantial periods of time to obtain an evaluation board.

From the standpoint of the embedded system designer, the evaluation phase 106 is a time consuming and costly process, particularly if a significant number of IP blocks from different vendors are to be evaluated. Conventionally, evaluating IP blocks from different vendors requires evaluating the operation of separate evaluation boards for each IP block. In addition to being a time consuming process, each IP block can be evaluated only in isolation, which can make it difficult to determine how several IP blocks would interact together in a single embedded system. From the perspective of the IP vendor this is a costly marketing tool that requires IP vendors to invest in creating standard test board platforms (e.g., boards including reference peripheral devices and driver applications). The cost to the IP vendor includes the cost of the evaluation boards and the support services that must be provided for potential customers to successfully evaluate each board.

After key IP components are selected, a development phase 110 begins, which commonly lasts 3-9 months. The development phase 110 commonly begins by defining the architecture 108 of the embedded system, with the system architecture including, for example, the processor(s) to be used, hardware peripherals, and user interfaces. The hardware architecture may be used to form an initial partition of the hardware and software. Conventionally, hardware development 112 proceeds faster than software development 114 because software developers need a hardware implementation to develop some types of software.

FIG. 3 is a flow chart showing in more detail some of the aspects of the development phase 110. After the system architecture is defined 108, specification documents 302 for both the hardware and the software partition are created. The hardware development begins by developing hardware components 304. Software engineers may use an evaluation board to develop some of the software application layers 352 but cannot start developing certain types of software (e.g., middleware and device drivers) until a hardware emulation prototype 308 is available. Other steps common in the subsequent hardware and software development are indicated on FIG. 3. Typically, the hardware must reach a high level of implementation detail before a hardware emulator having sufficient speed may be developed 306 for continued software development 354 (e.g., middleware, device drivers) to proceed. The hardware partition is commonly emulated using hardware emulation boards and hardware acceleration boxes, which feature a combination of re-programmable hardware, typically in the form of Field Programmable Gate Arrays (FPGA), and plugable modules/boards containing the processor(s) that will emulate the hardware partition.

Hardware emulators are commonly a factor of 100 or more slower than the final physical system but provide sufficient speed to debug software. Unfortunately it may take up to two-thirds of the development cycle before the hardware implementation reaches a high level of implementation detail and a physical hardware emulator 308 is configured. This means that feedback 356 to refine hardware components 310 comes later than desired. Moreover, early software integration 358 must wait until hardware components have been fabricated 312 and a PCB prototype designed 314 and fabricated 316. After the results of the early PCB prototype 360, hardware development proceeds 318, 320, 322, and 324 towards a final PCB prototype upon which final software integration and testing 360 may be performed. Note that FIG. 3 assumes that hardware emulator is used. However, a conventional hardware emulator is comparatively expensive. In some embedded system projects a hardware emulator (e.g., a FPGA hardware emulator) may not be cost effective such that much of the software development and integration must wait until a physical prototype is available.

Referring again to FIG. 1, note that the procurement of many goods or services required for the manufacture of an embedded system often must wait until a tested prototype 120 is available after a quality assurance and testing phase 118. Procurement significantly earlier than the tested prototype stage 120 is typically impractical because there is an insufficient quantity and quality of documentation prior to the tested prototype stage that would permit procurement needs to be adequately communicated with vendors. The procurement phase 122 may include purchasing components, PCB boards, IP licenses, and arranging for semiconductor fabrication of custom silicon chips required for a manufacturing and assembly phase 126 to produce a final product 128 on a pre-product definition 124.

Embedded systems designers are under increasing pressure to reduce the time to market and to increase the software functionality of embedded systems, which in turn tends to increase the complexity of embedded system software. Embedded system design projects would be facilitated if there were a computer aided design tool that permitted the efficient selection of a processor core or other IP components, facilitated the co-design of both the hardware and software partition, and facilitated the procurement of IP components and other necessary services. However, conventional automated design tools have serious shortcomings that limit their usefulness in the design cycle, particularly for embedded systems executing complex software applications. Moreover, conventional automated design tools also have shortcomings in speed, user-friendliness, and security that have hindered the development of web-based design tools.

One drawback of conventional electronic design approaches for embedded systems is that they are hardware-centric and typically have an execution speed that is too slow for the simulation to serve as a hardware emulator for the purposes of debugging software. For example, one conventional electronic design method is to use a hardware definition language (HDL) to model the hardware partition at the hardware implementation level. However, modeling the hardware implementation in HDL requires that the hardware be extensively developed (e.g., fully detailed) before the software, which can require a significant length of time in the development cycle.

In addition to its other problems, a HDL simulation (e.g., one using a cycle-accurate processor model and a detailed implementation model of hardware) has such a high level of implementation detail that a software application executed on HDL simulation of the hardware partition would be too slow for meaningful software debugging during a typical development phase. As one example, a software application running on virtual hardware needs a comparatively high execution speed to detect deadlocked situations between multiple on-chip processors. As another example, a software application running on virtual hardware needs a comparatively high execution speed to perform a booting test of a full-fledge operating system (OS) on the hardware being designed. However, HDL models typically execute at too slow a speed to permit a software designer to evaluate the system aspects in which a software designer is interested.

A further drawback of HDL models is that it is often impractical to share them with third parties that are not legally bound to maintain the confidentiality of the model. An HDL description of an embedded system includes implementation details required to fabricate an end product. HDL models have such a high level of implementation detail that companies are reluctant to share HDL models with other companies for fear of losing valuable proprietary trade secrets. As one consequence, IP vendors typically do not provide HDL models of their products for evaluation. Another consequence is that embedded system designers and IP vendors typically do not make HDL models of IP components and sub-systems available on the Internet.

The problems associated with conventional embedded system design projects can be anticipated to become worse as improvements in the processing power of embedded systems permits embedded systems having more complex software applications. This can be expected to increase the need to rapidly and effectively evaluate IP blocks during the evaluation phase, to accelerate the pace of software development during the development cycle, and to improve the procurement of goods and services related to the embedded system project, including the licensing of IP blocks. However, conventional automated design tools do not provide the right level of abstraction, quick model creation, ease of use, execution speed, and understandability to permit substantial improvements in the evaluation, development, and procurement phases of an embedded system design project.

What is desired is a computer-aided system and method for improving the evaluation, development, and procurement phases of an embedded system development project.

SUMMARY OF THE INVENTION

An integrated design environment (IDE) is disclosed for simulating embedded systems. The IDE includes a graphical user interface and a design language for forming finite state machine models of hardware components that are coupled to processor simulators, preferably instruction set accurate simulators of processor cores. In one embodiment, the design language has graphical symbols adapted from the specification design language, is configured to reduce simulation overhead, and also includes features for modeling the signals of hardware elements. A virtual test bench may be coupled to the simulation to serve as a human-machine interface for interacting with the simulation. In one embodiment of virtual test bench, the virtual test bench includes a graphical representation of a user input interface and a graphical representation of an output display. A software debugger permits software to be loaded and executed for the simulation. In a preferred embodiment, the software debugger is adapted to permit at least one binary program code of a software application compiled for a target processor to be loaded by a user and executed on the virtual embedded system. One application of the IDE is to form a virtual embedded system having an execution speed sufficiently high to permit the evaluation of benchmark software executing on the virtual embedded system. In one embodiment, a virtual embedded system emulates the function of a physical evaluation board so that a virtual embedded system may be used to evaluate components of an embedded system, such as a processor core, in an evaluation phase of an embedded system project. Another application of the IDE is to form a virtual prototype of an embedded system having an execution speed sufficiently high to permit the virtual prototype to be used to develop software. In a preferred embodiment, a user may execute production quality embedded system code on the virtual prototype. In one embodiment, a virtual prototype is used during a development phase of an embedded system project to develop software. Still another application of the IDE is to form a virtual prototype that may be used as a design specification. In one embodiment, the virtual prototype is used as design specification to coordinate the actions of hardware and software developers during a development phase of an embedded system project. In another embodiment, the virtual prototype is used as a design specification for the procurement of a good or service related to the embedded system.

The IDE may be hosted on a network server accessible from a client computer. In one embodiment a persistent virtual channel may be formed between the client computer and the network server for executing the IDE on the network server. In one embodiment, a user may use the IDE to create a design and store executable files associated with the design in a design repository. In one embodiment of a collaborative method of designing embedded systems, an administrator may grant access privileges to the design to members of a user group. In one embodiment, designs of embedded systems or sub-systems are stored in a library and made accessible to other users. Additionally, in one embodiment a vendor of a component for an embedded system may design and store executable files of virtual embedded systems for demonstrating the operation of the component in a library coupled to the network server.

In one embodiment, the network server is coupled to the Internet, permitting the IDE to be offered as a web-hosted service. An on-line bulletin board may be coupled to a server for hosting designs. In one embodiment, the on-line bulletin board includes a bidding board for a vendor to access a design published by a designer on the bidding board. In a preferred embodiment, a designer may select the access privileges of vendors to the design. In a preferred embodiment, a vendor may receive a request for quote that includes access privilege to the design.

In one embodiment of a web-based service for providing evaluation services, one or more virtual embedded systems for evaluating components of an embedded system are stored in a library coupled to a web server. Users may select a virtual embedded system, modify the virtual embedded system, and run a simulation of the embedded system. In a preferred embodiment the on-line behavior of users is recorded to form data on the usage of the virtual embedded systems. The usage behavior may be converted into marketing data, such as data on preferred processor cores and hardware peripherals.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 16 shows examples of a block construct having a process, devices, and a declaration constructs.

FIG. 17A shows a conventional finite state machine representation of a hardware peripheral in a transition condition/action format.

FIG. 17B shows the finite state machine of FIG. 17A written using graphical constructs in accord with the present invention.

FIGS. 19A and 19B are a table showing graphical objects of a preferred design language.

FIG. 40 is a detail of a screen shot of of the Processor IO Configurator Wizard.

FIG. 45 is a table of icons for a signal browser.

FIGS. 50-55 are screen shots of an example of an on-line embodiment.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally includes a computer-implemented technique for simulating an embedded system using a graphical integrated development environment (IDE) design application that has features for rapidly creating and evaluating virtual embedded systems (also known as "virtual platforms" or "virtual prototypes" for new designs) and that has a sufficient simulation speed and test features to permit evaluation, development, and debugging of an embedded system software application to be performed with a virtual embedded system.

Figure 4A:
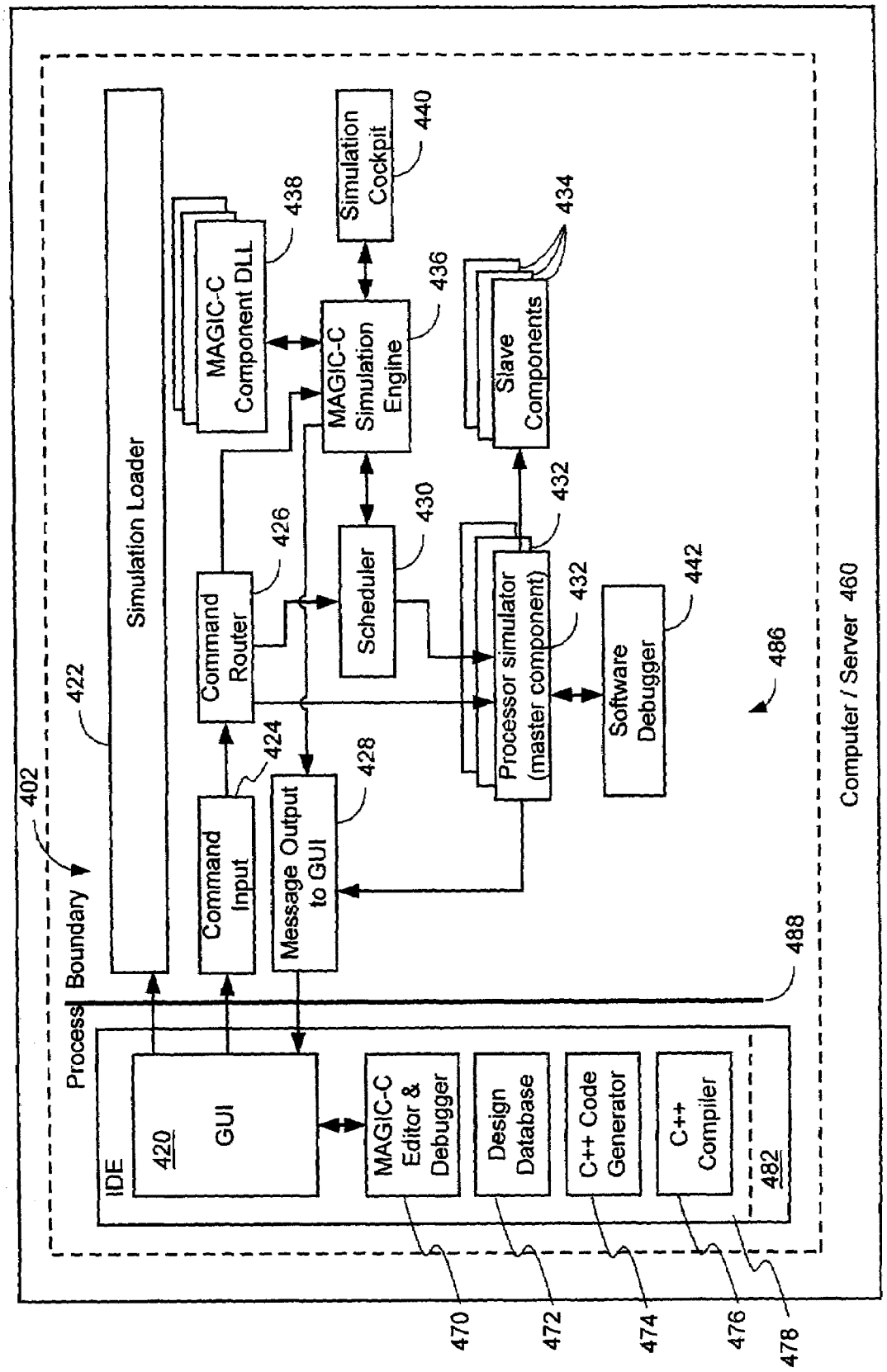
FIG. 4A is a block diagram of major software modules of an integrated design environment (IDE) and FIG. 4B is an illustrative figure of applications for the IDE.

FIG. 4A is a block diagram illustrating major software modules of a preferred embodiment of the IDE 402. Further details on the interfaces coupling the software modules are described below in more detail. The software modules of IDE 402 may reside on a memory 450 of a computer 460 having a computer processor and memory, such as personal computer or computer coupled to a network server. It will also be understood that the IDE 402 may be stored as a software application on a computer readable medium, such as a compact disk.

The IDE 402 may be conceptually divided into a user design portion 482 and a simulation portion 486 that communicate with each other through process boundary 488. IDE 402 preferably includes a graphical user interface (GUI) software module 420 for a user to interact with IDE 402. An editor and debugger module 470, design database module 472, code generator module 474, and compiler module 476 may be coupled to GUI software module 470 as a hardware design and modeling module 478 for forming a description of the hardware partition of an embedded system.

A simulation loader module 422 invokes other IDE modules when a simulation of an embedded system is initiated from GUI module 420. A command input module 424 receives commands from the GUI module 420 and passes them on to a command router module 426, which selects whether the command is routed to a scheduler processor simulator module 432, scheduler module 430, or simulation engine module 436. A message output module 428 communicates messages from the processor simulator module 432 and the simulation engine module 436 to GUI module 420. The scheduler module 430 coordinates the actions of the processor simulator module 432 and the simulation engine 436, providing global execution control for the virtual system. The processor simulator module 432 includes a processor simulator, preferably an instruction set accurate processor simulator, for each processor core in a library of processor cores and is configured to decode an instruction stream residing in a virtual memory. As shown in FIG. 4A, several processor simulator modules 432 may be included to support the simulation of more than one processor core. A processor simulator module 432 may have an associated slave component module 434 such as cache or memory model. The simulation engine module 436 provides simulation services to execute a simulation and is described below in more detail. As described below in more detail, in one embodiment the hardware description may include one or more dynamic link library files. Consequently, in this embodiment, component DLL modules 438 of the hardware description are dynamically loaded by the simulator loader. A simulation cockpit module 440 loads test bench controls and provides a simulation cockpit window for a user to interact with a virtual system.

A software debugger module 442 provides a debugging interface with the processor simulator, allowing the software debugger module to control the execution of the processor simulator and perform other software debugger functions, such as displaying register values. In a preferred embodiment a software debugger permits embedded system software to be loaded for execution on the processor simulator of the virtual embedded system. In one embodiment, the software debugger is adapted to permit a user to load and execute binary program code of a software application compiled for a target processor.

Figure 4B:
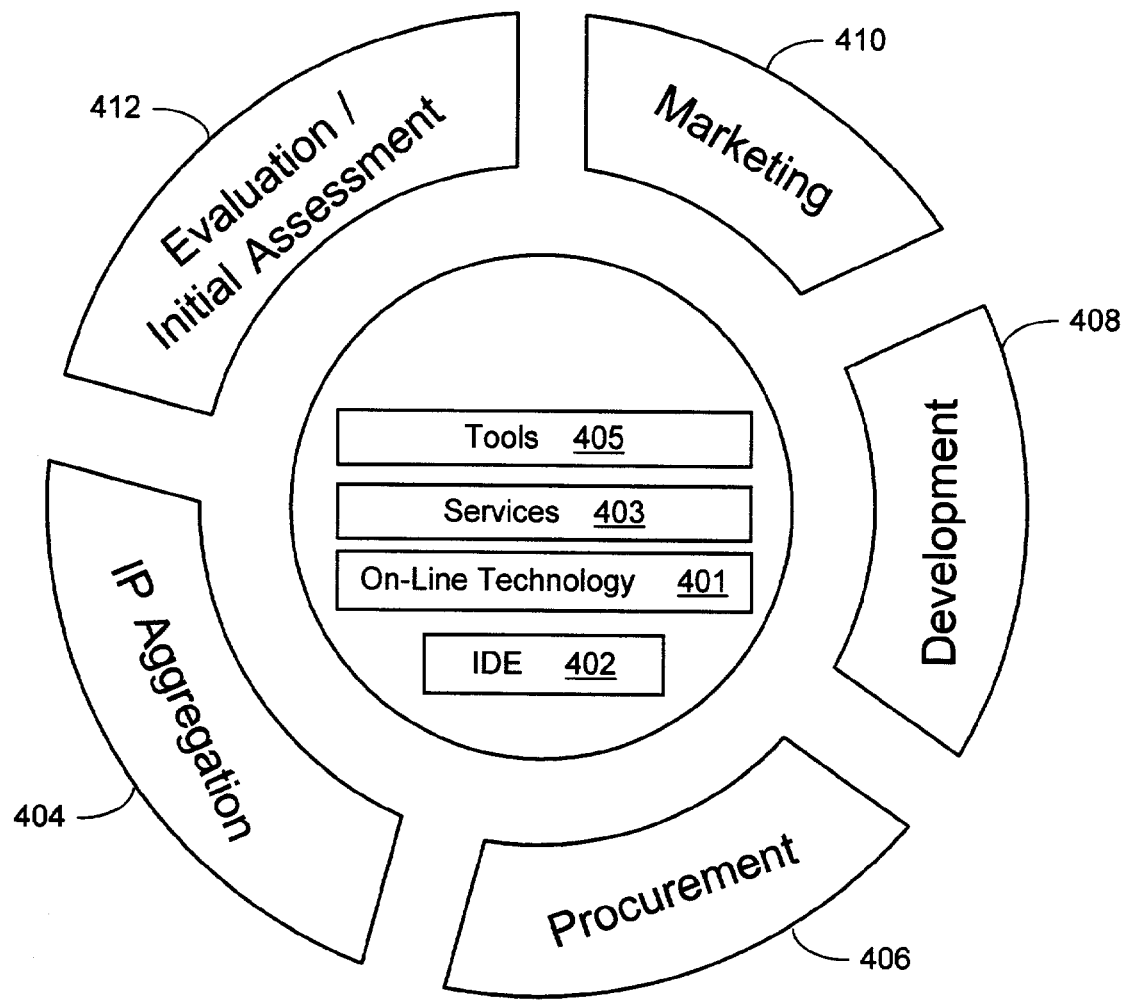

Referring to FIG. 4B, IDE 402 may also be part of a computer system having additional tools 405 and on-line technology 401 to provide a variety of services 403 related to the evaluation, development, and procurement phases of an embedded systems project. As illustrated in FIG. 4B, in one embodiment IDE 402 is used to provide services associated with the evaluation, development, or procurement phases of an embedded system project. These services may include intellectual property aggregation 404, procurement services 406, geographically distributed co-development 408, marketing of goods or services related to embedded systems 410, and evaluation of IP components (e.g., processor cores) 412. In one embodiment the services are offered as a web-based service with the IDE residing on a network server. However, it will be understood that some of the functions of a web-based service may be emulated by exchanging data files using other techniques, such as by shipping executable files on a computer readable medium (e.g., a CD), making executable files available via a file transfer protocol (FTP) technique, or by sending data files via e-mail. Moreover, it will also be understood that the IDE may use to provide one or more services to other types of networks, such as a local area network, wide area network, intranets, or extranets.

FIGS. 5-8 show methods of using the IDE of the present invention in an embedded system design project and FIGS. 9-49 show details of the IDE and its use. The IDE of the present invention has features for rapidly creating virtual embedded systems, which permit the virtual embedded systems to be used to evaluate the operation of an embedded system executing user code loaded onto the virtual embedded system. This permits embedded systems to be designed in new and more efficient ways.

Figure 5:
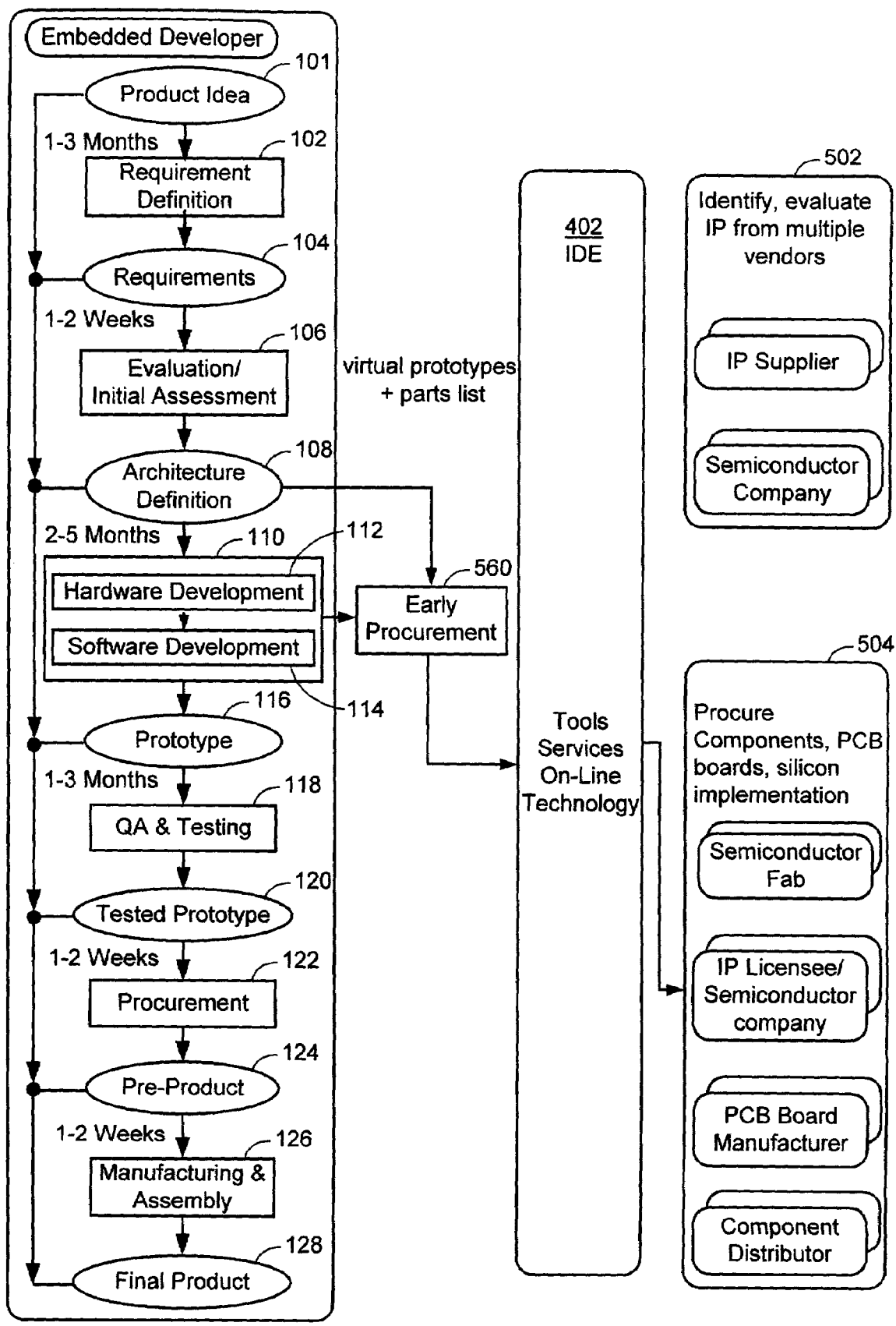
FIG. 5 is a flow chart showing a preferred method of designing an embedded system in accordance with the integrated design environment of the present invention.

FIG. 5 is an illustrative flow chart of showing some of the ways that the IDE 402 of the present invention may be used in an embedded system design project, preferably as part of a web-based service. Illustrative times for the completion of each phase of an embedded system project are shown. As shown in FIG. 5, the evaluation phase 106 of an embedded system project may be improved by using the IDE of the present invention to provide virtual embedded systems ("virtual platforms") for evaluating intellectual property (IP) components 502, preferably as part of a web-based service. This leads to a reduction in the time required for evaluating IP components and/or allows larger numbers of IP components to be evaluated compared to the conventional approach of using physical test evaluation boards. As an illustrative example, an evaluation phase 106 that would conventionally require 1-3 months using physical evaluation test boards may be reduced to about 1-2 weeks using virtual embedded systems to evaluate IP components.

Figure 6:
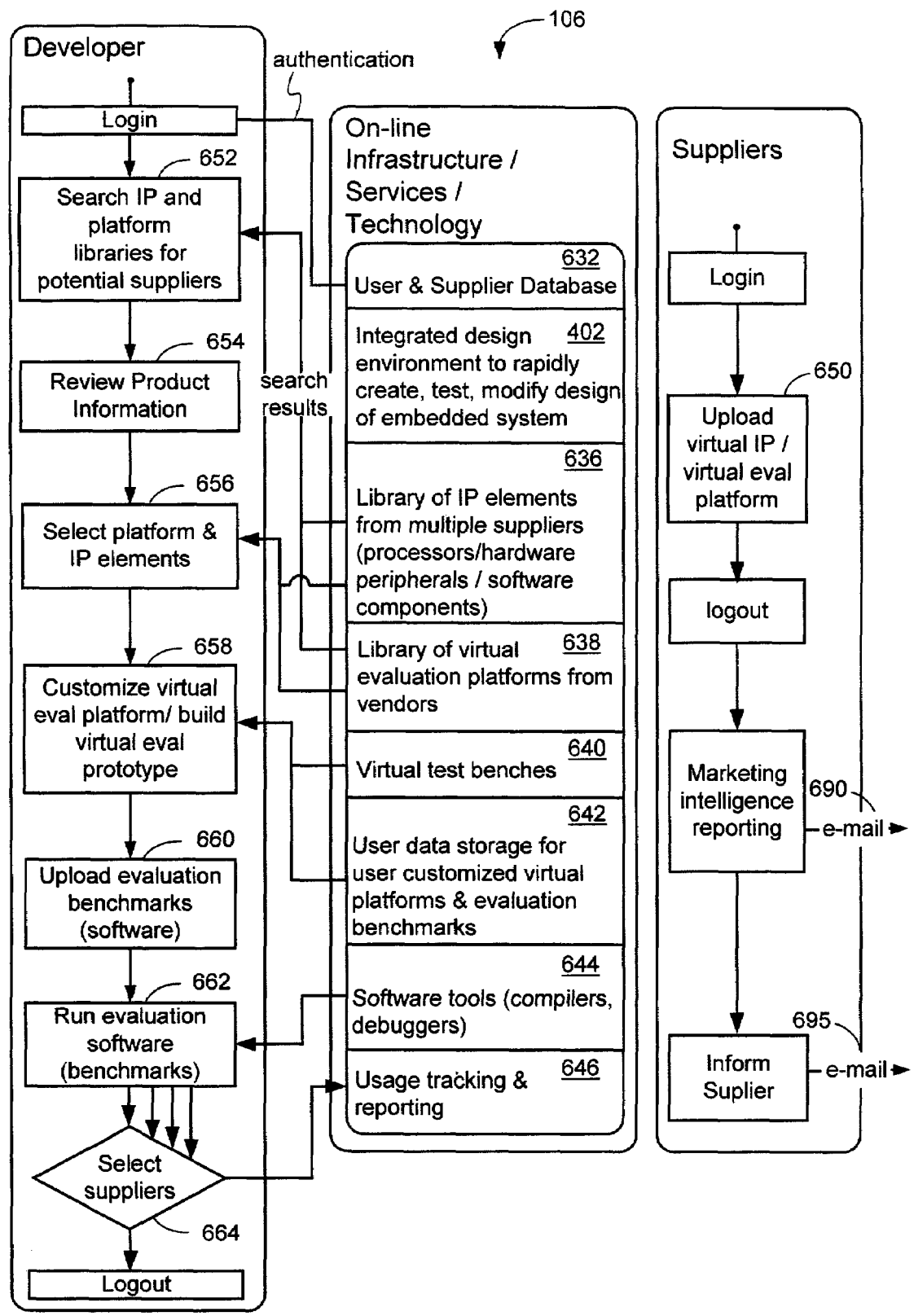
FIG. 6 is a detailed flow chart of a preferred method of evaluating intellectual property for the design method of FIG. 5.

FIG. 6 shows in greater detail some of the aspects of a preferred embodiment for providing an on-line evaluation service. Referring to FIG. 6, in one embodiment of the present invention the IDE 402 may be used during the evaluation phase 106 of an embedded system project to provide a simulation of an embedded system for evaluating IP components 502, such as processor cores. The IDE and associated tools and services may be used to select models of IP components and virtual platforms 636, to customize virtual platforms 638, to load and execute benchmark software on the virtual platforms 642, and to evaluate the operation of the embedded system platform using virtual test benches 640 and debugging tools 644. As described below in more detail particularly in regards to web-based embodiments, the use of virtual prototypes for evaluating IP components provides many benefits in terms of time, cost, and convenience for evaluating IP components compared with the conventional approach of using physical evaluation test boards and physical test hardware to evaluate IP components.

Figure 1:
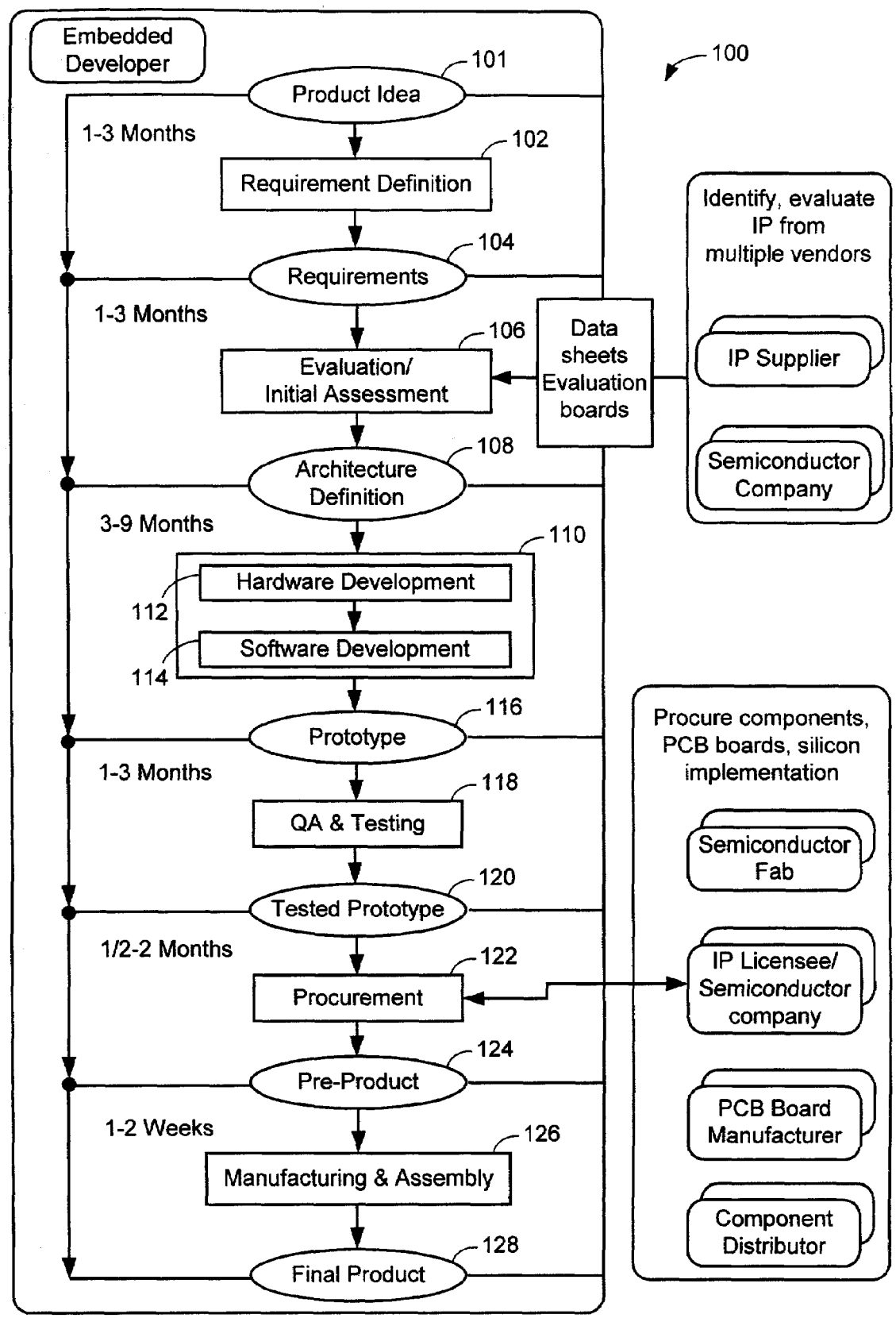
FIG. 1 is a flow chart showing a conventional embedded system design cycle.
Figure 2:
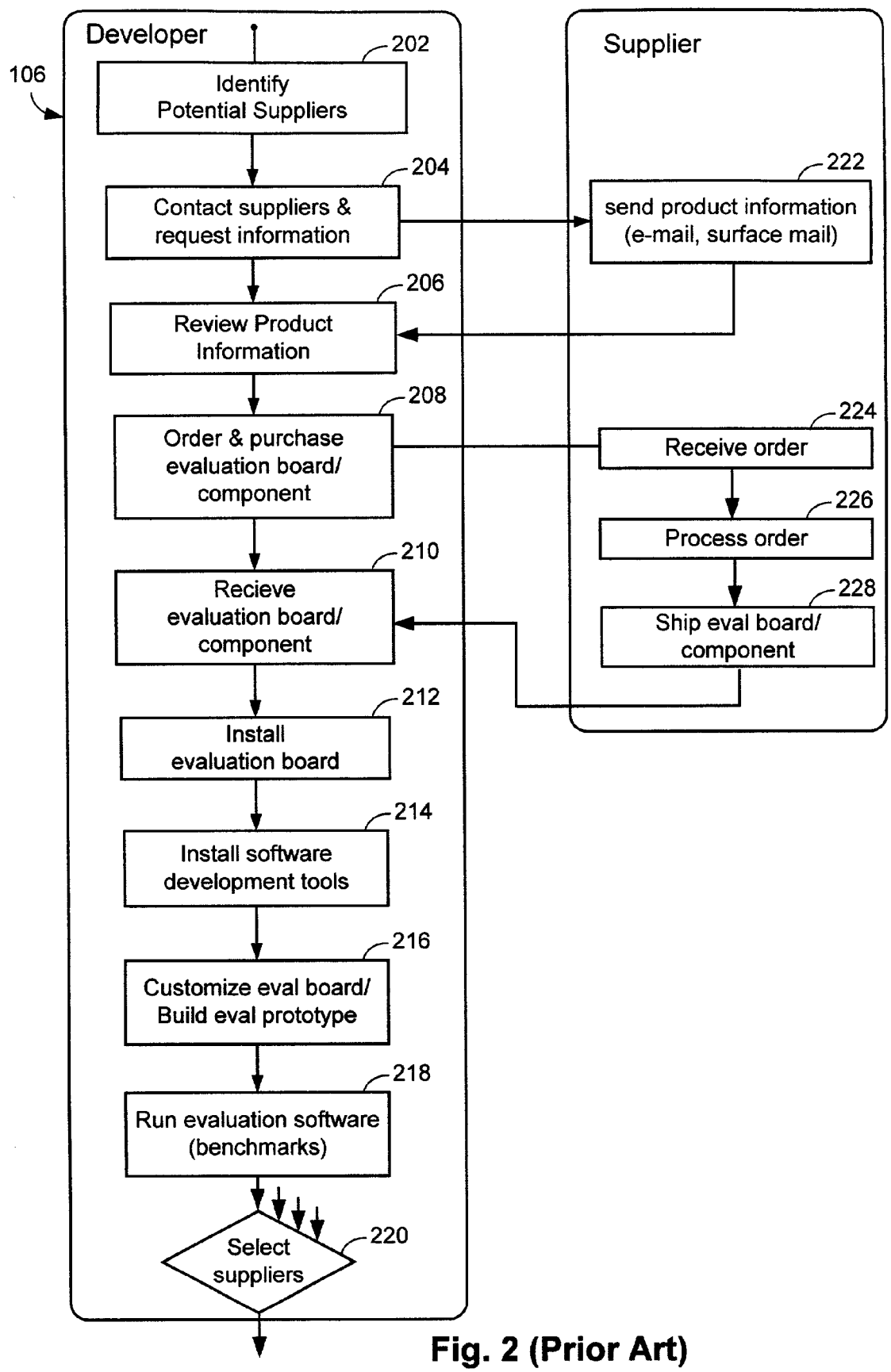
FIG. 2 is flow chart showing in more detail the evaluation phase for the conventional embedded system design cycle of FIG. 1.
Figure 3:
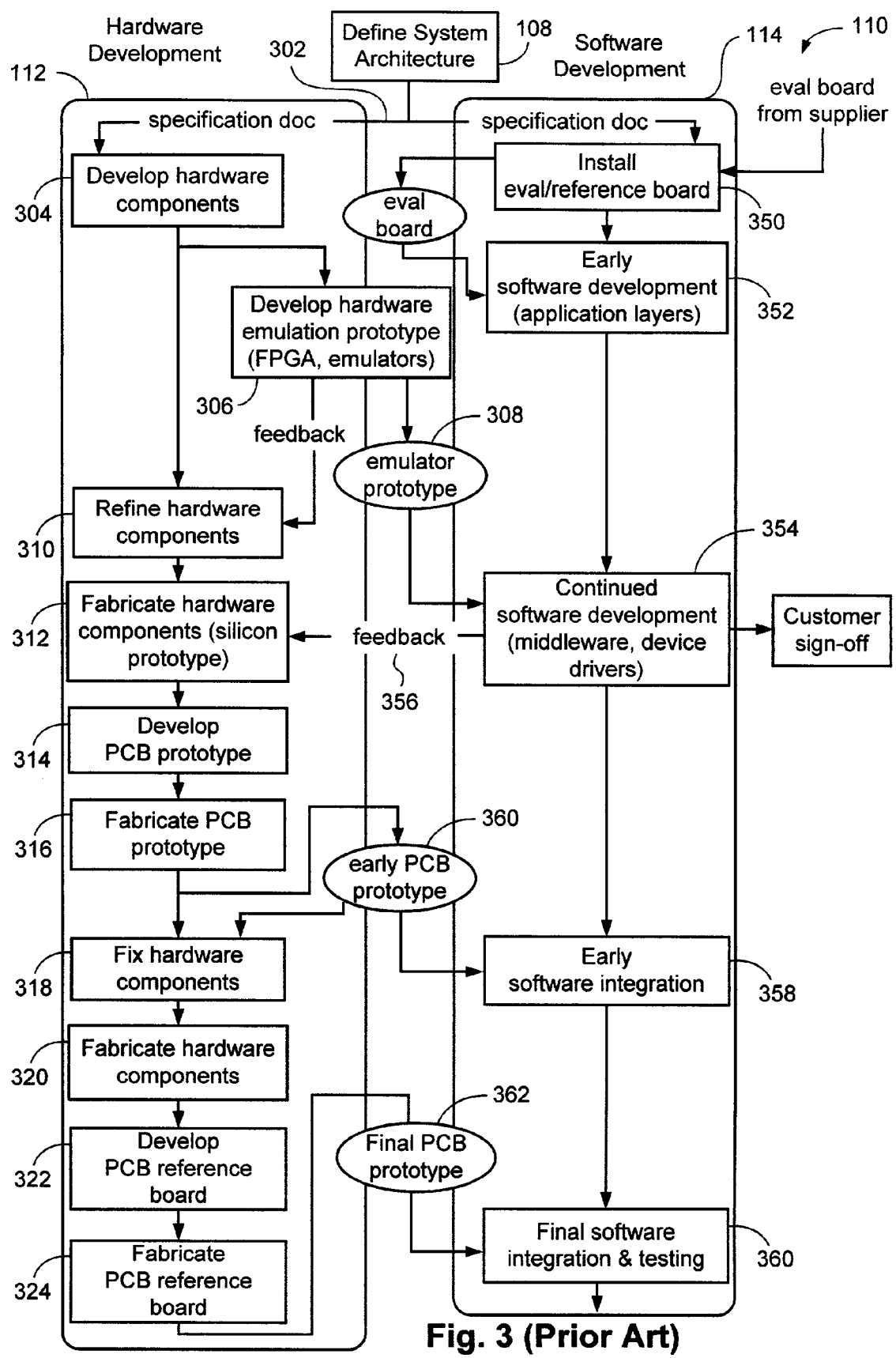
FIG. 3 is a flow chart showing in more detail a conventional hardware/software development phase for the conventional embedded system design cycle of FIG. 1.

Referring again to FIG. 5, the present invention may also be used to form a virtual prototype of an embedded system early in a development phase 110 of an embedded system project. The virtual prototype can be used to evaluate and debug software before hardware implementation details are sufficiently developed to program a conventional FPGA hardware emulator. A conventional FPGA hardware emulator requires substantial hardware implementation details and may also require a significant physical set-up time, which typically makes the FPGA hardware emulator unavailable for software debugging for many months into the development cycle. Consequently, by using a virtual prototype for early software development, significant savings in time and/or improvements in software quality may be achieved. Thus, in the illustrative example of FIG. 5, the present invention permits a reduction of 1-to-4 months in the development time compared with a conventional embedded system project relying upon FPGA hardware emulators such as that shown in FIG. 3. Also, since a conventional FPGA hardware emulator is comparatively expensive, the present invention provides a substantial cost savings compared to a conventional FPGA hardware emulator.

Figure 7:
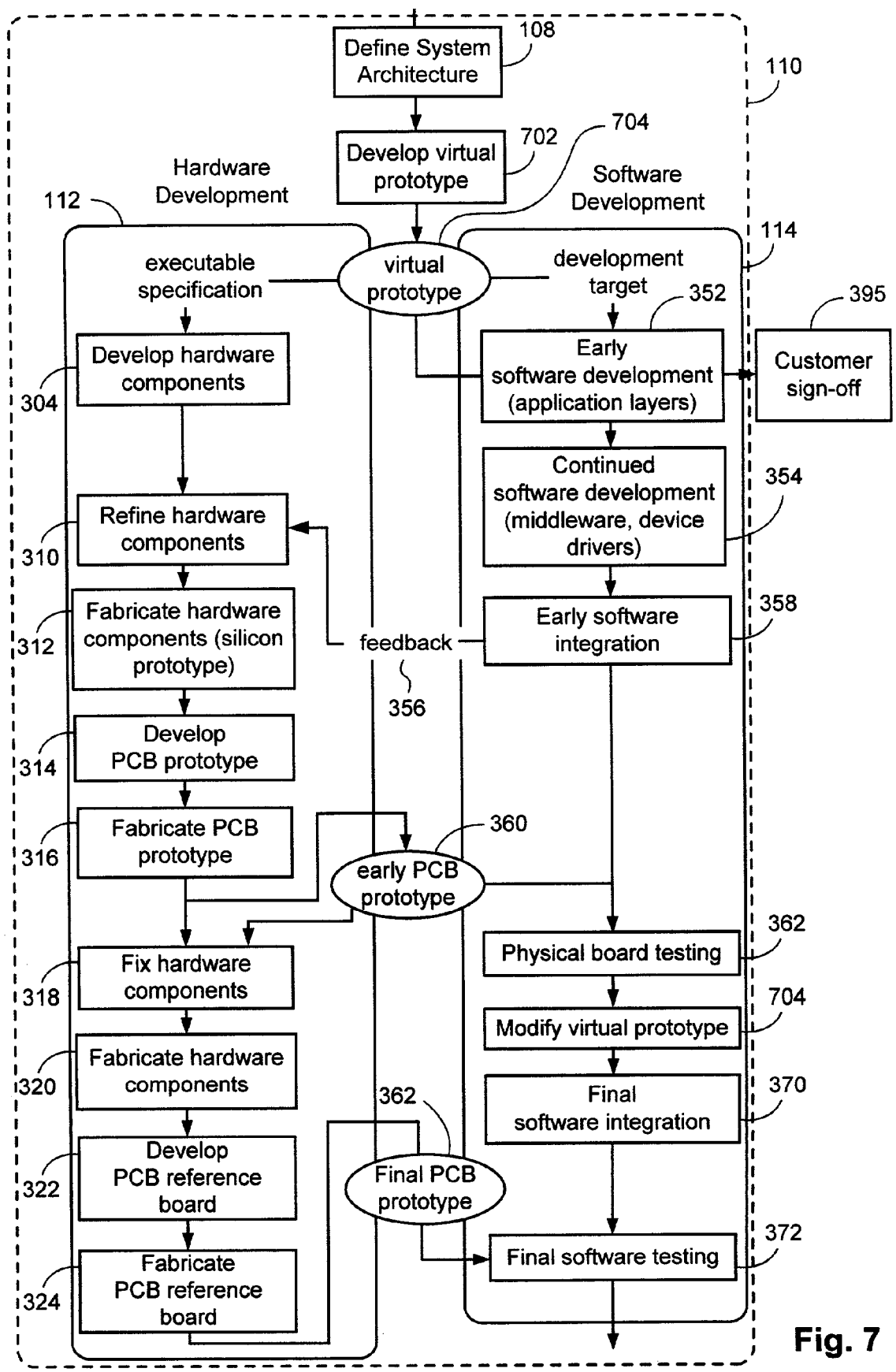
FIG. 7 is a detailed flow chart of a preferred method of hardware/software development for the design method of FIG. 5.

FIG. 7 is a more detailed flow chart of a method of using virtual prototyping in a development phase. Referring to FIG. 7, one aspect of the present invention is an IDE 402 for rapidly developing a virtual prototype 704 of an embedded system early in the prototype phase 110 (e.g., after the architecture definition 108), with the virtual prototype 704 executing a software application with sufficient speed to permit the virtual prototype 704 to be used to develop software early in the development phase 110 and to provide early feedback to hardware designers.

As illustrated in FIG. 7, the hardware designers can begin to develop hardware components using the virtual prototype 704 as an executable specification. Correspondingly, the software developers may use the virtual prototype 704 for early software development 352 (e.g., application layers, middleware, and device drivers), continued software development 354 (e.g., middleware and device drivers), and for early software integration 358 (i.e., evaluating system-level operation of the embedded system with an early version of the final software). This can be used to provide early feedback 356 to hardware developers to refine the hardware components. Note also that if there are any flaws in the early PCB prototype 360 revealed during physical board testing 362 that the virtual prototype 704 may be modified and used for final software integration 370. Comparing FIG. 7 with the conventional approach of FIG. 3, it can be seen that seen that the use of a virtual prototype in accordance with the present invention may be used to accelerate the development of software development and integration, thereby beneficially reducing the time required for the development phase 110 and/or increasing the quality of the final embedded system.

Figure 8:
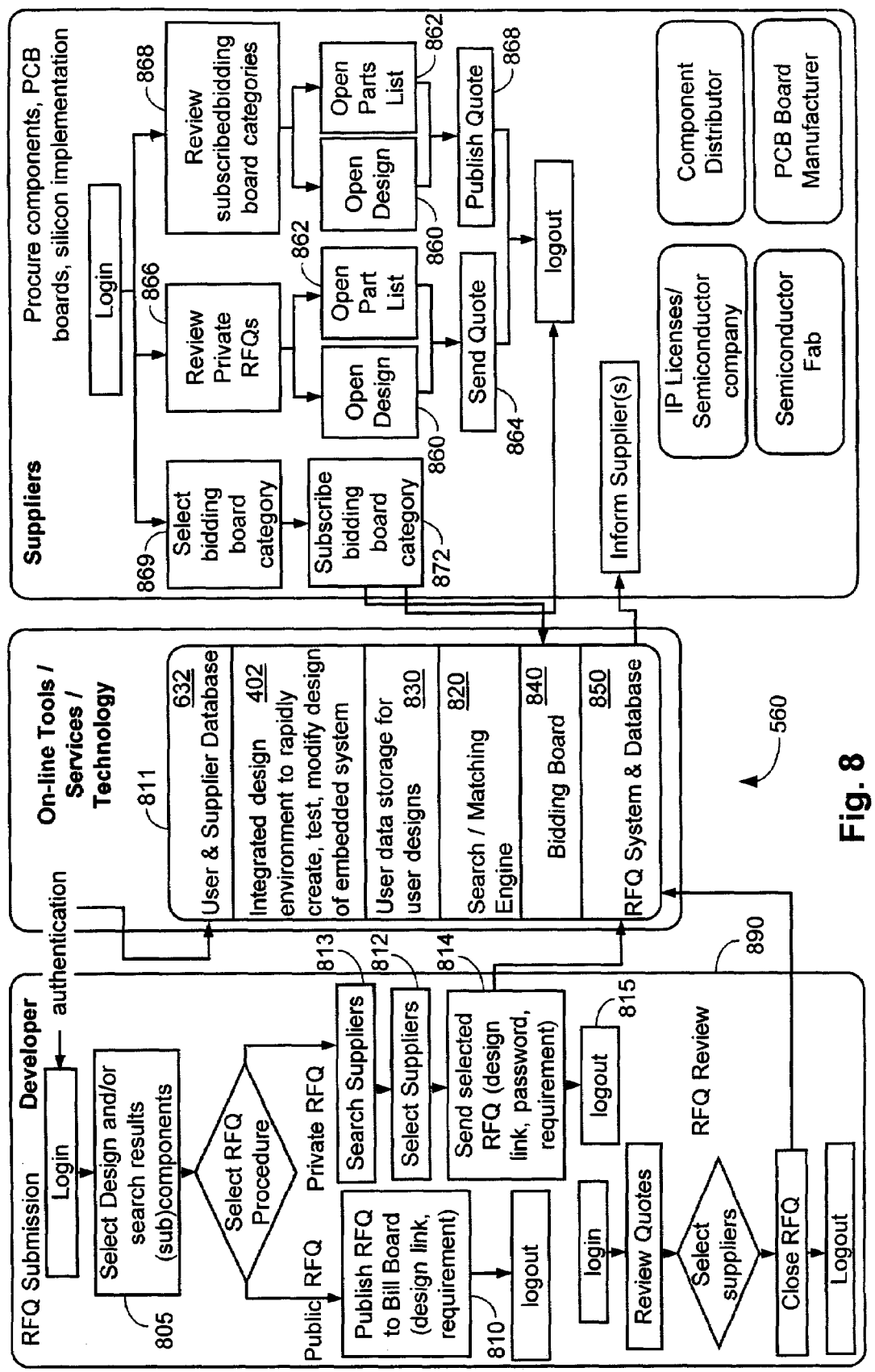
FIG. 8 is a detailed flow chart of a preferred method of procurement for the design method of FIG. 5.

Referring again to FIG. 5, a virtual prototype 704 developed for the development phase 110 may also be used to improve the procurement process by using the virtual prototype as an executable functional specification in an early procurement phase 560. The virtual prototype may, for example, be used by a PCB board manufacturer, component distributor, semiconductor fabrication company, or other group 504 to understand the function of the embedded system at a high level of abstraction, i.e., from the viewpoint of major components, signals, and their interactions. Since an interactive virtual prototype may be created early in the development phase 110 before a tested (physical) prototype is available, several weeks or more may be saved compared to a conventional procurement phase. FIG. 8 in more detail a preferred embodiment for using a virtual prototype as part of a procurement system for submitting request for quotes for goods or services related to an embedded system project. In a preferred embodiment, the procurement system may be part of a web-based service.

Figure 9:
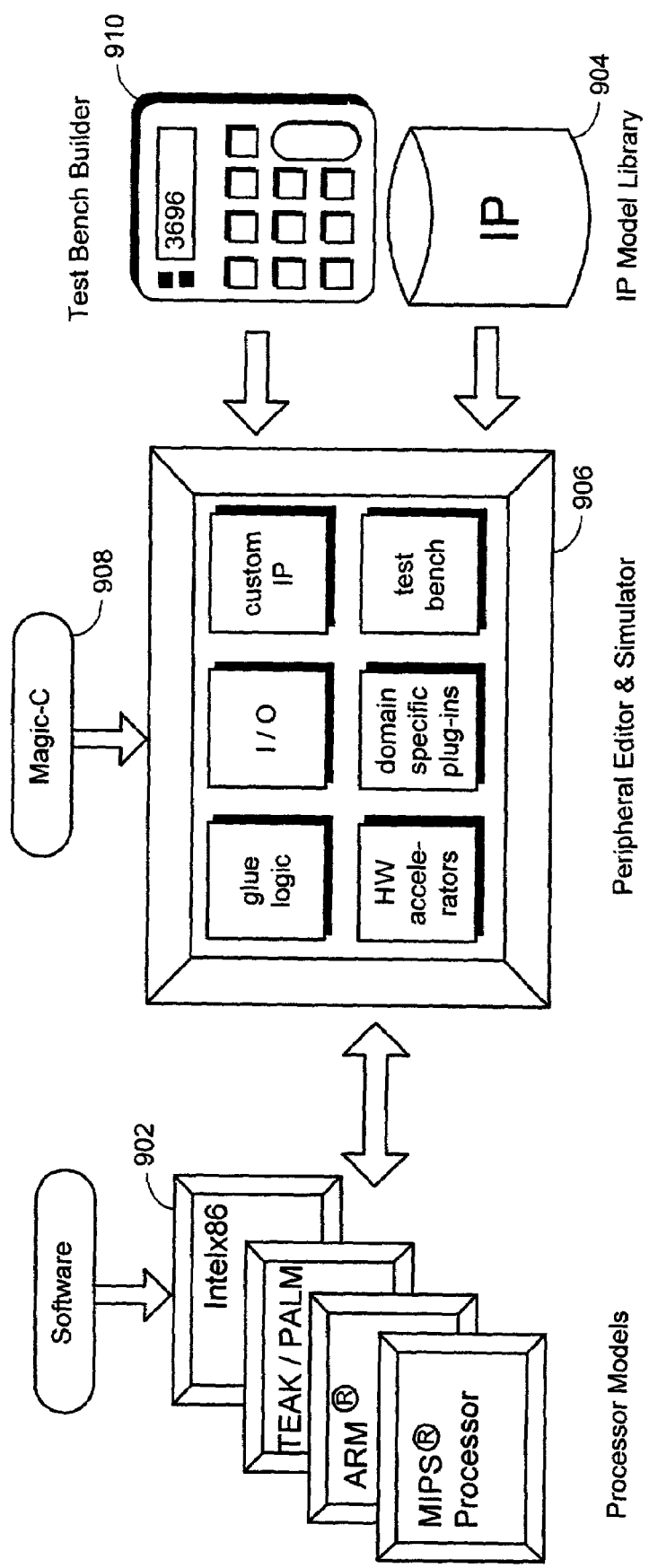
FIG. 9 is a conceptual block diagram of an integrated development environment for designing virtual prototypes of embedded systems.

FIG. 9 is a conceptual illustration of one embodiment of a graphical IDE 402 of the present invention. Referring to FIG. 9, processor simulators for one or more processor cores 902 are stored or accessible from a library of processors. In one embodiment, other IP components, such as models of hardware peripherals, may also be stored in a library 904. The IDE preferably includes a library having at least one IP block, including at least one processor simulator that a designer may select. The processor simulator is a model simulating the function of a processor core and, if desired, additional elements associated with the processor core. As described below in more detail, in a preferred embodiment, a processor core is modeled as a high speed instruction set accurate (ISA) simulator. A peripheral editor and discrete event simulator 906 is used to execute an object file of a hardware description 908. The hardware description is preferably created with graphical constructs in what the inventors call the "MAGIC-C" language. As illustrated in FIG. 9, the peripheral editor and simulator 906 may include models of the hardware peripherals and busses, I/O modules, hardware accelerators, processor glue logic and custom IP. A test bench builder 910 permits a virtual test bench having a graphical interface emulating a human/machine interface to be displayed to a user.

Figure 10:
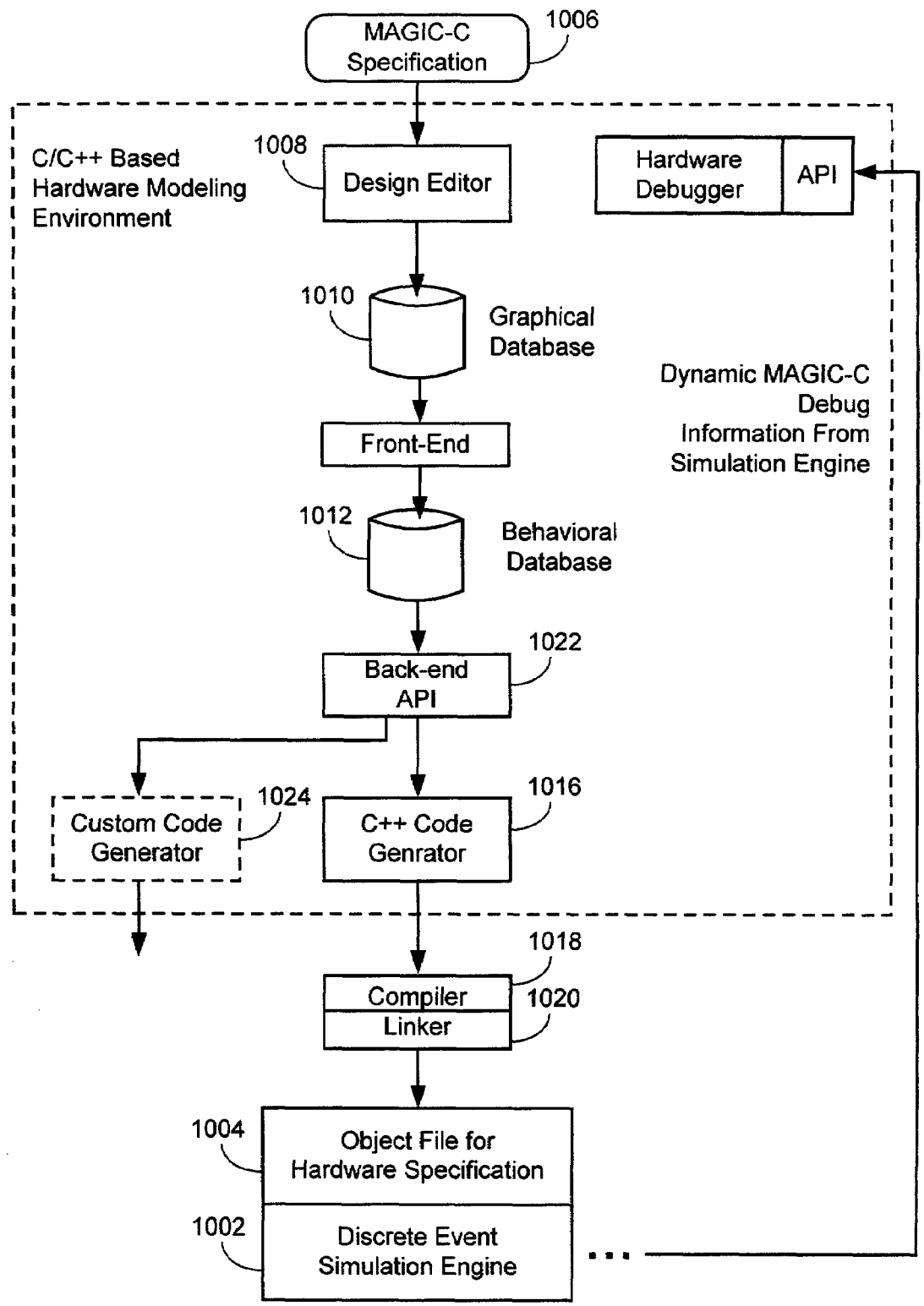
FIG. 10 illustrates the formation of an object file of a hardware description for a discrete event simulation engine.

FIG. 10 shows a preferred embodiment of a discrete-event simulation engine 1002 for executing the simulation is optimized for system-level simulation at software execution speeds preferably exceeding millions of instructions per second. A hardware modeling environment (not shown in FIG. 10) is used to create a hardware specification from which an object file for the hardware specification 1004 may be compiled for execution on a discrete event simulation engine 1002. As described below in more detail, in a preferred embodiment, finite state machine representations of the hardware specification 1006 are created using graphical object "constructs" that have a graphical portion and a textual portion for defining their function. In one embodiment, the graphical constructs may include user-defined high level descriptions of task behavior (e.g., C/C++ models) and shapes adapted from the specification and description language (SDL). Consequently, a graphical database 1010 and behavior database 1012 is included to generate code for the hardware specification. As indicated in FIG. 10, a design editor 1008 accesses graphical constructs from a graphical database 1010. A user may input code describing the function or attributes of a graphical construct along with inputs/outputs to a graphical construct. A code generator 1016 (e.g., a C++ code generator) and compiler 1018 is used to generate an object file of the final hardware specification, that is linked in the simulation engine, resulting in a compiled code simulation executable. In another embodiment, separate dynamic link library (DLL) files may be generated for portions of the hardware specification (e.g., for each symbol or component) that are loaded at start-up by a simulation loader to form the simulation. If desired, an export back-end APIs 1022 may be included to allow a user to traverse and access the internal design database. This enables users to build their own code generator 1024 for different languages (i.e., should language other than the preferred implementation in C++ be desired).

Figure 11:
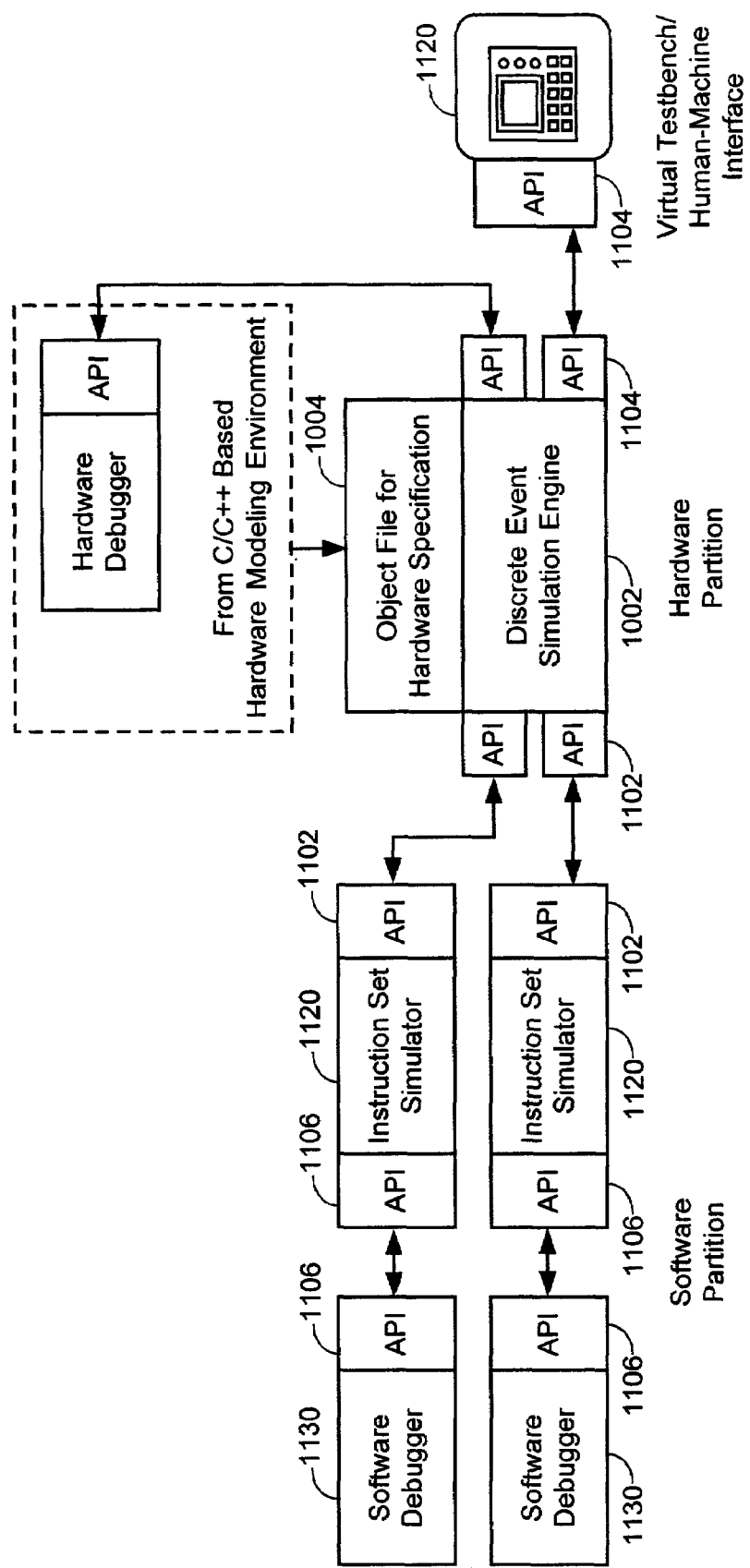
FIG. 11 is an illustration of the architecture of an integrated design environment.

FIG. 11 is a block diagram illustrating in more detail some of the operation of the discrete event simulation engine 1002. Referring to FIG. 11, an open simulator Application Procedure Interface (API) 1102 is preferably included to communicate memory transactions (i.e., read and write operations) from ISA simulators of processors 1120 to the FSM peripheral models in one direction, and interrupts from the peripheral model to the processor model in the other direction. Additional APIs 1104, 1106 may be included for coupling a test bench to the discrete event simulation engine and for coupling a software debugger 1130 to an instruction set accurate simulator of a processor.

Figure 28:
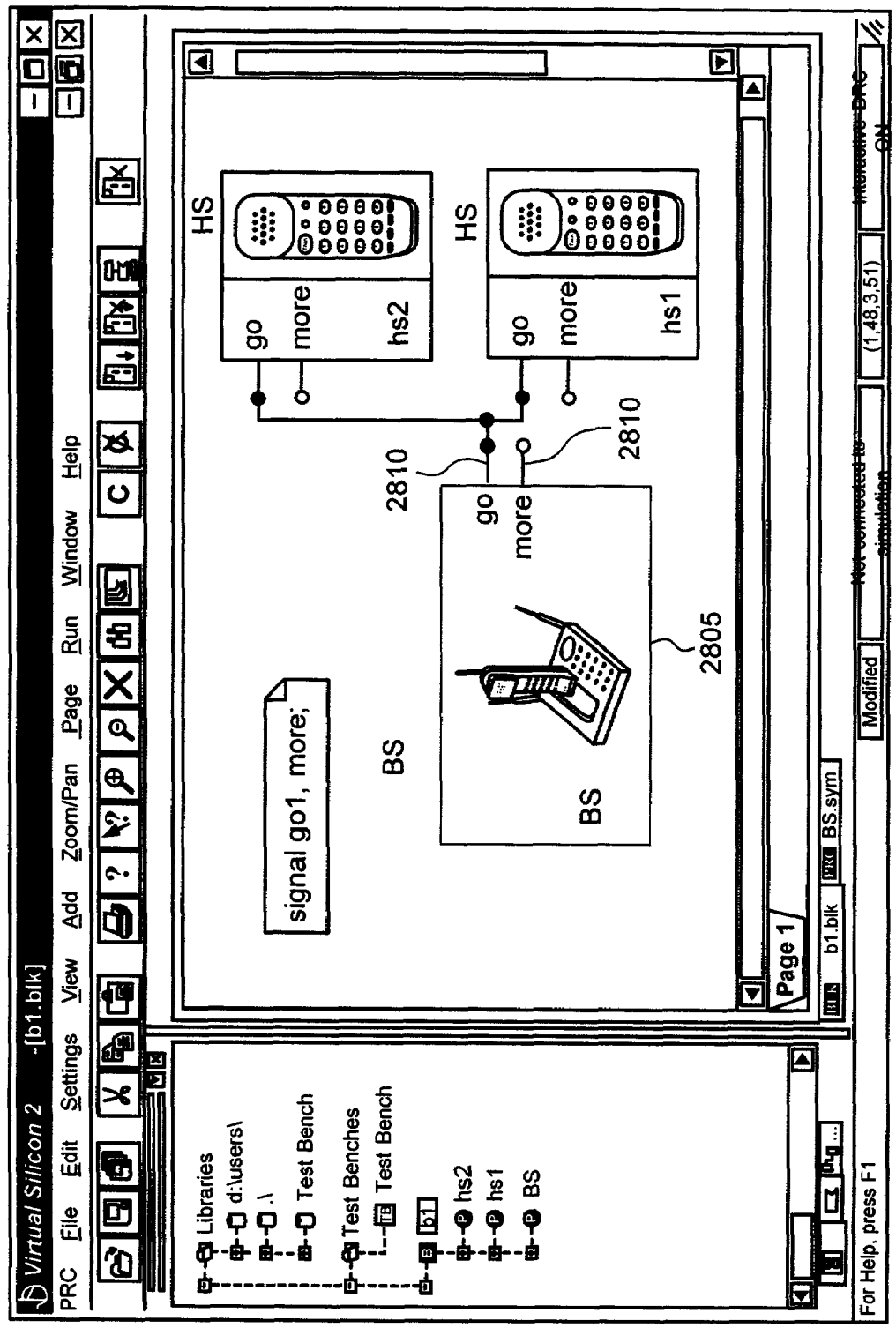
FIG. 28 is a screen shot of a base station for a cordless handset showing the top-level block diagram opened in the design window.
Figure 29:
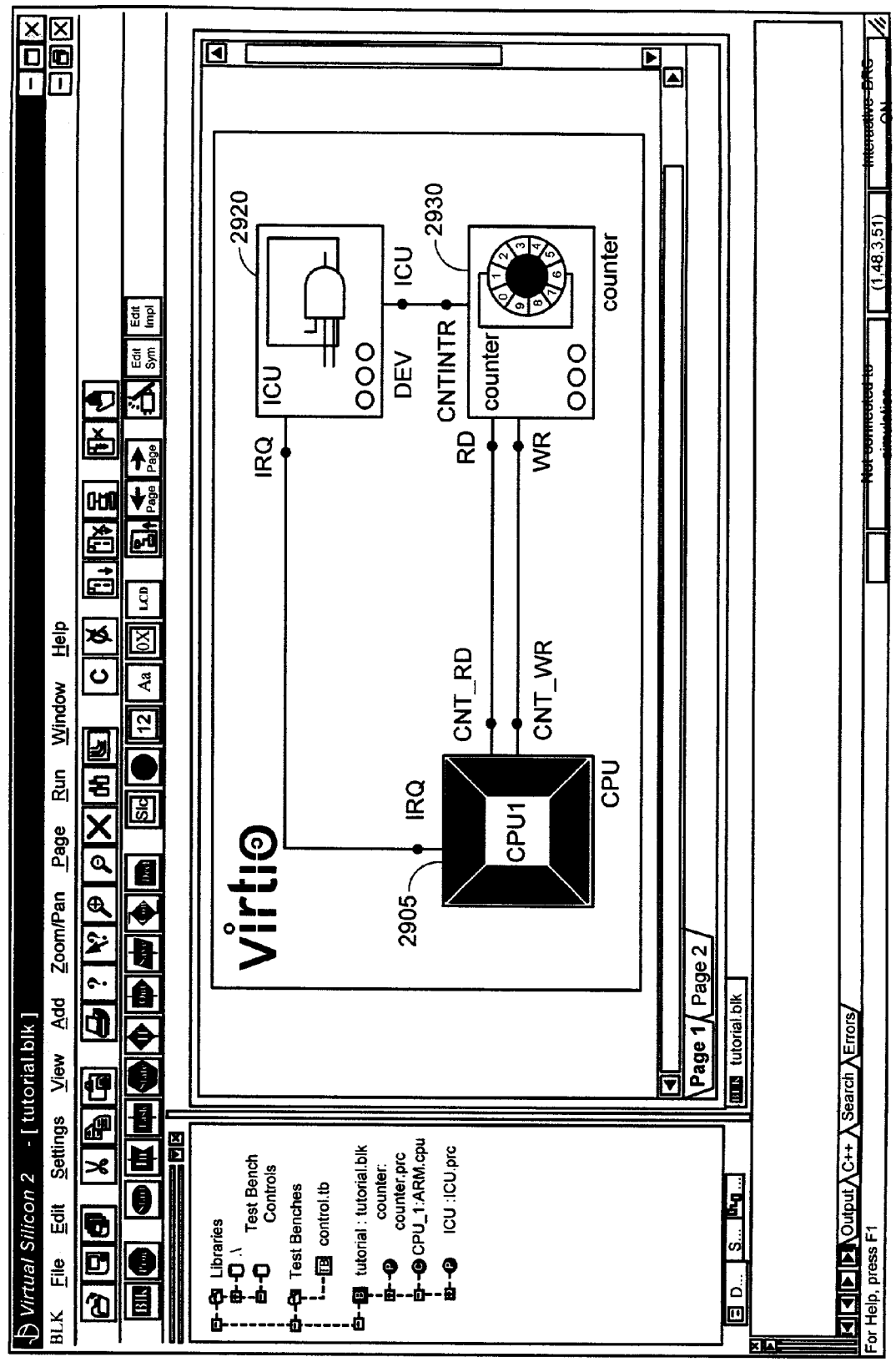
FIG. 29 is a screen shot of a processor with an interrupt controller and a peripheral.
Figure 36A:
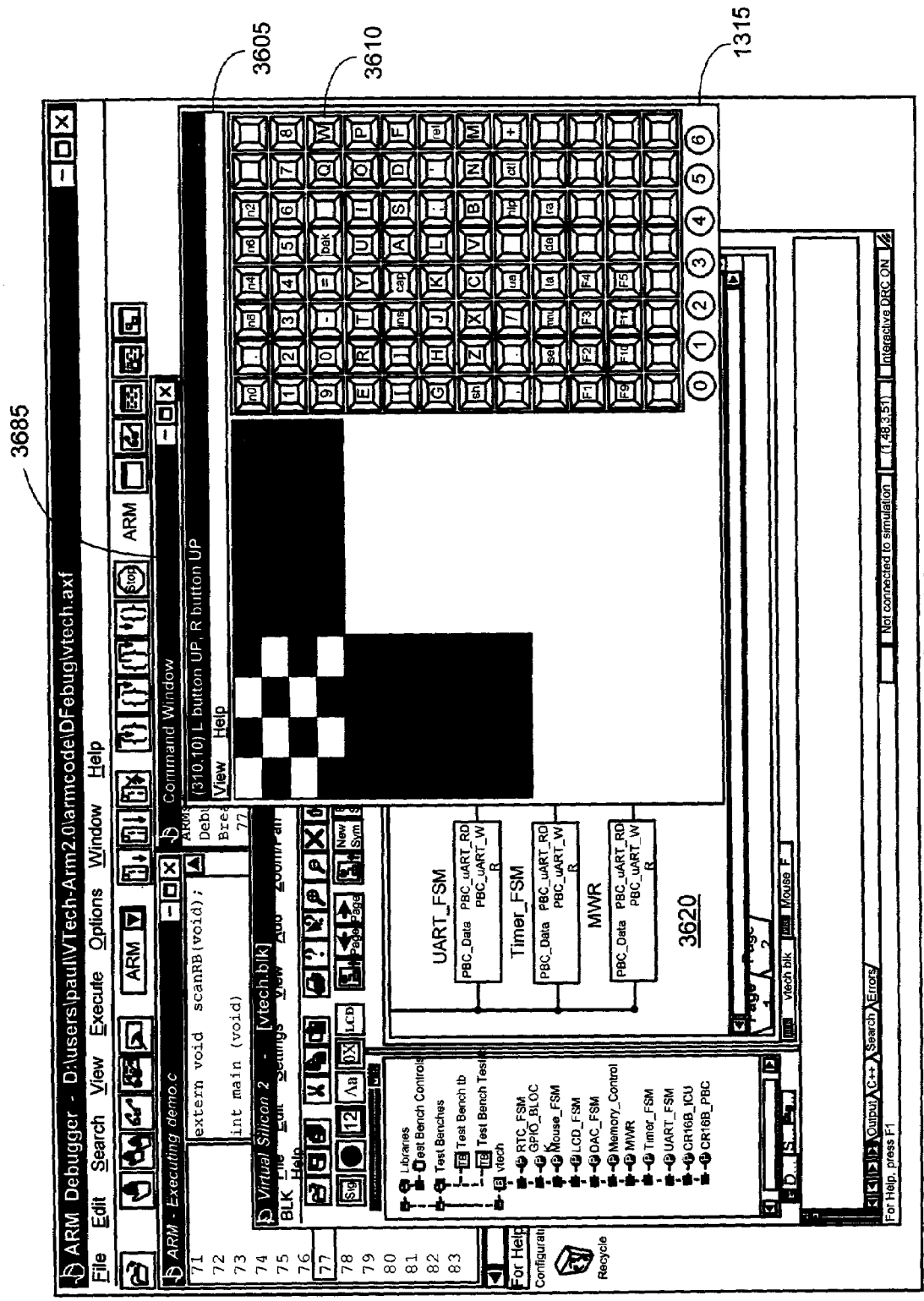
FIG. 36A is a screen shot showing the execution of a simulation with multiple windows opened.
Figure 36B:
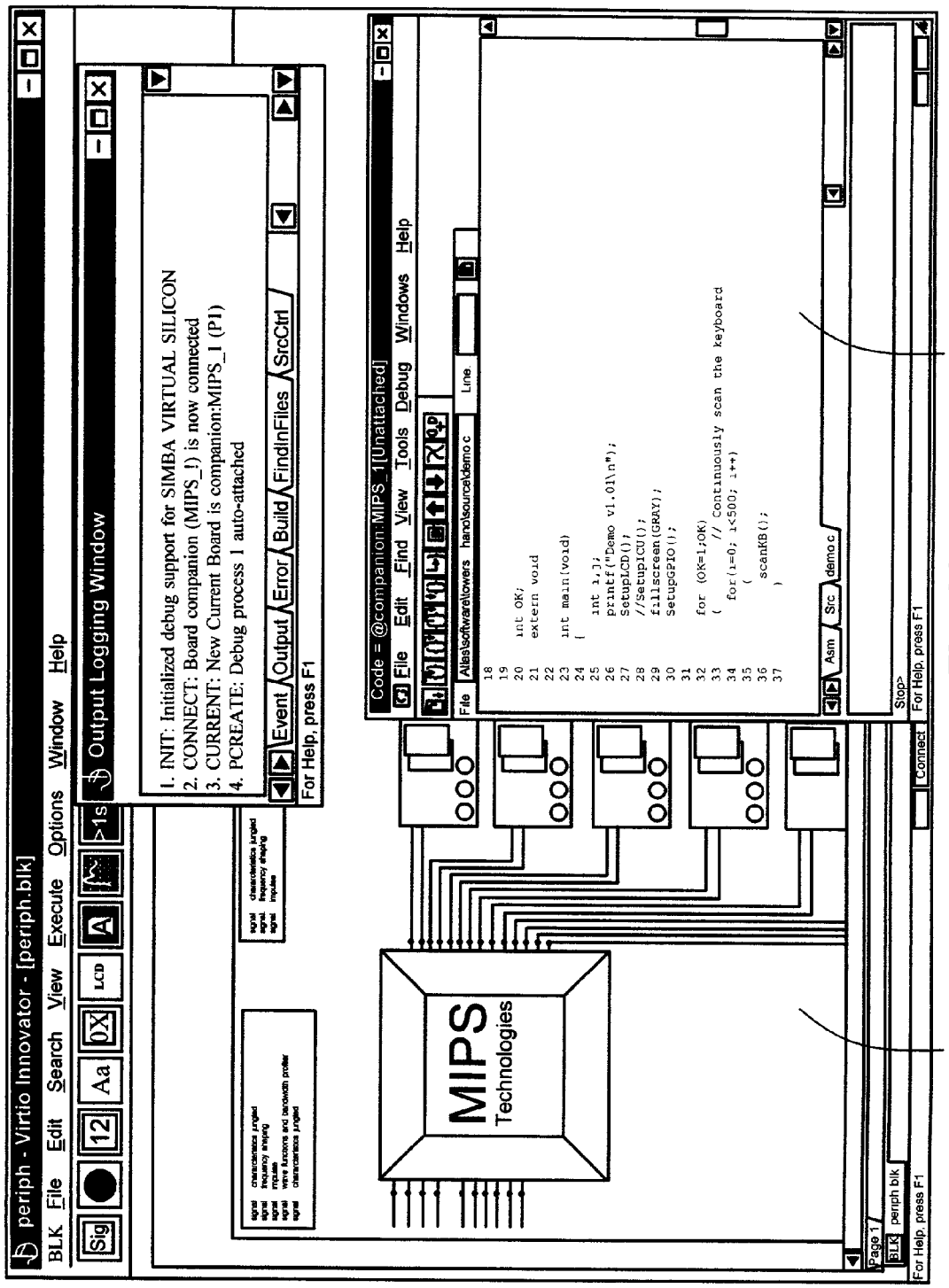
FIG. 36B is an illustrative screen shot showing an opened software debugger interface superimposed over an embedded system design.
Figure 36C:
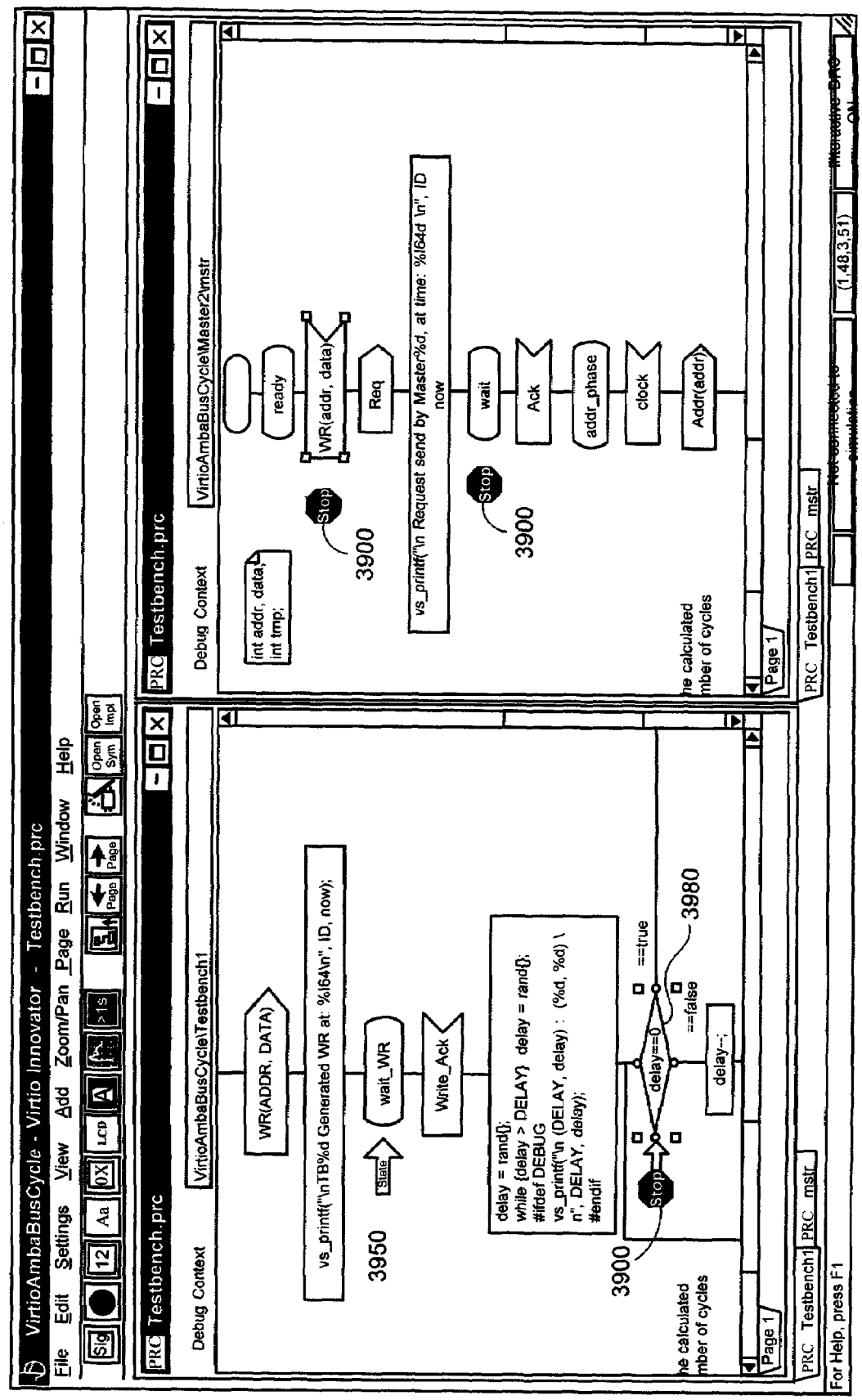
FIG. 36C is an illustrative screen shot illustrating how a breakpoint of execution may be associated with a graphical construct of the finite state representation of the hardware components.
Figure 37:
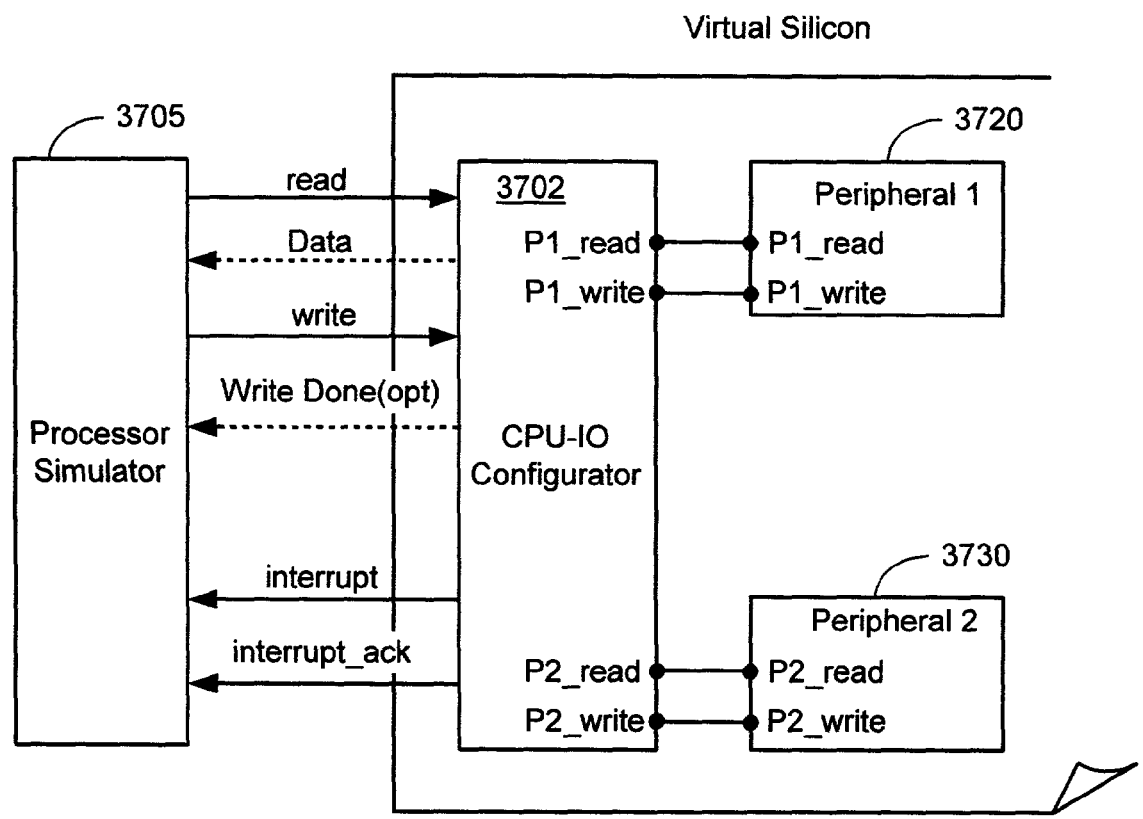
FIG. 37 is a conceptual illustration of a processor integration interface.

As shown in FIGS. 28, 29, and 37, the use of an instruction set accurate simulator to model a processor core permits the processor simulator to exchange memory transactions with the hardware partition and to receive interrupts from the hardware partition using APIs linking the hardware partition and the instruction set accurate simulator. A configuration to map address spaces from the virtual processor core to the virtual hardware is part of the IDE. One advantage of an instruction set accurate simulator is that it permits user binary program code (e.g., a binary program executable of a software application) to be compiled for the target processor and to be loaded and executed by the processor simulator at a high rate of execution (e.g., 1-10 MIPS running the simulation on a computer system having a high speed microprocessor). This is fast enough for software developers to explore software issues of production quality code (e.g., software execution and debugging). For example, with the IDE running on a PC having a 450 MHz microprocessor, the simulation has a sufficient execution speed to boot a typical embedded system operating system (e.g., WINDOWS NT or LINUX) in less than 60 seconds, with less than 30 seconds being a typical booting time. As shown in FIGS. 11 and 36, APIs may be used to couple a debugger to the instruction set simulator. In one embodiment, a user may associated breakpoints of execution in the FSM representation of a hardware element and may select signals of the hardware partition for viewing in a waveform viewing. This improves the ability of a user to debug hardware and software. In one embodiment, the ability to set breakpoints and perform single-step debugging allows the designer to stop the entire system simulation at any point in either the software or hardware domain. A virtual test bench 1120 may be coupled by an API 1104 to the virtual hardware partition.

Figure 12:
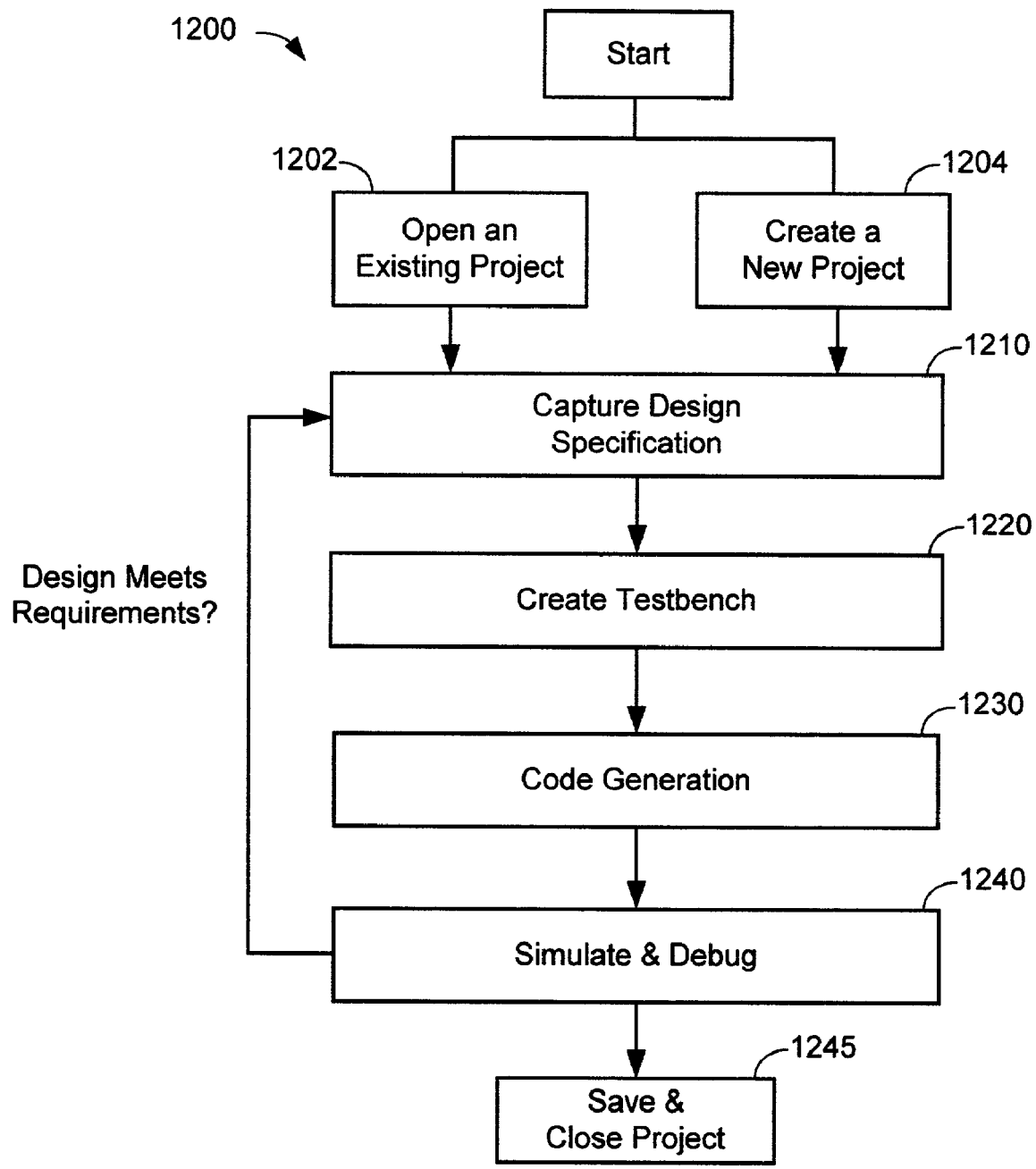
FIG. 12 is a top level flowchart of the a method of using the integrate design environment.
Figure 13:
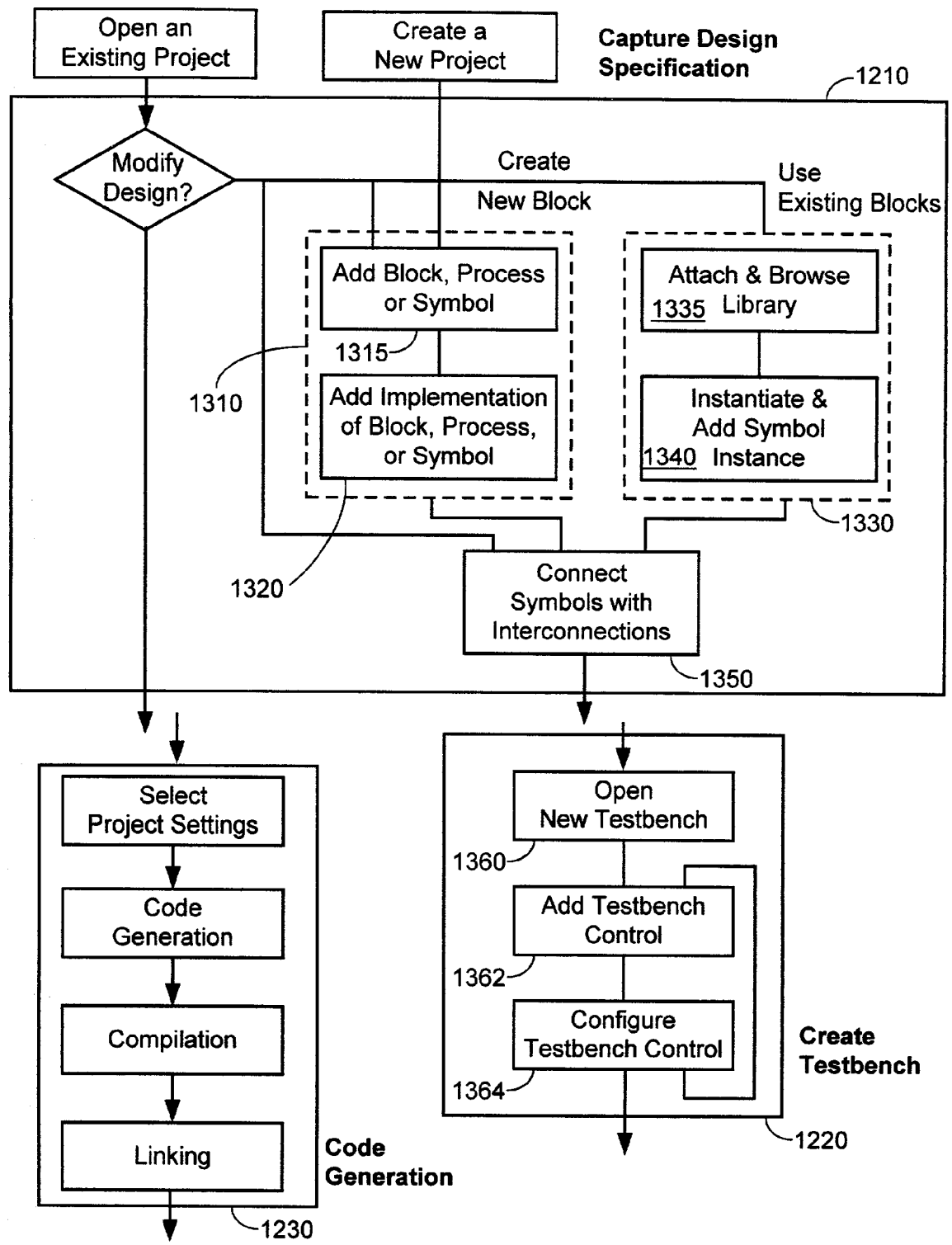
FIG. 13 is a flow chart of a sub-task of FIG. 12.
Figure 14:
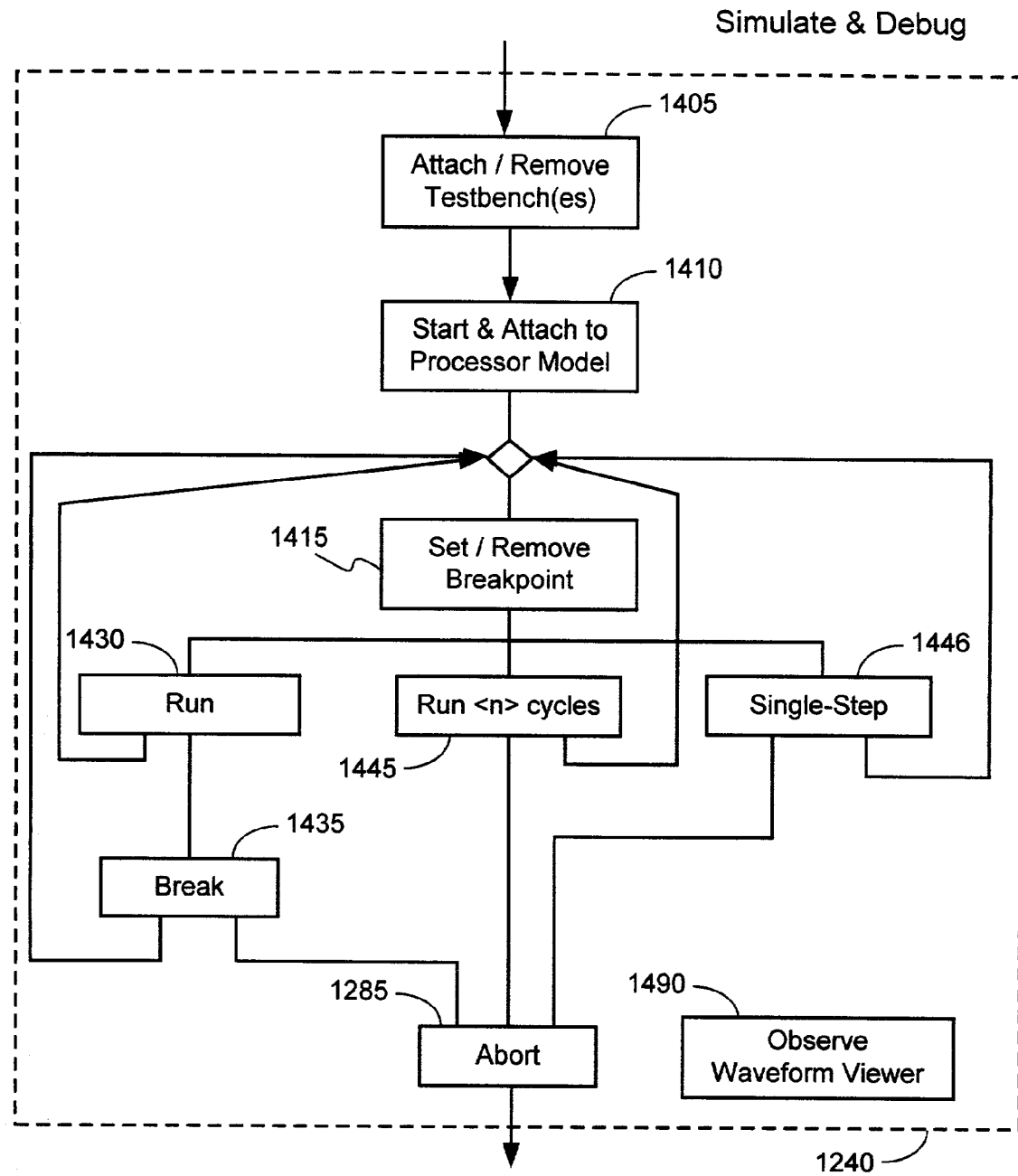
FIG. 14 is a flow chart of a sub-task of FIG. 12 for simulation and debugging.

Referring to FIGS. 12-13, in a preferred embodiment, the IDE permits a user to model hardware elements and processes as blocks, processes, or symbols. FIG. 12 is a flow chart 1200 of an exemplary design process for creating a virtual prototype 702, which includes designing a functional specification of an embedded system 1210, creating test benches 1220, generating code 1230, and simulating and debugging the virtual prototype 1240. FIG. 13 is a more detailed flowchart of some of the steps in the design process 1210 for creating FSM representations of blocks, processes, and symbols in the MAGIC-C language. FIG. 14 is a flowchart showing steps for setting breakpoints and debugging during the simulation and debugging of a virtual prototype 1240. In a preferred embodiment generated code contains extensive debugging hooks, allowing graphical debugging of FSM code and providing advanced debugging features as single-stepping and breakpoint placement directly on the graphical constructs, and this in the same Design editor window which was used to create the FSM specification. In one embodiment, the C source file implements the FSM model using a skeleton build around a single switch statement and a breakpoint macro that reports the state of the FSM to be displayed during simulation and allow the placing of breakpoints and single-stepping.

Figure 15:
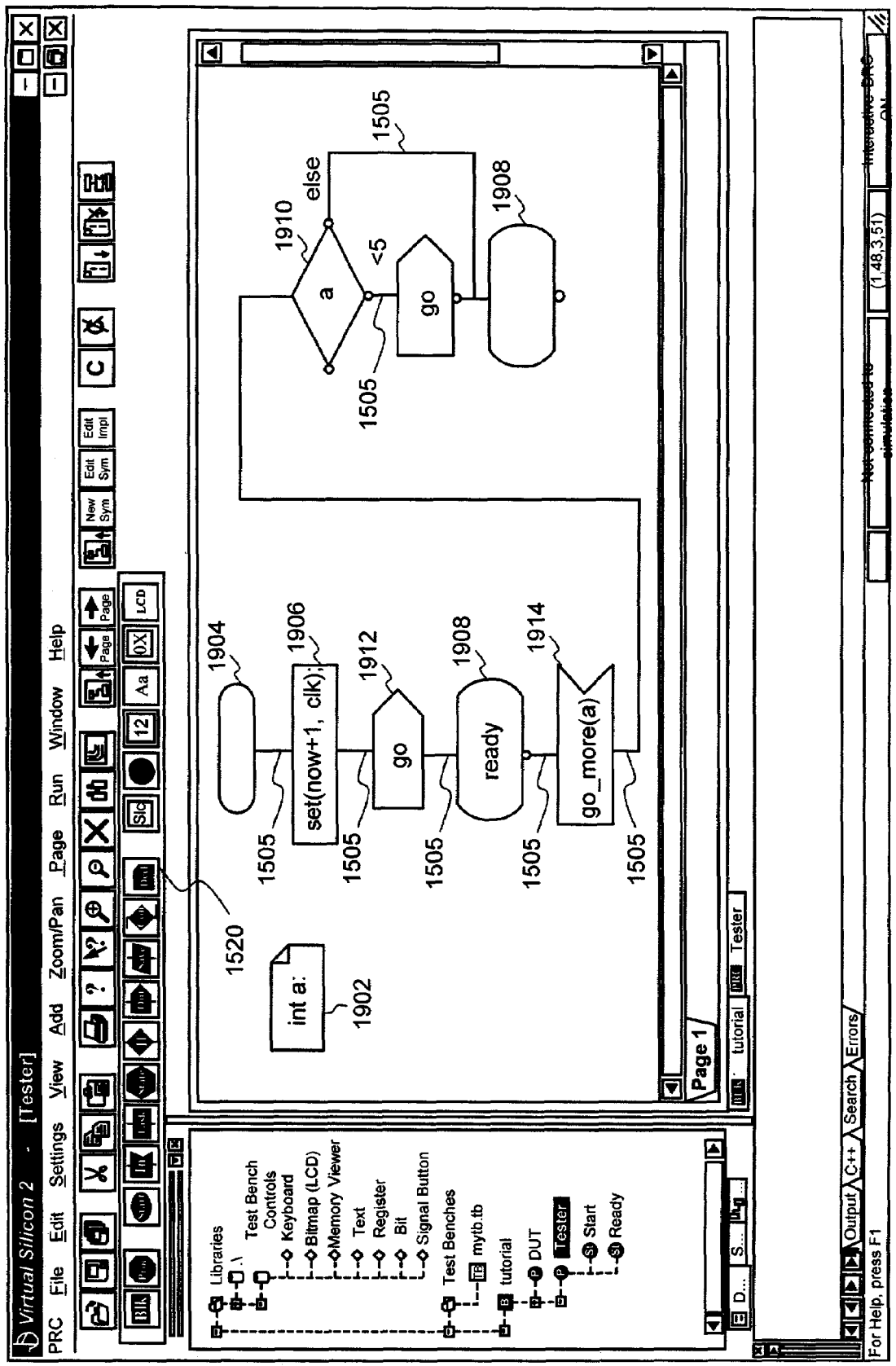
FIG. 15 is a screen shot of an IDE design window, showing the details of a finite state machine representation using graphical constructs.
Figure 20:
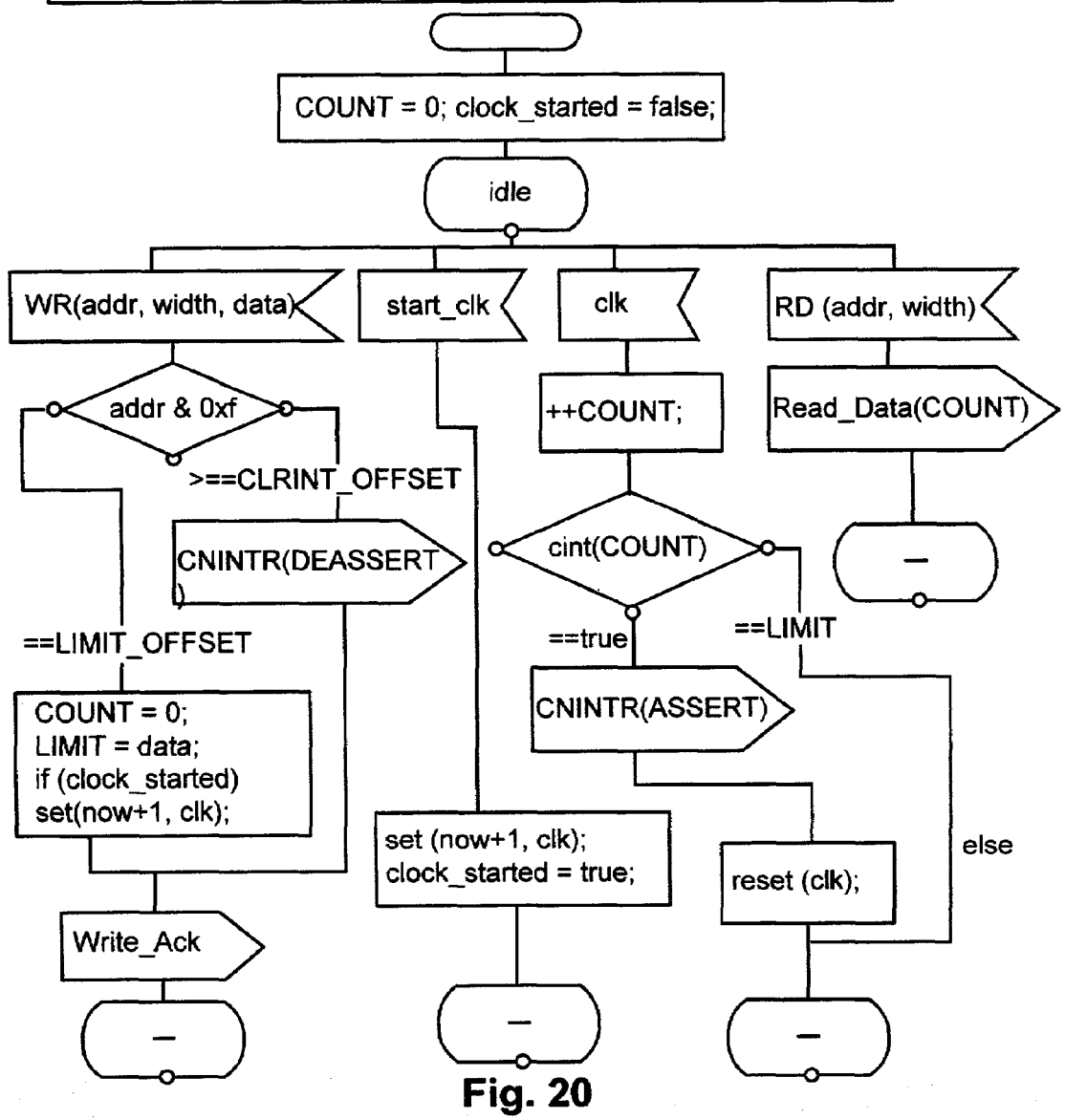
FIG. 20 is a screenshot showing an example of a finite state machine representation of a hardware counter peripheral.
Figure 21:
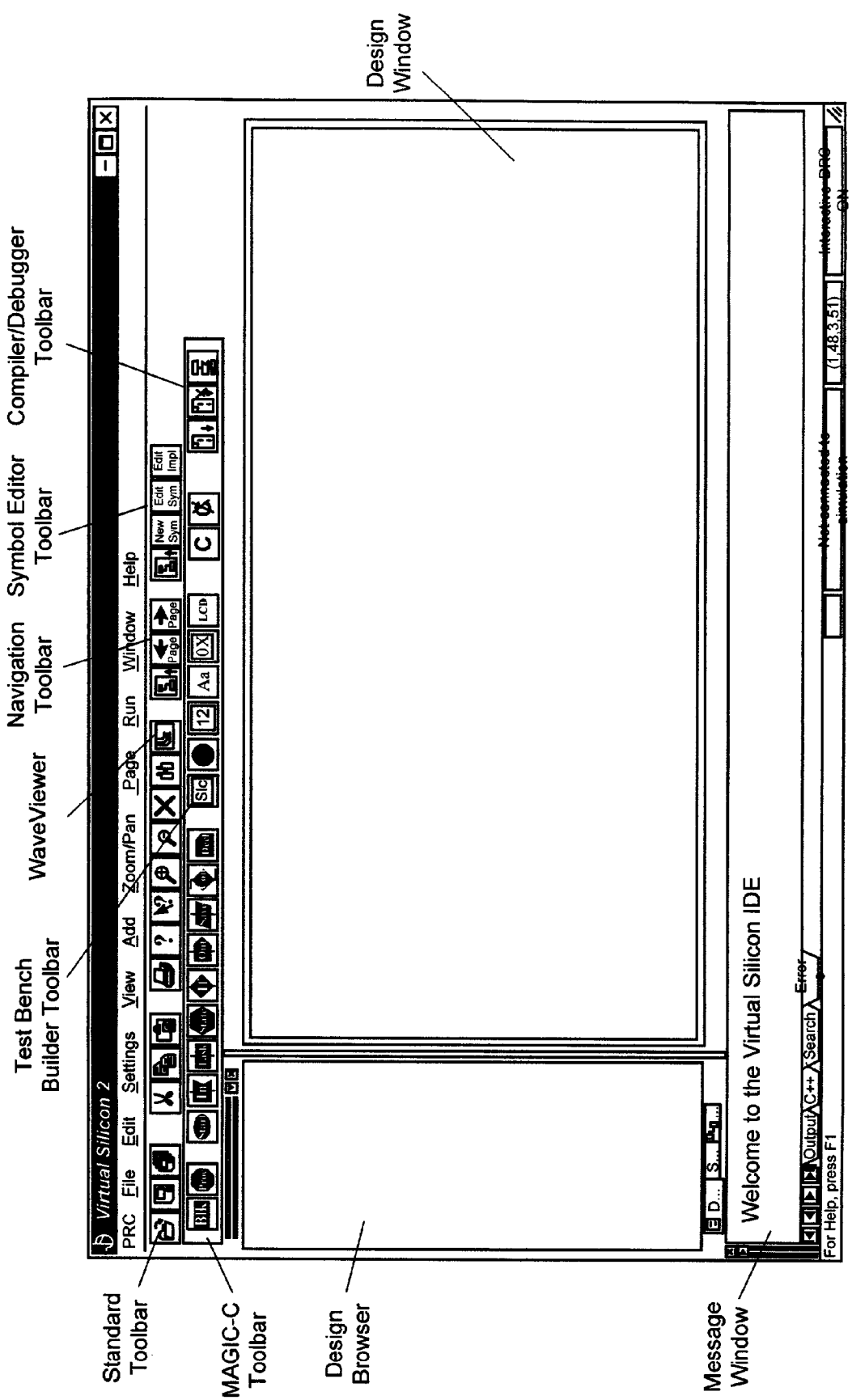
FIG. 21 is a screen shot of a main window of a preferred design window and toolbars.

Referring to FIGS. 15-26, the IDE includes a graphical design editor having a design language to create an extended finite state machine (FSM) representation of hardware peripherals in the hardware partition. As shown in FIGS. 19A and 19B, in a preferred embodiment the design language is a graphical design language having graphical objects for forming a FSM representation as a series of linked objects representing the FSM. Referring to FIG. 15, in a preferred embodiment the graphical object symbols may be selected from a menu 1520, a textual portion of the object input by the user, and the graphical object connected to other graphical objects using connectors 1505. A preferred embodiment of a graphical design language, known as "MAGIC-C™, includes some features of the specification and description language (SDL) adapted to create a hardware description. Referring to FIGS. 21-26, in a preferred embodiment, a menu-driven graphical interface is used to facilitate the creation of hardware peripherals. As shown in FIG. 21, the IDE preferably has a menu-driven graphical user interface that preferably includes a design window for creating a design with toolbars for accessing functions using a computer mouse or similar interface. The IDE preferably includes a peripheral design editor and simulator that is adapted to permit hardware IP components and processes to be created and linked with other IP components.

Figure 30:
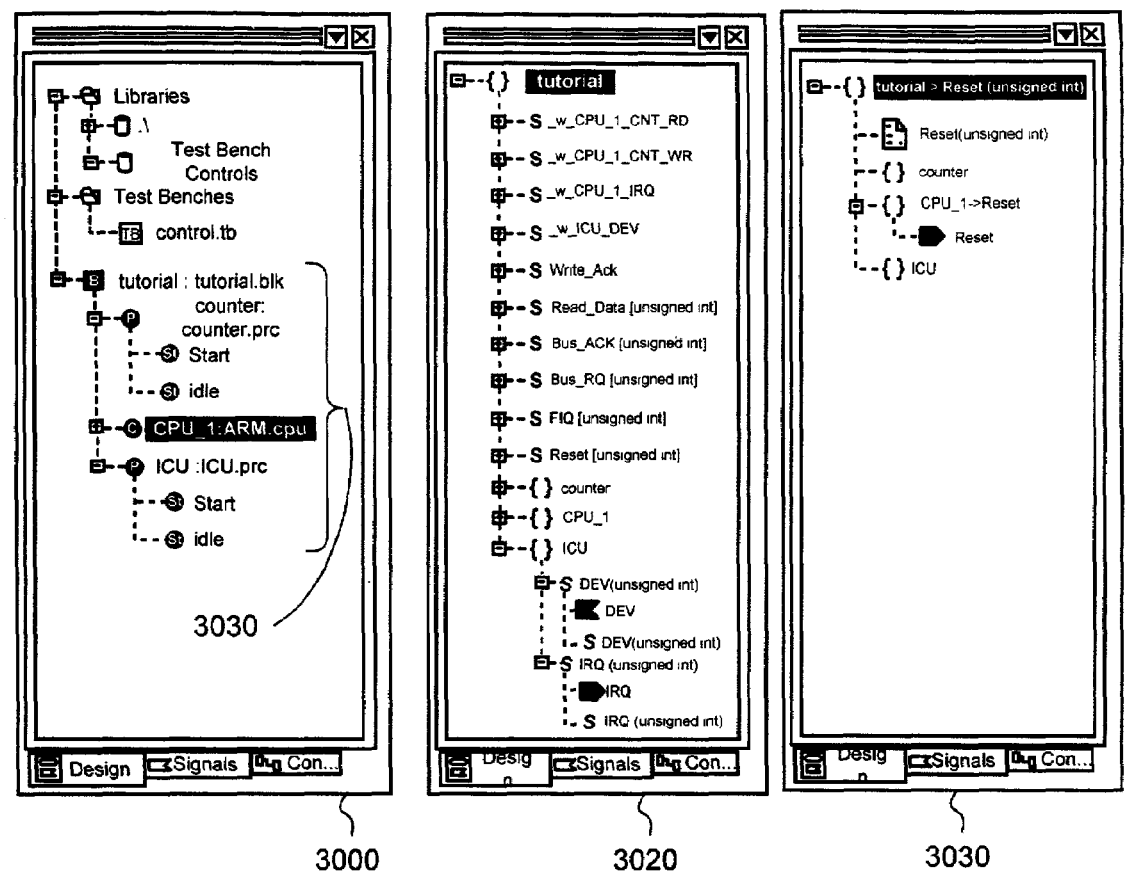
FIG. 30 shows screenshots of a preferred design, signal, and connectivity
Figure 31:
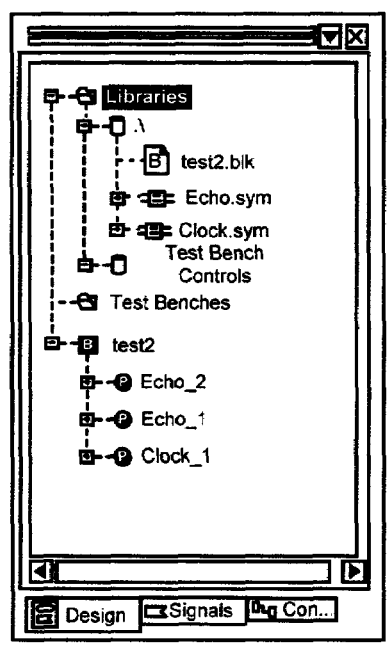
FIG. 31 is a screenshot of the design browser showing details of a library browser.
Figure 32:
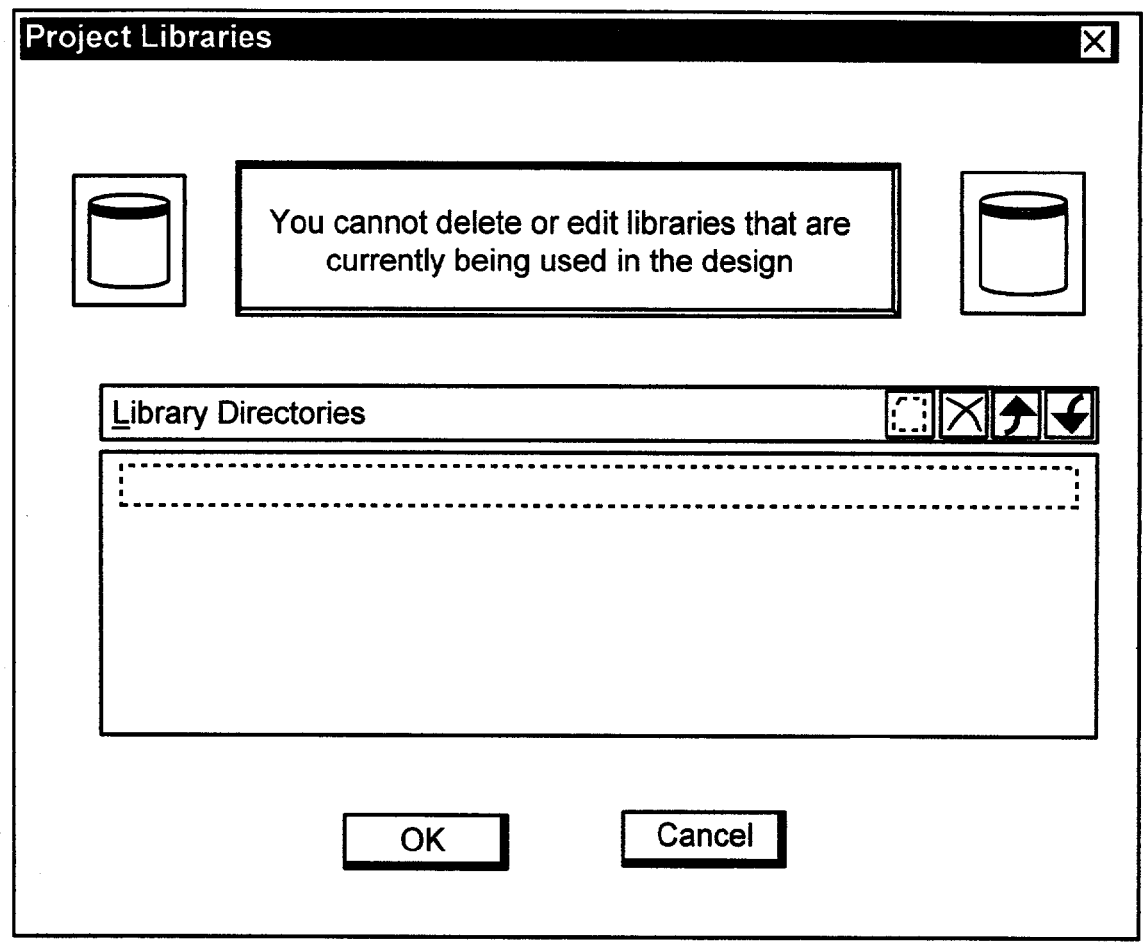
FIG. 32 is a screen shot of a project library manager window.

In a preferred embodiment, FSM representations of hardware elements may be encapsulated into containers (symbols) having signal pins and connectors that may be labeled to facilitate a high-level functional block understanding of the embedded system but which may also be opened to reveal lower-levels of detail of each symbol or block. FIG. 28 an exemplary screen shot of a top-level block diagram of a cordless phone system showing a cordless phone symbol 2805 with pin symbols 2810. FIG. 29 shows an exemplary screen shot of a processor simulator 2905 coupled to an interrupt controller 2920 and a counter peripheral 2930. Note that the memory read/write transactions from the pins for processor simulator 2905 to counter 2930 may be labeled as well as interrupt signals from the interrupt controller 2920 to the processor simulator 2905. Consequently, a high-level understanding of the embedded system of FIG. 29 may be obtained because it is a high-level functional block diagram of the embedded system and because a virtual test bench may be used to interact with the virtual embedded system. Moreover, in a preferred embodiment a graphical hardware debugger permits the execution to be selected to trace the behavior of the embedded system. FIGS. 30-31 are screen shots of browsers and control windows useful for rapid navigation, traversal, and design of embedded system designs having multiple levels of hierarchy.

Figure 33A:
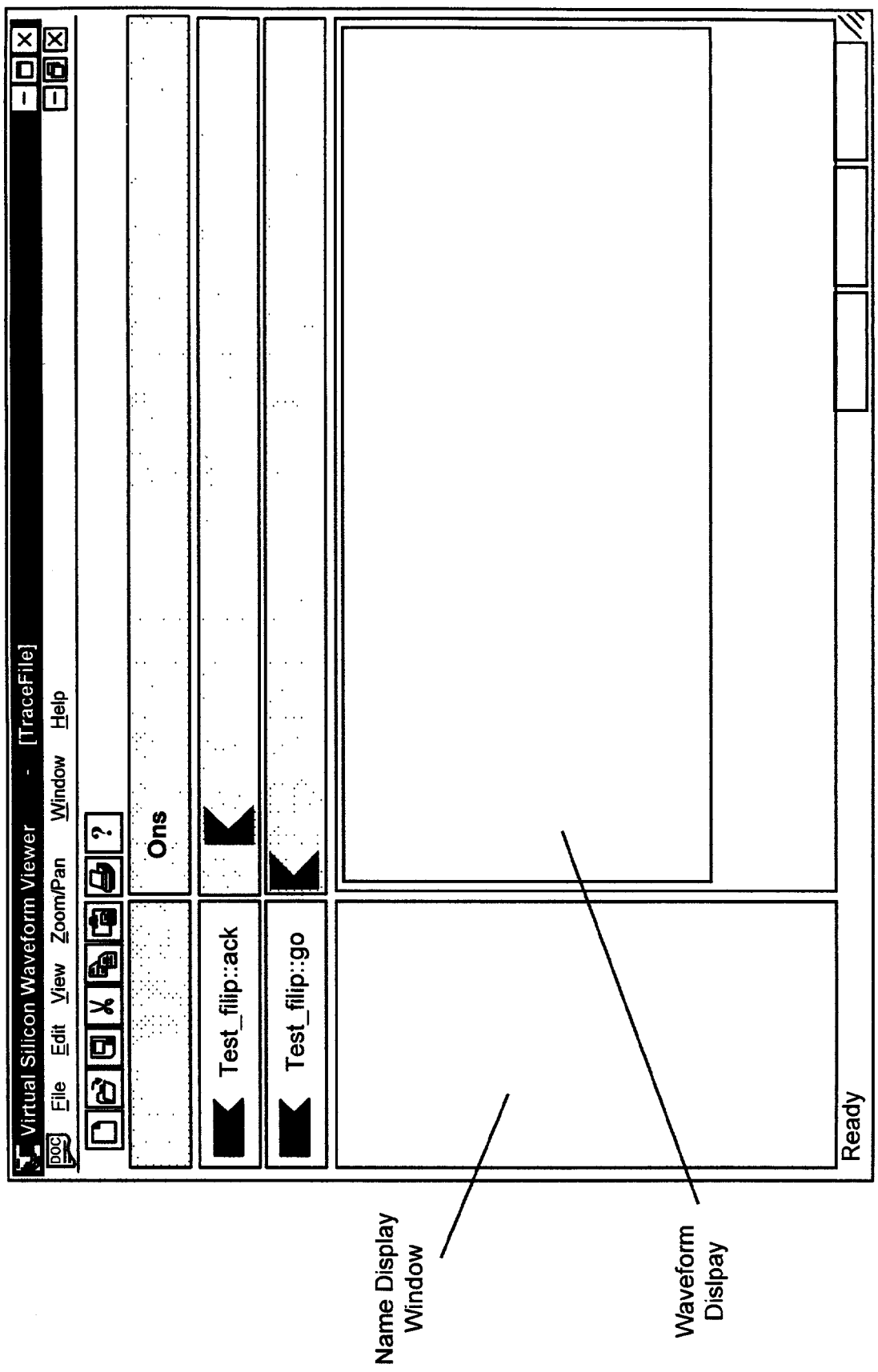
FIG. 33A is a screen shot of a waveform viewer tool for viewing signal occurrences and values of variables on a time axis.
Figure 33B:
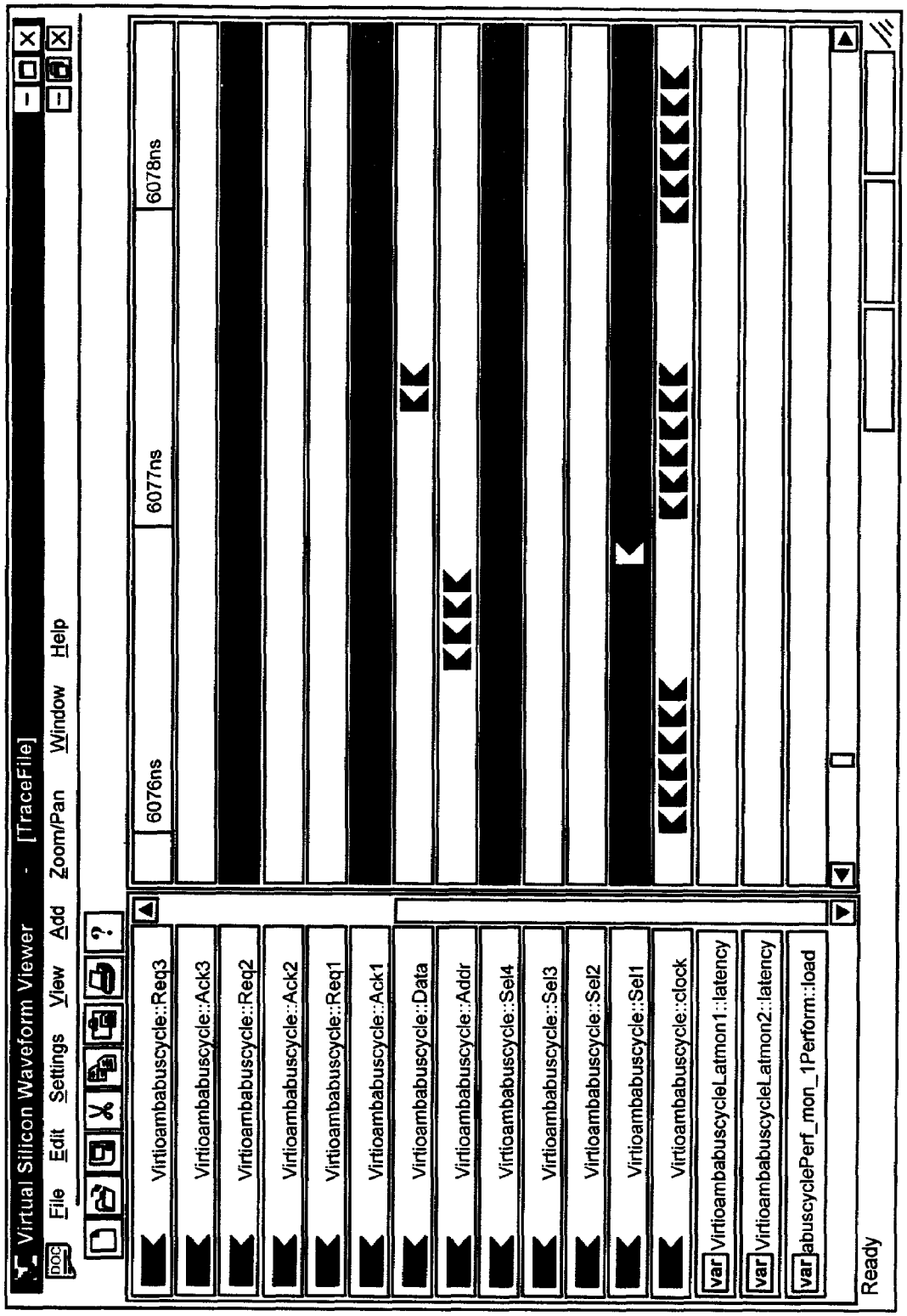
FIG. 33B is a second screen shot of a waveform viewer tool.
Figure 46:
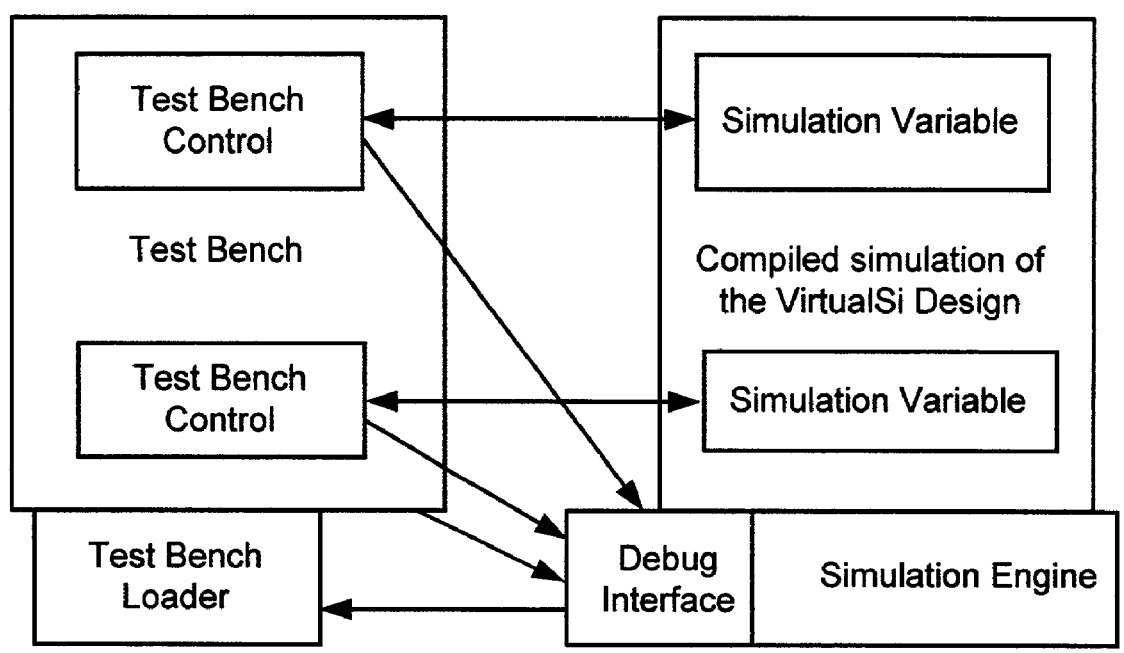
FIG. 46 is a block diagram of a test bench coupled to a simulation.
Figure 47:
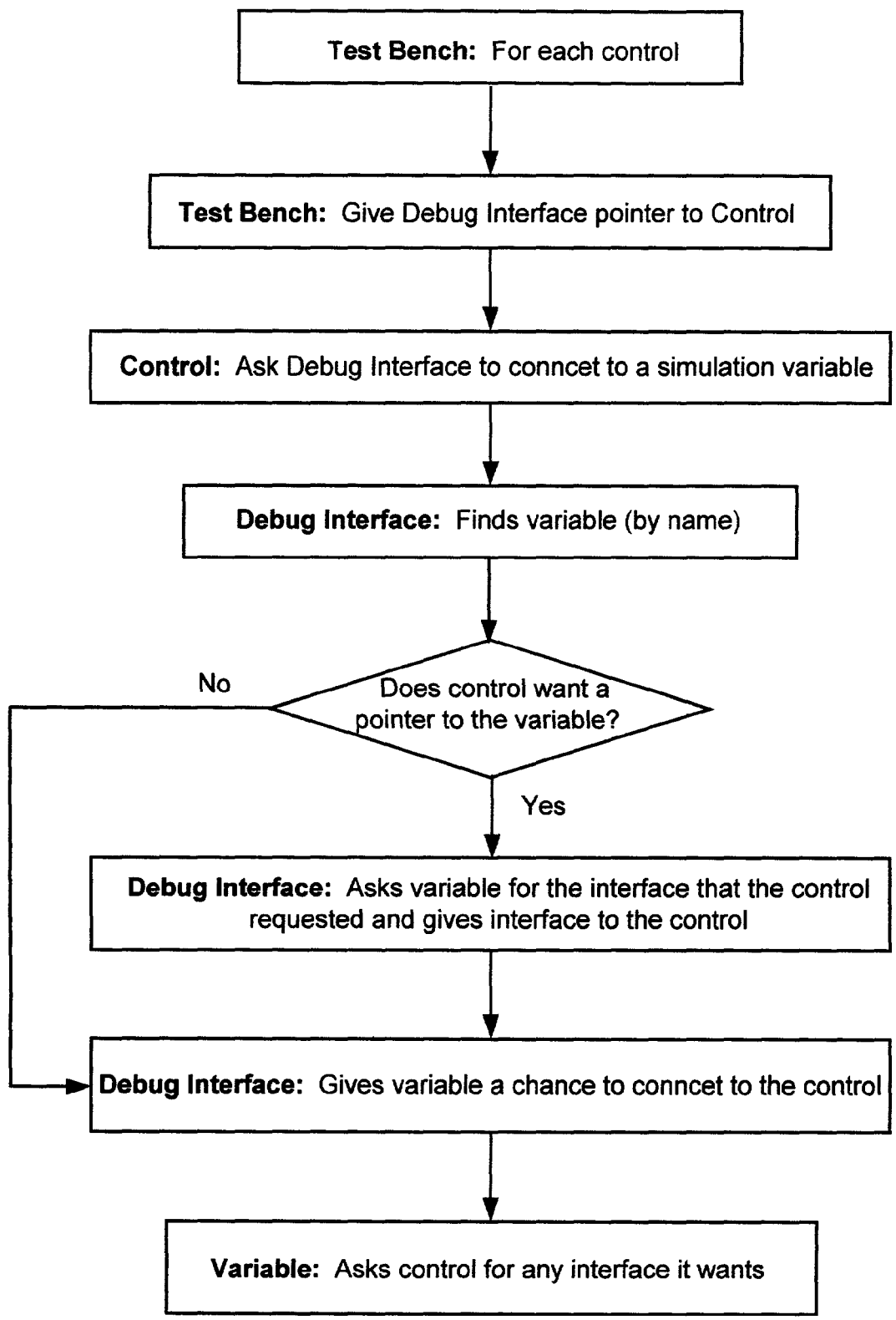
FIG. 47 is a flow chart showing how test bench controls and variables may negotiate a communication interface.

The IDE preferably includes a test bench builder, software debugger, and waveform viewer to emulate other physical test apparatus commonly used to assess the operation of an embedded system. As shown in FIGS. 33A and 33B, a waveform viewer is also preferably included for viewing a selected signal as a function of time. As shown in the exemplary screen shot of FIG. 34A, in a preferred embodiment a test bench builder 3405 is included for forming a graphical representation of a test bench. As used in this application a test-bench builder is an application that allows a designer to build a simulation of an embedded system by adding graphical objects (e.g., buttons, LEDs, LCDs, alpha-numeric keyboards, telephone keypads, register viewers, memory viewers, resource meters, etc.) to mimic a physical human-machine interface of an embedded system product. As examples, a keyboard interface 3410 may permit a user to input commands via the keyboard while an LCD interface may mimic the outputs of a physical LCD. This graphical test builder may be used to inject stimuli into the simulation and observe the system behavior. FIG. 46 is a block diagram showing a test bench interacting with a simulation engine. FIG. 47 is a flow chart illustrating a preferred method for a debug interface to negotiate a communication interface between a test bench control and a variable of the simulation.

Figure 34C:
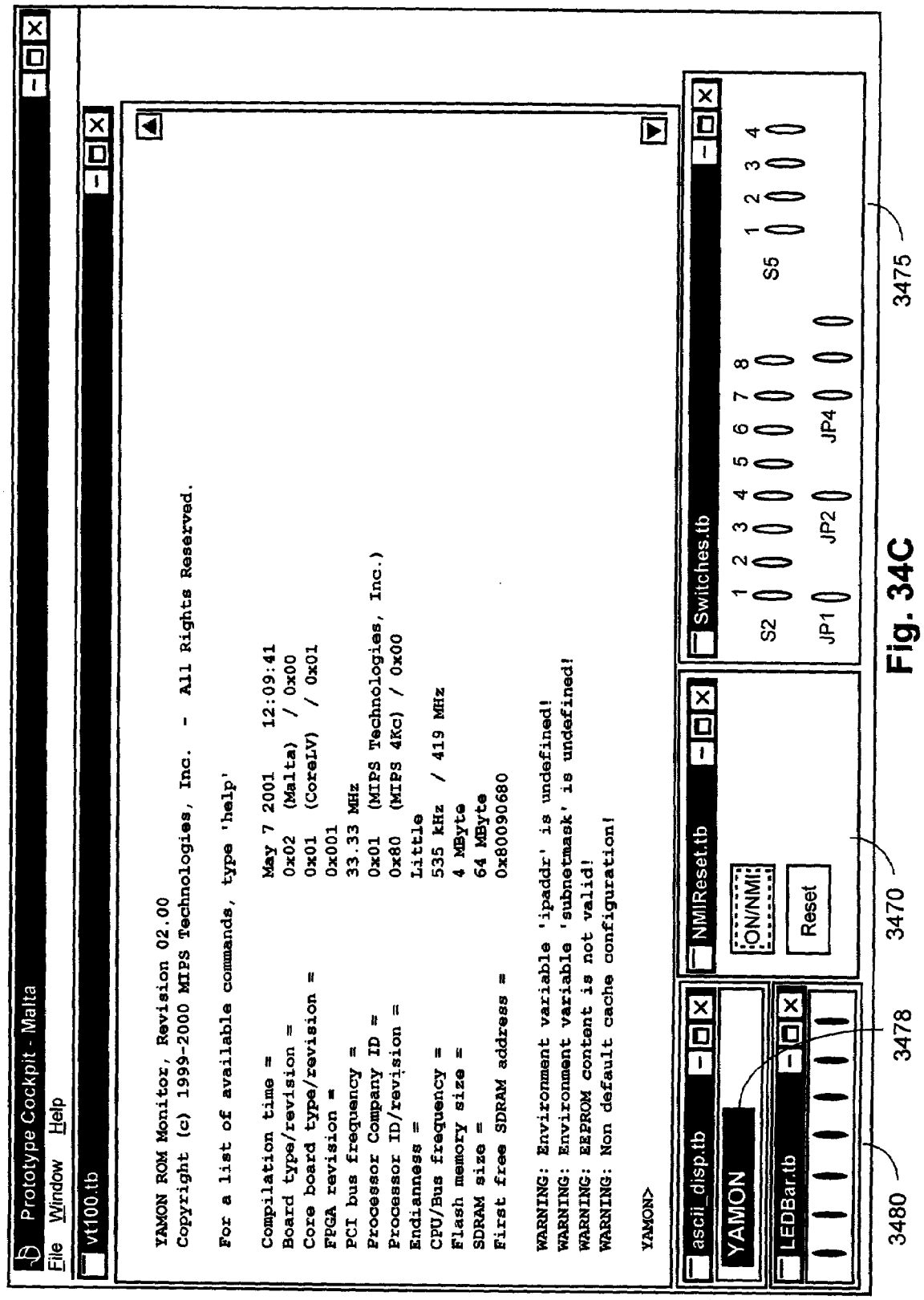
FIG. 34C is a screen shot of a virtual test bench.
Figure 35:
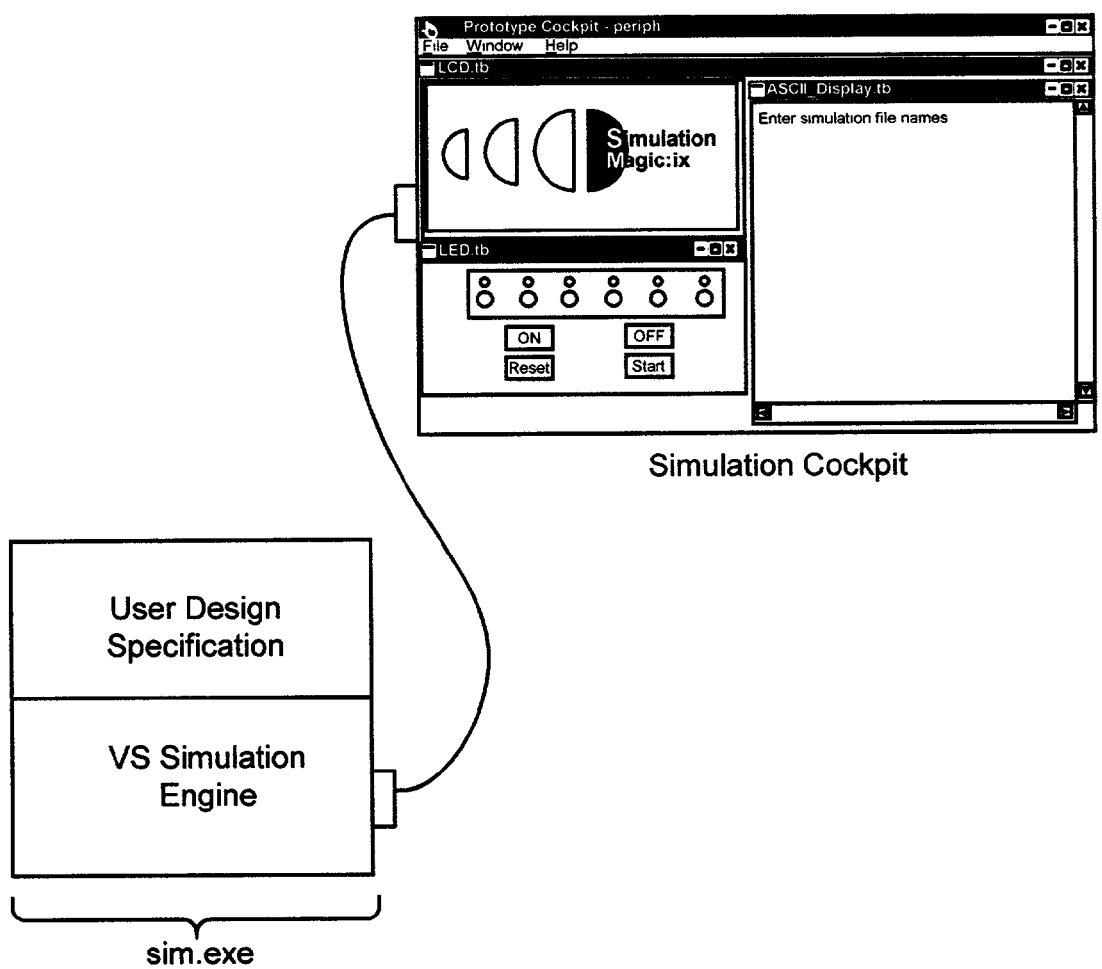
FIG. 35 is an illustrative diagram of the operation of a simulation cockpit.

Referring to FIG. 35, during a simulation of an embedded system, a simulation cockpit is preferably included that provides information on the status of a simulation and that loads and updates the test bench objects. Referring to FIG. 36A, a software debugger 3685 is also preferably included for loading and testing software that is executed on the virtual platform. The software debugger 3685 preferably includes means to establish break-points of execution of the software application and to view and modify processor and system resources such as the processor stack, registers, and memory. FIG. 36B shows an example of a software debugger interface window 3685 superimposed over a design window 3620 of a virtual embedded system. As shown in FIG. 34C, in one embodiment a user may select breakpoints of execution 3900 in the hardware description associated with the execution of the simulation reaching a command flow of a particular graphical construct 3980. Referring to FIG. 36A, note that the software debugger 3685, virtual test bench 3605, and design window 3620 of the embedded system may be viewed simultaneously. This provides the benefit that each interface provides a display and control of a different aspect of the system, which is particularly beneficial in developing low-level software routine or when integrating hardware and software partitions.

Figure 38:
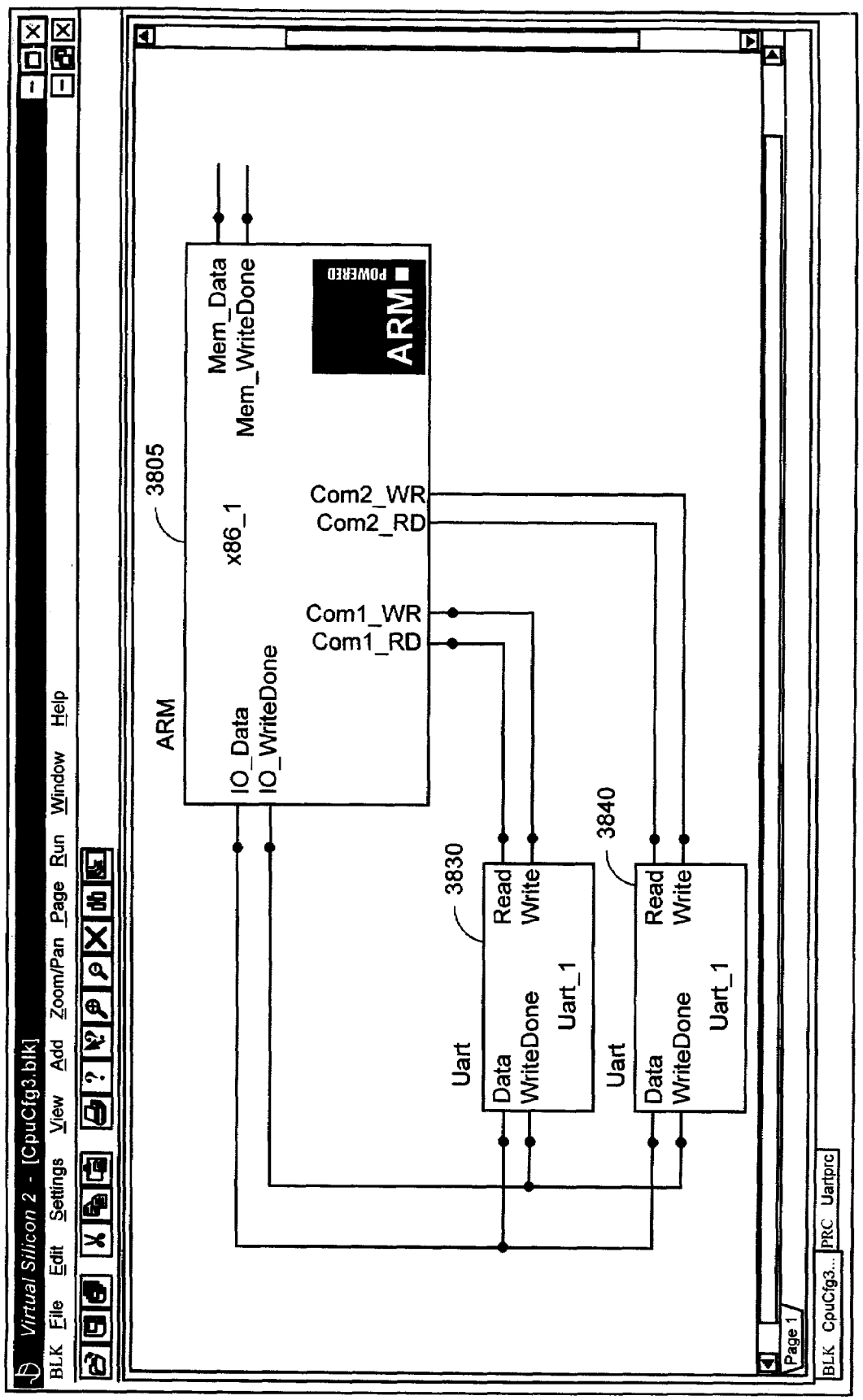
FIG. 38 is a screenshot of the top-level diagram of a (ARM) processor and two peripherals.
Figure 39:
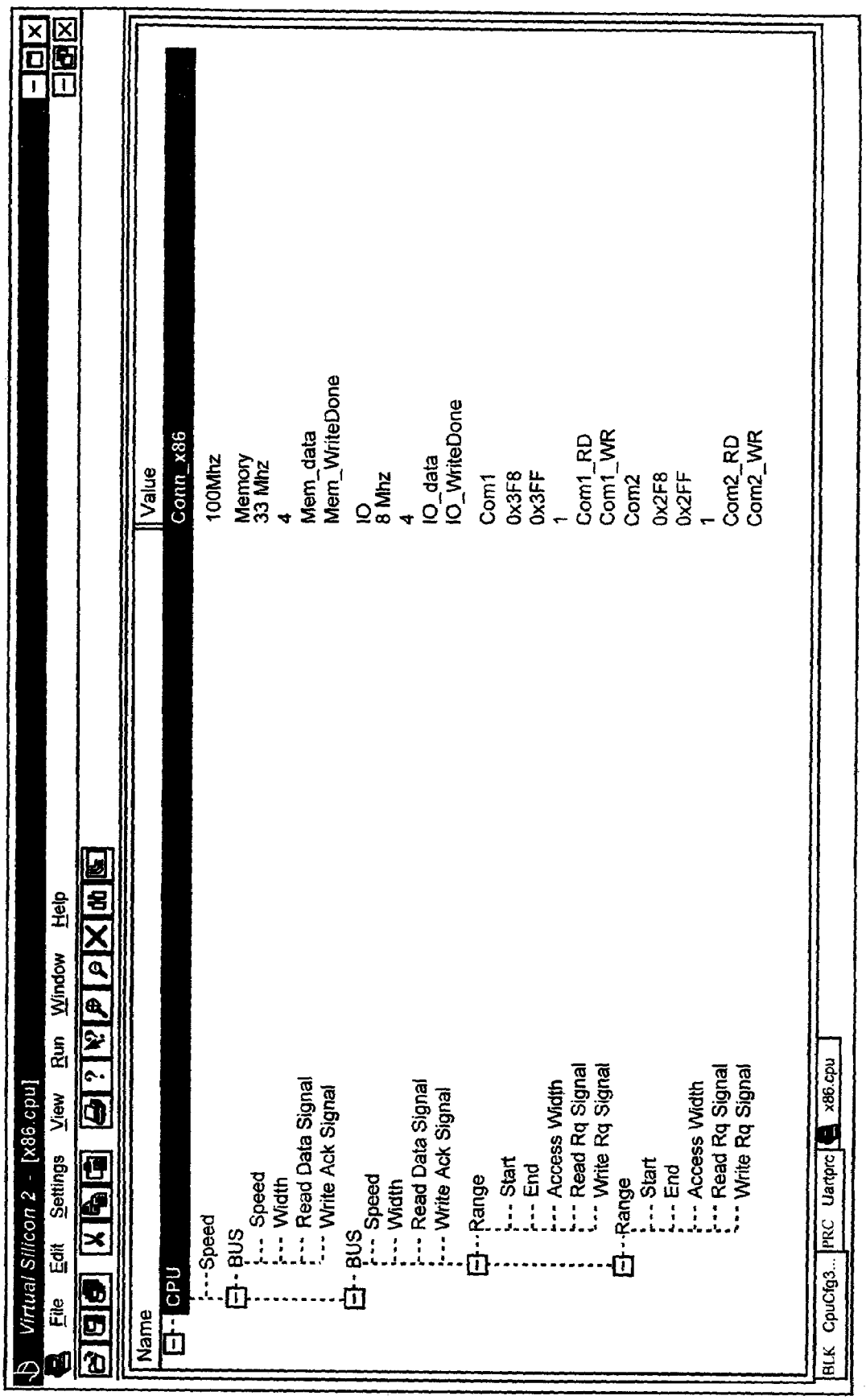
FIG. 39 is a screenshot of a processor IO Configurator Wizard.

As illustrated in FIG. 37, in a preferred embodiment a CPU 10 Configurator 3702 application is included to permit a processor simulator to map addresses spaces to peripheral virtual hardware models such that a processor simulator 3705 communicates read/write memory transactions to the appropriate addresses of virtual hardware such as hardware elements 3720 and 3730, while the virtual hardware sends interrupt signals to the appropriate addresses of the processor simulator 3705. As previously described, in a preferred embodiment, processor simulator 3705 is an instruction set accurate simulator. It will be understood that the mapping of read/write memory transactions and interrupt signals permits the implementation of a high-level model of the embedded system that is sufficient to execute a software application on the virtual embedded system. FIG. 38 is an screen shot of an exemplary processor symbol 3805 and two peripherals 3830 and 3840. FIGS. 39-40 are exemplary screen shots showing a Configuration Wizard and configuration data for coupling read/write memory transactions and interrupt signals between the FSM representation of the hardware peripherals and the ISA processor. Details of the CPU attributes, bus attributes, and other details may be included in the Configuration Wizard. Referring to FIG. 38, a configuration wizard permits a user to rapidly form a high level symbolic diagram of read/write and interrupt interactions that accurately maps signals between address spaces.

The IDE of the present invention permits a model of an embedded system to be created in a comparatively short time, e.g., within a few hours to a few days for many typical embedded systems. The short model development time is due, in part, to the graphical user interface, which in a preferred embodiment includes numerous features and a powerful FSM design language (MAGIC-C) for rapidly creating FSM models and forming re-usable models. However, another factor is that the level of abstraction is high enough to not require low-level hardware implementation details while still having sufficient software-centric details to execute a user application. This makes the IDE of the present invention consistent with developing a virtual prototype that is a useful functional representation of an embedded system within the comparatively small time allotted in typical projects for evaluating IP blocks and creating an architecture definition. The resulting virtual prototype can be used as a development target for embedded software early in the development cycle, e.g., before any physical hardware or prototype is available. Moreover, as described below in more detail, a user may load production quality code (e.g., binary code compiled for a specific processor) for execution on the virtual embedded system. The high level of abstraction facilitates sharing models of embedded systems with others. One aspect of this is that the level of abstraction is high enough that no hardware implementation details are disclosed, which makes it possible to provide embedded system models to others while still preserving proprietary trade secrets required to manufacture the final end-product. Additionally, the high level of abstraction makes it comparatively easy to understand the function and operation of the embedded system model, which facilitates sharing an embedded system model with others as an evaluation tool or for procurement of goods or services related to the embedded system design.

As described below in more detail, the high level of abstraction permits the simulation to execute a software application at an acceptably high rate of execution for software debugging, e.g., permits useful software debugging in the first few weeks or months of a development phase. Consequently, a virtual prototype formed in accord with the present invention may be used as hardware emulator for debugging software. Software execution rates in excess of several MIPS may be achieved with the simulation running on computer with speeds of 450 MHz and above. Thus, the virtual prototype is available early in the development phase (e.g., at the architecture definition stage) to function as a hardware emulator for developing and debugging software. By way of comparison, a conventional hardware emulator, such as a FPGA hardware emulator, typically arrives late in the development phase after hardware implementation details are developed (and is sometimes not used at all because of the high cost of a FPGA hardware emulator). Consequently, a virtual prototype in accordance with the present invention makes possible the concurrent development of both the hardware and software partition in the development phase. A large reduction in development time and/or improvements in quality are facilitated because a virtual prototype may be used for early software development, concurrent hardware and software development, and early hardware/software integration. An alternate way of describing these benefits of the present invention is that the creation of a virtual prototype that is a functional specification of an embedded system facilitates true co-design, since hardware designers can use the functional specification to develop hardware implementation details while software designers can use the functional specification to perform early evaluation, early development and debugging of software applications, and consequently early hardware/software integration.

Figure 41:
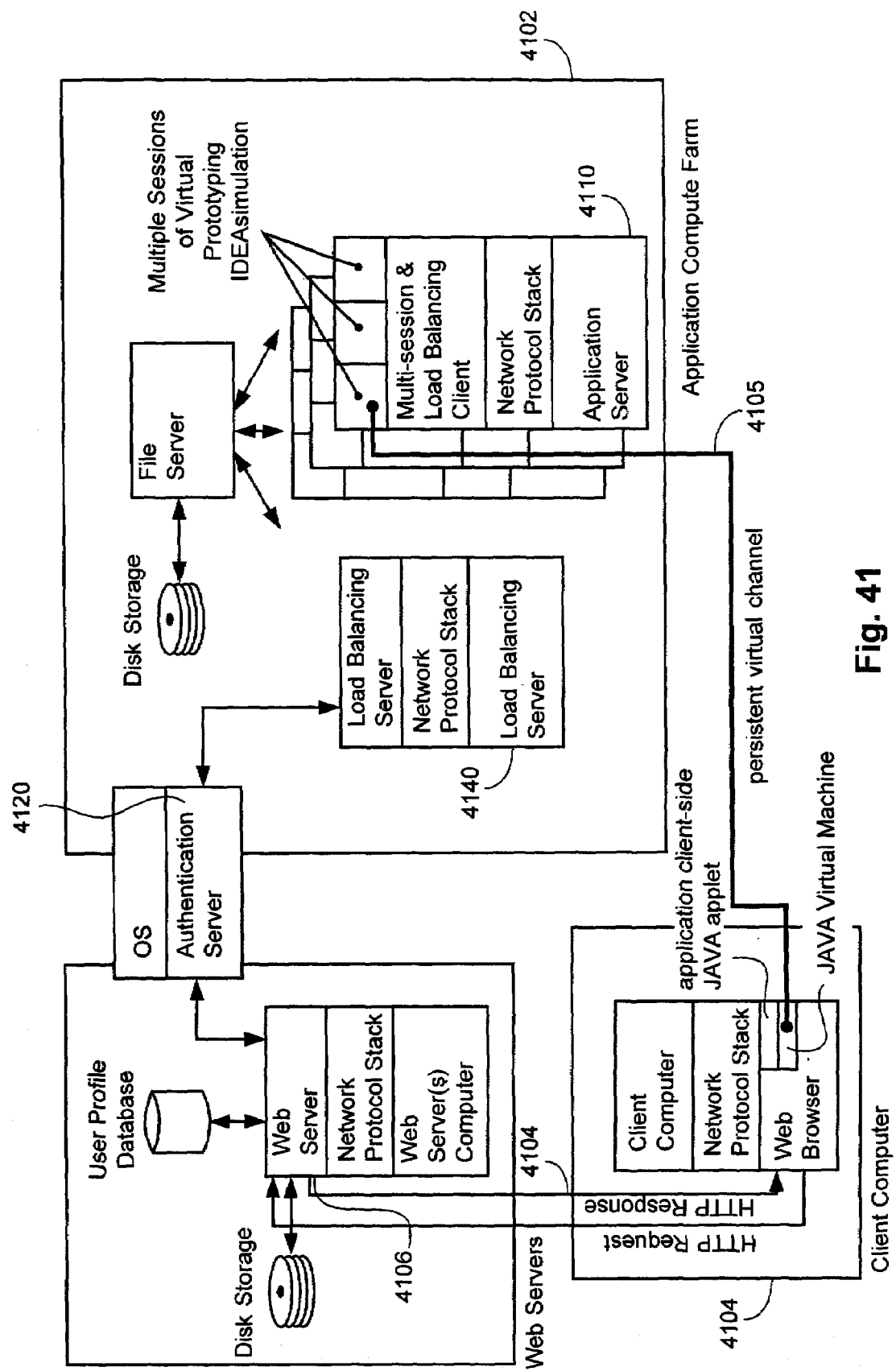
FIG. 41 is a block diagram of a client-server architecture and components for virtual prototyping.
Figure 42:
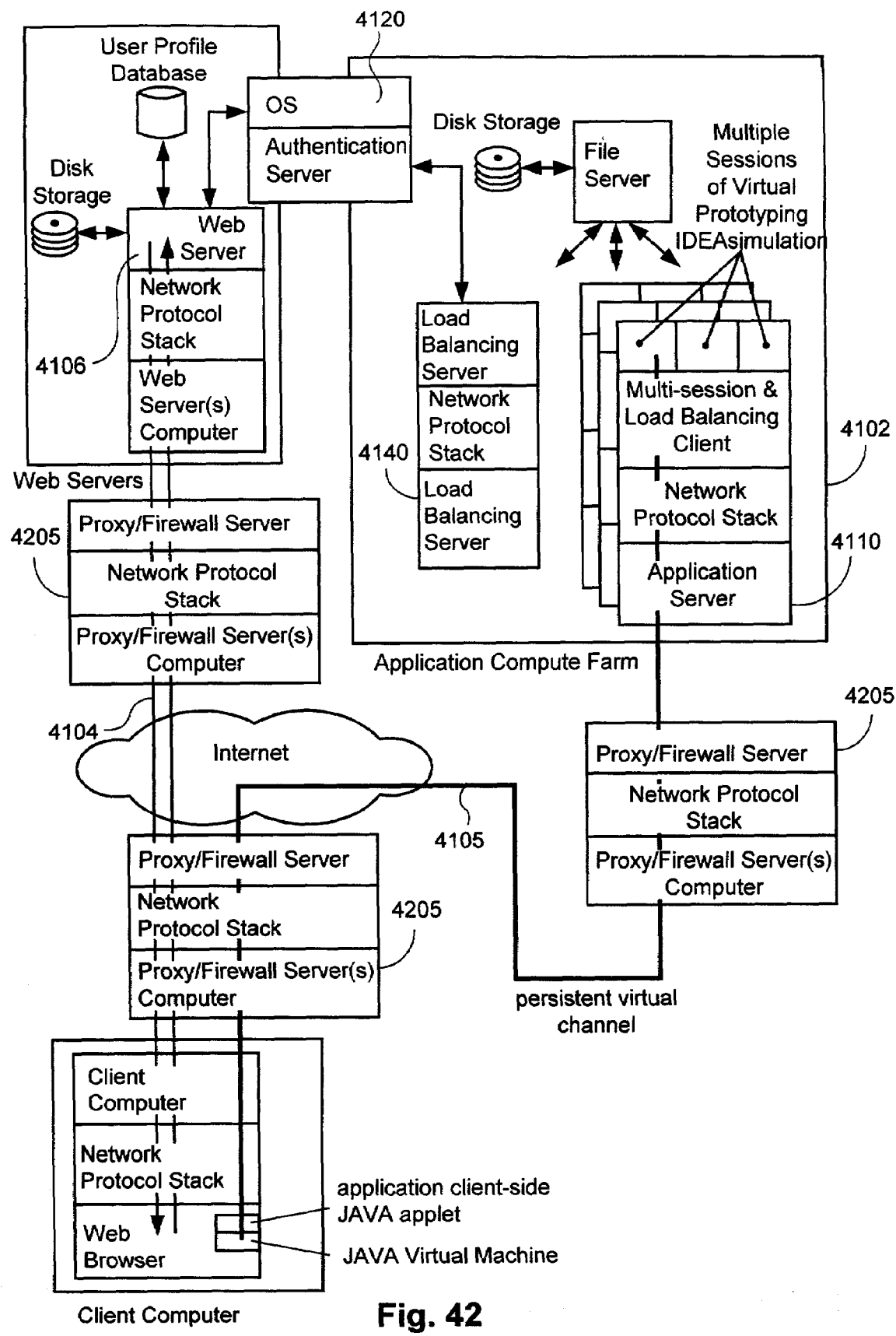
FIG. 42 is a block diagram of the client-server architecture and components for an Internet deployment of on-line virtual prototyping.
Figure 43:
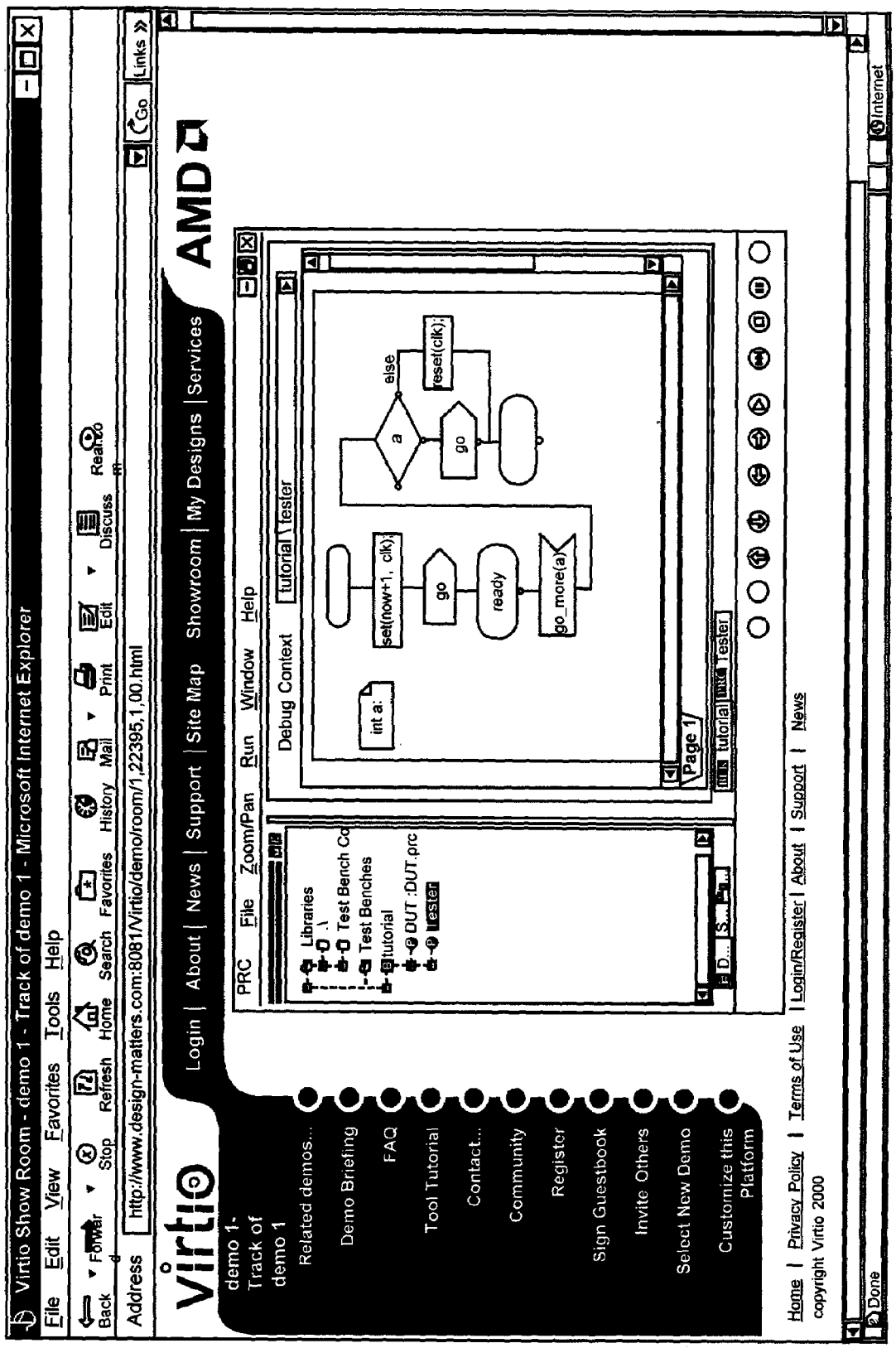
FIG. 43 is a screenshot of a virtual prototyping window deployed through a web browser.
Figure 44:
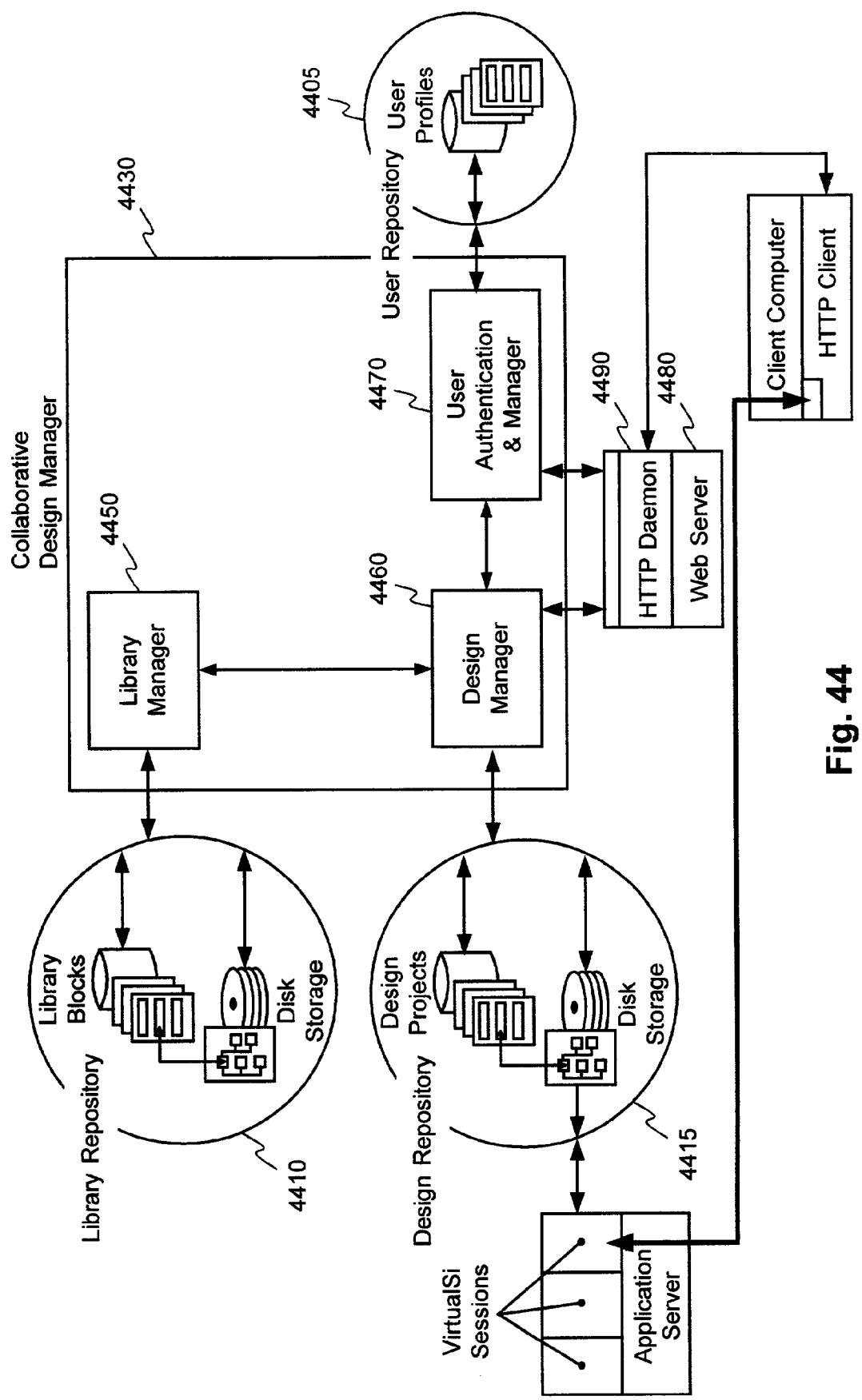
FIG. 44 is a diagram of a network architecture and software modules for collaborative design.

It will be understood that the IDE of the present invention may be coupled to a network server, such as a web server. FIGS. 41-44 illustrate a preferred implementation of the IDE of the present invention as a web-based service. As shown in FIG. 41, a persistent communication channel may be established between a client computer and a network server. FIG. 42 shows another implementation of a client-server architecture having increased security for web-based service. FIG. 43 is an exemplary screen snapshot of the IDE design window on the browser of a client computer. FIG. 44 is a block diagram illustrating a preferred web-based service including a collaborative design manager.

In one embodiment, the IDE is used to form virtual platforms for evaluating IP components. In a preferred embodiment, a web-based service is used to market embedded systems components or sub-systems (e.g., a processor core) by hosting virtual platforms on a central server. In one embodiment, a user can use a client computer to access the virtual platform and evaluate the virtual platform executing benchmark software selected by the user, e.g., by executing the simulation and observing the operation of the embedded system using the virtual test bench, debugger, and other tools. In one embodiment, the virtual platform is designed to emulate the function of a reference evaluation board used to evaluate a processor core or other IP component during an evaluation phase of an embedded system project.

Figure 48:
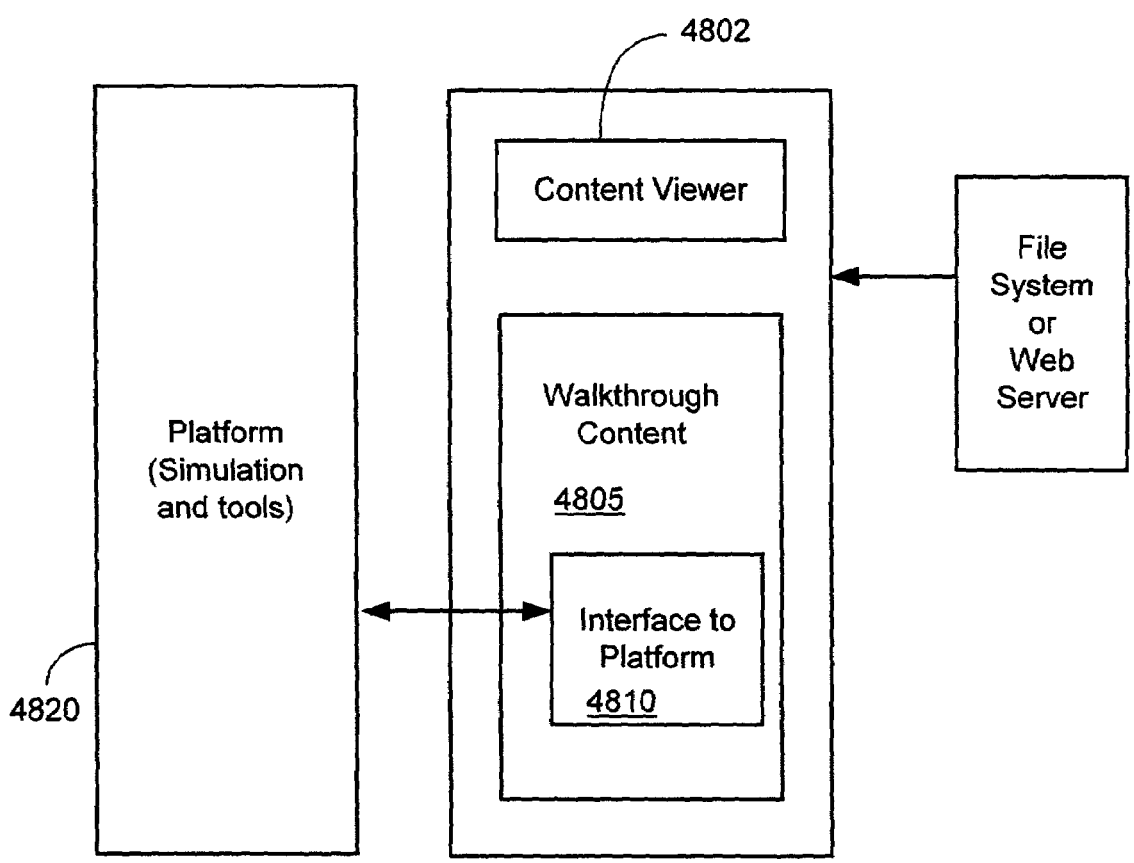
FIG. 48 is a block diagram of an interactive walkthrough embodiment.

Referring to FIG. 48, in one embodiment an interactive walkthrough content may be associated with a virtual platform to provide content for explaining the operation of a virtual platform. In one embodiment, additional marketing data is recorded and associated with a user's on-line usage an interaction with a virtual platform.

An on-line IP evaluation service provided benefits to both embedded system designers and vendors. From the perspective of embedded system designers, virtual evaluation saves time compared to conventional evaluation using physical reference boards because virtual evaluation is available on-line (eliminating ordering and shipment delays), because virtual test benches and other evaluation tools facilitate rapid evaluation, and because an on-line IP evaluation service permits IP from multiple vendors to be conveniently evaluated. From the perspective of IP vendors, virtual evaluation saves money and reduces the need for customer support. In particular, there is a low incremental cost to providing a virtual evaluation platform. Additionally, by monitoring the on-line usage and interaction with virtual platforms, IP vendors can obtain valuable marketing data on processor core types and hardware peripherals desired by embedded system designers during an evaluation phase.

Referring to FIG. 8, the IDE of the present invention may be used to form a simulation of an embedded system that may be used as a functional specification of the embedded system for the procurement of a good or service related to the embedded system. In a preferred embodiment, a virtual embedded system is created by a user, hosted on a web-based service, and used as an executable functional specification (i.e., as an interactive simulation that can be used to understand the function of the embedded system) for procuring a good or service related to the embedded system. In one embodiment, the executable functional specification may be downloaded. In one embodiment, a detailed design may be provided by the executable functional specification. In another embodiment, the level of hierarchy (e.g., the views of hardware, signals and pin symbols shown) are set at a part-level appropriate for a vendor. Additional information or annotation may also be included at the part-level. Test benches may also be configured to demonstrate the function at a part-level. In one embodiment, a virtual platform serves as a functional specification for procuring goods or services early in the development cycle before a working prototype is fabricated. In one embodiment, described below in more detail, the virtual platform is used as a basis of a request for quote.

A web-based service may also be used to facilitate the development of an embedded system project having one or more project members working in different geographical locations. In one embodiment, members of a user group have access privileges to a virtual platform hosted by the web-based service. Members of the user group may be granted privileges to run, copy, modify, annotate, or edit a version of the virtual platform. In one embodiment, a virtual embedded system (virtual platform) is created by a user group early in a development phase, e.g., shortly after the embedded system architecture is defined. Hardware engineers can then use the virtual platform as a basis for defining the hardware implementation while the software engineers can use the virtual platform to develop the software. Moreover, modification and design updates may be shared using a virtual prototype. In one embodiment, version control is included to permit members of a design team to create, edit, or modify a version of a virtual prototype. For example, a version of the virtual platform may be created to include a design update and then electronically communicated to other members of the design team (e.g., via a web-based service).

In one embodiment, the IDE of the present invention is used to provide a common, compatible design environment that facilitates the aggregation of IP components from different sources into a common service, preferably a web-based service. In particular, a preferred embodiment may include libraries containing virtual platforms and models of IP components from multiple vendors that are compatible with the IDE. This allows a user to select IP components of interest that they may add or, in the case of hardware models, modify for their own design. Additionally, libraries of reference hardware peripherals and sub-systems may also be included. Additionally, other libraries, such as a library of virtual test benches may be included. The aggregation of IP in a single design environment improves the efficiency of the design process by allowing embedded system designers to efficiently design a functional hardware description of an embedded system by picking and choosing IP components that are all compatible with the IDE. Moreover, the interaction of two or more IP components of a virtual prototype of embedded system may be rapidly evaluated in the IDE, which is typically not possible using conventional physical reference evaluation boards which are developed and manufactured for a single IP vendor.

Further details of various aspects of preferred embodiments of the present invention are described below in more detail in the following sections.

I. Preferred Finite State Machine Representation Of Hardware Components And Processes The hardware partition of an embedded system typically includes at least one electronic hardware component (also known as a hardware "element"), such as a peripheral hardware component, forming a portion of the embedded system. Several hardware components may be included in the hardware partition. In accord with the present invention, the electronic components of the hardware partition are preferably modeled as concurrent, communicating Finite State Machines (FSMs). Referring to FIG. 17A, a conventional approach to designing a finite state machine description of hardware includes forming a state diagram and creating a state table of the state transitions. This model describes a system as a set of interacting machines, each having a local state. At an initialization time (t=0), all FSMs start executing from their Start construct, being the explicit entry for an individual FSM. The behavior between the Start construct and the first State construct represents the initialization behavior of the FSM. At t=0, this behavior is executed for each FSM, until all FSMs reach their first State. The actual execution and progress of time start from that point on. In a preferred embodiment, the FSM models have process-level concurrency, inter-task communication, hierarchy, at arbitrary levels of nesting, and real-time support, by means of clocks and timers.

A preferred embodiment of the present invention includes a design language to rapidly create finite state representations of hardware components and processes in a visually intuitive format and which have a sufficiently low simulation overhead to permit a high-speed execution of software. In a preferred embodiment, the design language is an object-oriented design language with graphical attributes that facilitate quickly assembling a FSM model of system from pre-existing component models.

One aspect of the present invention is a design language, preferably an object-oriented design language, to form FSM models of hardware components and processes. FIGS. 19A and 19B are a table of preferred graphical objects (described by the inventors as "graphical constructs") for forming FSM models of hardware components and processes. As described below in more detail, the behavior of each object includes a graphical component associated with the shape of the object and a textual component input by a user. The graphical objects shown in FIG. 19 have shapes that are a subset of the graphical shapes of the Specification and Description Language (SDL), such as the SDL-92 language, and preferably combined with the ANSI C/C++ language to permit a user to define the behavior of a task construct. The Specification and Description Language (SDL) is a tool described by the international telecommunications union (ITU) for the specification and description of communication protocols in telecommunications systems. Conventional SDL provides a Graphic Representation (SDL/GR) and a textual Phrase Representation (SDL/PR), which are equivalent representations of the same semantics. In SDL a system is specified as a set of interconnected abstract machines that are extensions of the Finite State Machine (FSM). SDL permits a FSM model to be described as a directed graph of connected graphical objects (known as "symbols") expressing an extended finite state machine. The behavior of an SDL object is governed by its shape (which defines aspects of the function of the object) and textual semantics associated with the object (e.g., typically input inside of the graphical object). SDL includes a start object, state object, input object, state objects, text objects, and output objects. Details of SDL-92 are described in the book "Systems Engineering Using SDL-92," by Anders Olsen, Birger Moller-Pedeson, Rick Reed, and J. R. W. Smith, (Elsevier 1994), the contents of which are hereby incorporated by reference.

Conventional SDL, which was developed to describe communication protocols in telecommunications systems, has several drawbacks that limits its usefulness for designing hardware elements and processes for embedded systems. First, conventional SDL lacks language concepts for describing electronic hardware. Second conventional SDL includes semantics for described the behavior of complex communication systems that do not apply to the hardware design of conventional embedded systems. These complicated semantics increase the learning curve for conventional SDL. Third, conventional SDL has a high simulation overhead. The simulation overhead is about a factor of 100-to-1000 times larger than desired. The large simulation overhead of conventional SDL, results, in turn, in a corresponding reduction in the execution speed of a FSM simulation.

A preferred embodiment of the present invention includes a design language developed by the assignee of the present invention and known by the trade-name of "MAGIC-C". One aspect of MAGIC-C is the elimination of features of SDL required for telecommunications applications that are unnecessary for modeling hardware in order to reduce the simulation overhead. In accord with one embodiment of the present invention, the elimination of unnecessary aspects of SDL results in an object file of a hardware description having a low simulation overhead, e.g., a simulation overhead that is estimated by the inventors of the present application to be about a factor of 100-to-1000 lower than conventional SDL.

Many aspects of conventional SDL can be eliminated or modified to adapt SDL for describing the hardware of an embedded system. For example, conventional SDL processes include Inheritance and specialization of data types, state transitions and procedures (by means of virtual types, transitions and procedures). These constructs require a substantial simulation overhead, because they require dynamic lookup and checking. However, these are not very useful for a hardware simulation and may be eliminated. Similarly, conventional SDL includes polymorphism that is not very useful for modeling physical hardware and which thus may be eliminated to reduce simulation overhead. Conventional SDL also includes value returning (remote) procedures useful for software description but which impose a substantial simulation overhead because of the required stack parameter passing. Since these value returning features are not required for hardware modeling, they may be beneficially eliminated. Conventional SDL includes exported variables, called remote variables, which are not applicable to hardware modeling having encapsulated modules that communicate through signals and signal pins and thus this aspect of SDL may be beneficially eliminated. Conventional SDL includes features for dynamic process creation that requires extensive process tracking during simulation (e.g. in complex process tables), slowing down a simulation. However, for the case of hardware modeling, all the processes are known at compile-time such that dynamic process creation is not required. Conventional SDL, which was designed for telecommunication applications, also has a large simulation overhead because it uses virtual communication channels convey multiple signals that require dynamic routing to be performed during the simulation. However, virtual communication channels are not required for modeling hardware. Conventional SDL includes process identifiers (Pid) that are useful for referring to software processes (e.g. when executing on an operating-system), but which are unnecessary for hardware modeling. SDL includes provisions for spontaneous transition to model unreliable parts of a telecommunications system but which are unnecessary for a hardware simulation. Conventional SDL includes a prioritized signal-in construct require queue manipulation during simulation. However, this feature of SDL is unnecessary for a hardware simulation using a FIFO based queueing. Conventional SDL includes continuous signals and enabling conditions, which incur a very high simulation overhead because these signals need to be continuously updated and monitored for a triggering condition. These can be eliminated for a hardware simulation of an embedded system. Conventional SDL also includes services. A service differs from a process in that it does not execute concurrently with other services in the same process, but rather is implemented as part of the process' behavior. These can be eliminated for a hardware simulation. Conventional SDL includes features for creating parameterized types. In conventional SDL, signals, processes and services can be parameterized, making their actual type only known at run-time. This induces tremendous simulation overhead as it requires checking of the value and range of the parameters at run-time. In hardware modeling, all the types are known at compile-time making a parameterized type feature unnecessary. SDL also includes user-defined operators, which are not needed for hardware modeling.

In a preferred embodiment of a design language having graphical symbols adapted from SDL, the ANSI C language is used to specify the behavior of a task construct. In a preferred embodiment of the present invention, a task construct is restricted to a formal specification in ANSI C. ANSI C is widely used by embedded system designers and has a minimal learning curve for users, which is important for quickly composing new systems/models. Additionally, ANSI C has high-quality optimizing compilers/tools, which make the use of ANSI C to define task behavior compatible with a high-speed system simulation.

In a preferred embodiment of the present invention, the design language includes constructs for Symbols and symbol pins. The modeling of hardware modules is facilitated by the ability to create symbolic representation of hardware module that has representation of physical pins. One benefit of a Symbol is that Symbols can have multiple instances, supporting re-use of models and stimulating the quick development of emulators. These constructs are useful for encapsulating aspects of behavior so they can be re-used easily as library elements, stimulating the rapid composition of new hardware emulators. Also, it allows for intuitive modeling of connected hardware components in a hardware architecture, facilitating the rapidly composition of new emulators. Pins are used to connect symbol components with each other, or with the instruction-set simulator, to pass the memory transactions to the peripheral models.

In a preferred embodiment described below in more detail, a static compile-time parameter scheme is used for blocks, processes and symbols. A static compile time parameter reduces the simulation overhead, since parameters do not need to be calculated during the simulation.

Figure 18:
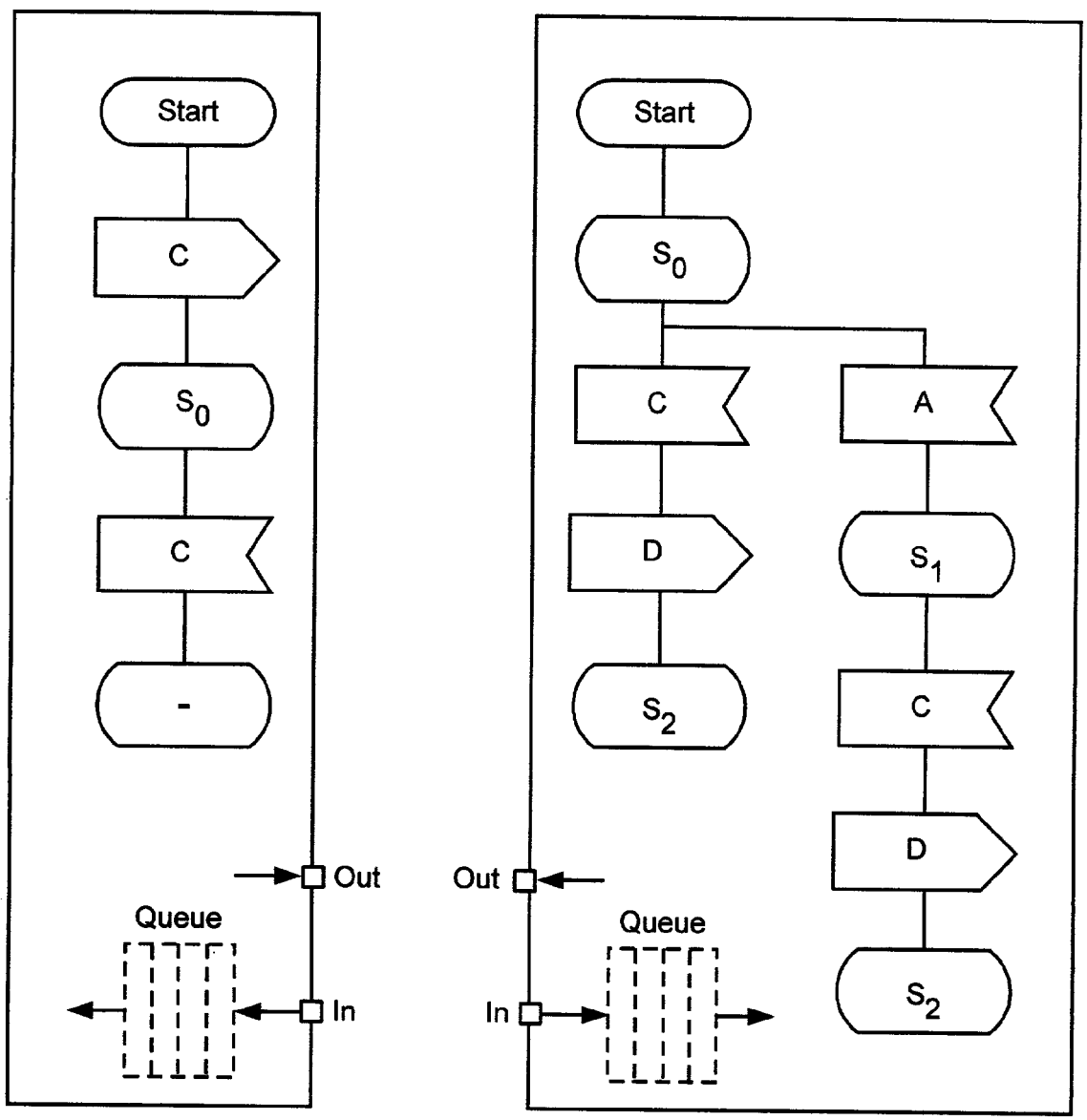
FIG. 18 shows two communicating finite state machines with implicit signal queues explicitly drawn.

FIG. 17B shows an example of a finite state machine using a sequence of graphical object (hereinafter "constructs") that has a graphical symbol portion and a textual portion. A plurality of graphical constructs is preferably included with the shape of the object defining a behavioral attribute or function of the object. The textual portion of the graphical construct also defines the attribute or function of the object. As shown in FIG. 17B, a graphical object may be linked to other graphical objects as a sequence of execution (e.g., a command flow of execution from top to bottom in analogy to a conventional flow chart). As shown in FIG. 18, in a preferred embodiment hardware elements or processes may be represented as communicating finite state machines using a broadcast signal communication model. FIG. 20 shows an example of a hardware counter implemented as a sequence of graphical objects.

As shown in the screen shots of FIGS. 21-24, toolbars having icons representing the symbols of the graphical constructs and steps in the creation of the finite state machine representation are preferably included to facilitate the rapid creation or modification of finite state models. This permits a menu-driven method of forming FSM representation in which a graphical construct is selected from a window; text, variables, or code are associated with the graphical object, and the graphical object is then connected (linked) to other graphical objects. Referring back to FIG. 10, a graphical database and a behavioral database is configured to convert the graphical object representation of the FSM into an equivalent semantic from which code can be generated to represent the hardware specification.

FIGS. 19A and 19B comprise a table showing a list of preferred graphical constructs for forming FSMs. A preferred graphical symbol and function of each construct is shown. A Declaration construct 1902 is a construct used to define local variables and signals. A Start construct 1904 defines a starting point of the finite state machine execution at the initialization time. A Task construct 1906 is an execution block containing at least one ANSI-C statement to be executed. A State construct 1908 defines a location where the finite state machine waits until a triggering signal is received. A Decision construct 1910 directs a flow of execution based on the result of the expression evaluation inside the decision construct. A Signal-Out construct 1912 is used for sending of a communication signal. A Signal-In construct 1914 is used for receiving a communication signal. A Connector construct 1916 is used to connect the control between designs spanning over multiple pages. A Symbol construct 1920 is used to capture design hierarchy and structure. Pins are includes on the outline of the symbol construct 1920 for communication of signals. A Block construct 1922 captures design hierarchy and structure. A Block communicates through signals expressed by signal name. A Block can contain multiple processes. A Process construct 1924 acts as a leaf node in the design hierarchy describing a single finite state machine.

In a preferred implementation of the present invention, objects can be grouped into larger units. As shown in FIG. 28 this permits a top-level block diagram to be created which can be nested at different levels of hierarchy to show the functional aspects of the block at the desired level of detail. Referring to FIG. 29, this permits high-level diagrams of the embedded system to be formed with a sufficient level of detail and textual description to provide an intuitive understanding of the function of the system at a desired level of hierarchy. This introduction of hierarchy allows powerful abstraction and hiding of low-level details. In a preferred embodiment, hierarchy is created by defining Blocks, Processes, and Symbol constructs. A Block construct is a container for FSM Finite State Machines, and may be part of a larger block or process. Each Block may in turn consist of a Process or a substructure of Blocks. There is no specific behavior associated with a Block construct. Its behavior is the combined behavior of its underlying finite state machines. A Block construct may contain a Declaration construct, which in turn contain signal and variable definitions. FIG. 16 shows a Block construct containing a single Process construct, two Block constructs and a Declaration construct.

Hardware registers are declared as simulation variables in declaration blocks in a Magic-C design. Variables that need to be made visible in the test bench are are preferably implemented as C++ classes that implement specific Component Object Model (COM) interfaces that allow them to connect to test bench controls. They use operator overloading so they can be used in code as simple types. The operator overloading allows them to update the GUI each time their value changes. This allows them to be used in a very simple manner (like a primitive type), while giving complex functionality (updating the GUI).

The behavior of a Process is described as a FSM. When started, a Process executes its start transition and enters the first state. The reception of a signal triggers the transition from one state to the next state. In transitions, a Process may execute Actions. Actions can assign values to variables, perform calculations, branch on values of expressions, call functions and procedures, and send signals to other Processes. A Process can define local variables, defined by the scope of the Process, by means of a Declaration. Initialization places all the Process FSMs into the Start Construct, as depicted by an oval. At that point, the Process executes the action of its start transition, as described in the Task Construct (depicted by the rectangle). In a preferred embodiment, a designer specifies the Task Construct behavior using plain (ANSI) C++, minimizing the learning curve typically associated with a new language or paradigm. Each Process receives (and keeps) signals in an (implicit) queue. In a State, depicted by a rectangle with rounded sides, the Process takes the first signal from the queue. In the example, the interrupt controller waits for an interrupt signal, as sent by one of the two peripheral devices. The Symbol for a Signal-In construct is a rectangle with an arrow pointing inward as either its left or right side.

The FSMs communicate with each other (and with the environment) by sending and receiving signals to each other. From each state, a state transition to another state can be made only upon receiving a signal generated by the environment or by another concurrent FSM. When making a state transition, the signal sending constructs (Signal-Out) and the Task/Block constructs on the state transition, are executed, and the FSM reaches a new state.

For communication, signals use a broadcast mechanism. In other words, signals are visible and accessible to all the Process FSMs, which have the signal defined in their scope. FIG. 18 has the implicit signal communication queues explicitly drawn for each Process FSM. All the broadcasted signals are received in these queues, to be popped by the FSM inside the Process.

Communication through signals can happen in two ways. First, for named signals, no physical connection needs to be made, by using the same signal name in both receiving constructs and sending constructs at different places in the design hierarchy, communication is established. Second, symbol interconnections may be used coupling pins on the perimeter of symbols to represent a communication link.

Clocks and timer operators are preferably included that are definable by the user to define clock/timing signals of interest.

Time progresses by waiting for the clocks and timers. In addition, broadcasted signals are received instantly by all Processes contained in the scope of the Block construct where the signal is defined. As such, communication is always completed in zero time.

Referring back to FIG. 11, in one embodiment the simulation engine has two queues of signals: the Event Queue and the Time Queue. Every time a signal is sent that has the Signal-Out Construct, signal is put in the Event Queue. When a Timer or Clock signal is scheduled to happen in the future (by using a command set (now+X, t)), the signal is put in the Time Queue, along with the time it should be triggered and scheduled. The simulation engine dispatches signals from the Event Queue until the Event Queue is empty. When that happens, the simulation engine pops the next signal from the Time Queue, sets the simulation time (now) to the time specified in the signal, and dispatches the signal. In one embodiment, two rules apply to simulations. First, if the event queue never empties, simulation time never advances. Second, time does not advance when using set (now+X,t), but when t is actually dispatched (with the signal being a Timer or Clock signal).

In a preferred implementation, Symbol Constructs can be created to represent a Block, a Process or a CPU, which can be selected by the user upon creation of a symbol. Symbols Constructs allow users to encapsulate behavior, and make it ready for re-use, as symbols can be instantiated over and over again. The communication of signals crossing the symbol perimeter is explicitly indicated by symbol pins on the perimeter of a symbol; this in contrast to Blocks and Processes where there are no pins, as the signal connection (with signal defined in higher scopes) is done by name, rather than by wire connection. An external pin interface is preferably made by means of a external signal declaration, as for example 'extern_signal in1(int);', and the Signal-In and Signal-Out constructs.

In a preferred embodiment, a Symbol Creation Wizard is included to facilitate the creation of Symbols. A symbol creation wizard is preferably configured to permit a user to create new symbols from scratch: in this case, the user specifies the name of the symbol, its implementation, and the tool will automatically create the symbol framework for an empty template. The Symbol Wizard preferably permits a user to wrap existing Blocks or Processes into a new symbol. For example, the symbol creation wizard preferably permit a user to point to an existing Block or Process followed by the tool creating the symbol framework linking the Block or Process pointed to as the implementation of the Symbol.

Secondly, the Wizard facilitates the creation of new symbol pins by offering a dialog window, where the user types in the name of the symbol and selects its location, and the Wizard takes care of the rest.

In a preferred embodiment, Blocks, Process and Symbols may be parameterized with different initial conditions. Parameters are special variables inside a Block, Process, or Symbol whose values can be modified on a per-instance basis without the need to re-compile. Parameters can also take on the value of other parameters. This allows the use of parameters that modify the value of several other parameters. Parameters can be seen as per-instance adjustment knobs. A parameter preferably has a parameter declaration. After declaring a parameter inside a Symbol, the parameter can optionally be annotated on the outline of a symbol and its instances. For example: To declare an integer parameter with default value 5 in the ANSI C language, the following parameter syntax could be used: VS_PARAM int Delay(5).

Design components can be packaged into symbols, to be stored in IP libraries. These IP blocks can be bundled and shipped together with their corresponding test benches, facilitating the testing of the IP, when integrating and re-using it. In one embodiment, the creator of a symbol is provided with parameters to control the ability of a user to edit the symbol. For example, in one embodiment the creator of a Symbol could select that the Symbol is non-editable and/or that the finite state machine or Process within the Block is non-viewable.

The above-described features provide the benefit that an engineer can rapidly design a finite state machine representation of hardware components and processes that has a comparatively low simulation overhead. Although the time required to create a FSM representation will depend upon the complexity of the hardware and the experience of the engineer, the present invention permits many conventional hardware components and processes to be typically modeled in time periods of a few hours or a few days, depending upon the complexity of the finite state machine. Moreover, since the FSM representation does not require low-level hardware implementation details, a FSM model of the hardware partition can be created extremely early in the design cycle, e.g., a few days or weeks after a processor has been selected and a high-level architecture definition of the system has been developed. Additionally, since the present invention permits FSM models to be rapidly created or modified, the FSM models may be used as an aid to define the system architecture. As one example of a way in which the present invention may be used to define a system architecture, several different versions of a virtual prototype may be created and evaluated to select a system architecture from the virtual prototype having the best characteristics. As another example of using a virtual prototype to define a system architecture, a virtual prototype may be modified until desired characteristics are achieved.

II. Preferred Processor Model

In order to debug software on a virtual platform, a high-speed processor simulator is desired. As previously described, in a preferred embodiment a processor core is modeled as an instruction set accurate simulator. An instruction set accurate simulator simulates the functions of a processor core that are visible to embedded system software, which permits binary code compiled for a target processor to be loading using a software debugger and executed using the instruction set accurate simulator. An instruction set accurate simulator is typically at least ten to twenty times faster than cycle accurate processor models that include details of the processor pipeline and many orders of magnitude faster than processor models including gate level implementation details.

The instruction set accurate simulator of a processor core is preferably optimized for speed of execution in a system simulation. In one embodiment, the models are hand-written C/C++ models for a particular processor core, with assembly routines for the critical portions to improve speed of performance. Conventional optimization techniques may be used to optimize the performance of the simulation engine. In particular, a performance analyzer program may be used to optimize the performance of compiled code, e.g., using an iterative technique. In some cases, the simulation engine may not need to call the signal processing function of every FSM, i.e., the simulation engine may be performing unnecessary work. In one embodiment the simulation engine is coupled to the code generator and checks if a FSM is receiving a signal that is sensible to the FSM before calling the signal processing function of the FSM. If the receiving FSM is not sensible to the signal, then the function is not called.

Referring to FIG. 37, in one embodiment, a CPU-IO Configurator application is used to facilitate an address mapping of virtual signals between the processor and the hardware peripherals. The CPU-IO Configurator's task is to serve as an interface between peripheral models and an arbitrary processor simulator. These associations ensure that the appropriate signal will be dispatched to the peripheral model when a particular address is read or written. This approach has a high level of abstraction that provides a desirable execution speed while providing sufficient detail to understand the behavior of the software partition interacting with the hardware partition.

In one embodiment, adding a processor simulator into a simulation is as simple as dragging the processor symbol from a library into the design window. An I/O Configurator Wizard (see FIGS. 39-40) will lead a user through the configuration of the processor and the attachment of the different peripherals, effectively shielding a user from all the underlying hardware and co-simulation interface details. In a preferred embodiment, an IO bus object is used to define data bus attributes.

FIG. 37 illustrates the communication between an arbitrary processor simulator and the virtual hardware. The solid arrows in the figure represent the transmission of signals between the processor model and the hardware simulation. The dashed arrows indicate the transfer of data through a well-defined application procedural interface. The meanings of these arrows are defined below.

A read signal is sent from the processor simulator to the hardware partition whenever the processor requires data from a peripheral. It contains the address where the read should take place. This address is used by the CPU-IO Configurator to determine the target peripheral for the read. Data will be returned to the processor through the data as described below.

A data method call is part of the IOBus object inside the CPU IO Configurator. It is used to send data from peripheral model to the processor simulator in response to a previous read signal. Typically, the peripheral model will return data to the CPU-IO Configurator in the form of a signal.

A write signal is transmitted from the processor simulator to the hardware peripheral whenever the CPU needs to write data to a particular peripheral model. The signal payload contains the target address in addition to the data to be written. The address is used by the CPU-IO Configurator to determine the target peripheral for the write.

A writeDone method call is an optional method call that may be used if the peripheral model wishes to acknowledge memory writes from the CPU. A signal acknowledging the write is first sent from the peripheral model to the CPU-IO Configurator. Logic in the CPU-IO Configurator then uses this method (part of the IOBus object) to notify the processor simulator that the write has been completed. This procedure is useful in synchronizing the peripheral model with the processor simulator, and is typically used to simulate variable memory write operation timing.

An interrupt signal is used to alert the CPU that an interrupt has occurred. It does not contain a payload or any other state information as it is expected that the CPU will manipulate the peripheral model of the interrupt controller to correctly service the interrupt. The name of this signal will vary according to the processor model being used.

An interrupt ack_signal is sent back to the CPU after an interrupt as a notification that the interrupt for this source may be cleared. The name of this signal will vary according the processor model being used.

An auxiliary side-band signal is processor-specific and includes general purpose I/O pins, external registers, co-processor interface, etc.

Whenever a user creates a new virtual prototype, a new instance of IO Configurator is preferably created to coordinate the read/write and interrupt transactions. Referring to FIG. 38, FIG. 38 an IO Configurator block that is attached to two peripheral blocks. For each peripheral to be connected to the CPU-IO Configurator, an address range (i.e. start and end address) as well as a pair of signals (one for read, one for write) needs to be created inside the IO Configurator. This will map memory transactions within that range to the specified signals, and the pins with the same names as the signal pair. To perform this action, a double-click on the IO Configurator symbol, is preferably performed and the Configurator Wizard appears as depicted in FIG. 39. This Wizard simplifies the setup of CPUs considerably, and allows easy configuring of bus speed, type of processor busses, interrupt interaction, fixed- versus non-fixed memory timing, and signal naming. Pins are preferably coupled to the CPU-IO Configurator symbol for each signal which will be dispatched to a peripheral. Pins may also be added to a peripheral for data returned to the CPU (as described above for the data signal) and for any write acknowledgements (as described above for the write signal).

III. Preferred Integrated Design Environment GUI For Designing Virtual Prototypes As previously described, in a preferred implementation of the present invention a menu-driven graphical user interface having point-and-click and drag-and drop features is provided to facilitate the rapid creation or modification of virtual prototypes. It will be understood that the benefits of the preferred menu-driven graphical user interface include reductions in the time required to create, edit, and modify a virtual prototype and IP components. The preferred GUI of the present invention permits a designer to design a high-level model of a virtual prototype in a short period of time, e.g., in as little as a few hours in some cases.

FIGS. 12-14 show some of the aspects of a preferred sequence of interactions for designing a virtual prototype. Referring to FIG. 12, in one embodiment, this includes the following sequence of tasks: 1) Providing the user the option to Start A New Project 1204, 2) or to Open an Existing Project 1202; 3) Create (or Modify) System Design Specification 1210; 4) Create (or Modify) Testbench(es) 1220; 5) Code Generation 1230; 6) Simulation and Debugging 1240, and add Save and Close Project 1245. Steps 1210-1240 may be repeatedly executed until a design in the current project meets the requirements, and when all bugs and errors have been removed. Note that the creation of test benches can also be performed after step 1230. In one embodiment, upon opening the design application, a user is presented with the option to start a new design project, or to open an existing project. When the former is chosen, the user specifies the name of the design project, the system sets up the full fill structure and database components. When an existing design is opened, the user can choose to modify the design, or to go straight to the code generation stage. Creation of a new design (or modification of an existing design) involves: (1) the creation of a new Block, Process or Symbol 1310, or (2) the use of existing blocks 1330 which can be taken from an arbitrary number of design libraries. The first step consists of creating the Block, Process, or Symbol outline 1315, followed by the specification of its implementation 1320. For the use of existing elements, the user attaches the libraries to his project 1335, browses the libraries, and instantiates 1340 the Symbol, Blocks, or Processes from the Library he wants to re-use. After placing the Symbols, the user needs to add the connections between the symbols to allow them to exchange signals. Alternatively, they can connect symbols using 'signal-connection-by-name', the same mechanism Blocks or Processes use to exchange signals.

New test benches can be created or existing test benches can be modified. The former consists of first opening 1360 a new test bench in the test bench editor, and then adding 1362 and configuring 1364 one or more test bench controls consecutively. In a preferred embodiment, a test bench control is a single ActiveX entity, which can be used to interact or to display a specific aspect of a design, like injecting signals or viewing variable values.

Code generation 1230 consists of selection the global and local project compilation, linking and output settings, followed by the actual C++ code generation for the simulation specification, and the compilation and linking using an external standard C++ compiler.

Referring to FIG. 14, the simulation and debugging 1240 includes the following steps: attaching and removing of test benches to the design 1405, depending on which viewing aspect a user is interested in, starting of the simulation 1410, with optionally connecting to a processor model (i.e., an instruction set simulator) if a CPU symbol was instantiated in the design; setting and/or removing of breakpoints 1415 in the debugger IDE window. The user then has the option to ran the simulation 1430, to run it for a specific number of cycles 1445, or to single-step 1446 the design. However, at all times, the user can abort the simulation 1285, which effectively ends the simulation. To the same extent, when the simulation is running, the user can break the simulation 1435, after which he later can continue from that point on. In a preferred embodiment, during the simulation the user the user can optionally view the signaling results of the simulation in the Waveform viewer 1490.

Figure 22:
FIG. 22 is a screen shot showing a preferred standard toolbar for the integrated design environment.
Figure 27:
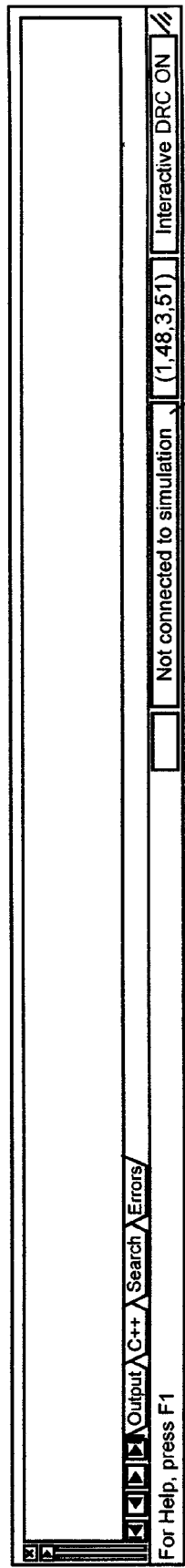
FIG. 27 is a screen shot of a message window showing different message the status bar.
Figure 23:
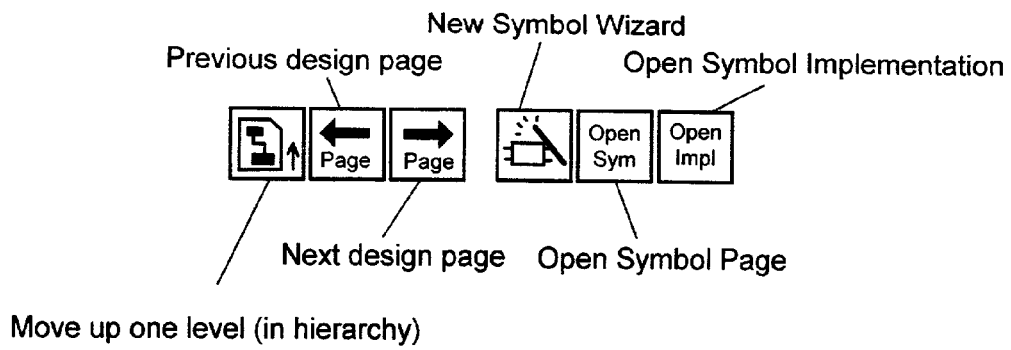
FIG. 23 is a screen shot of a preferred navigation and symbol editor toolbar.
Figure 24:
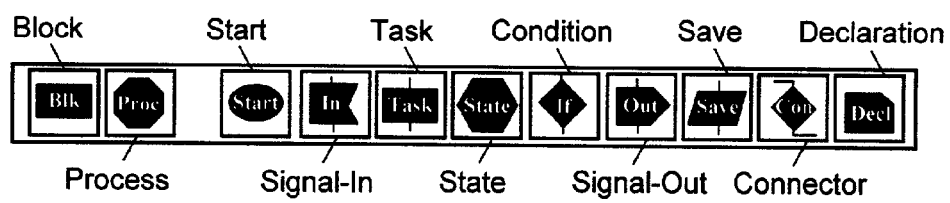
FIG. 24 is a screen shot of a preferred toolbar for forming finite state representations of hardware components.
Figure 25:
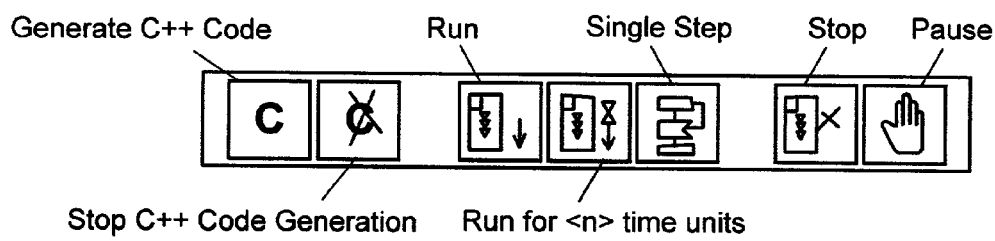
FIG. 25 is a screen shot of a preferred compiler debugger toolbar.
Figure 26:
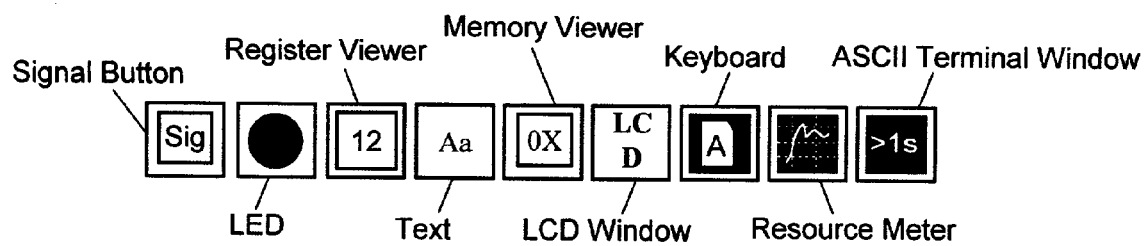
FIG. 26 is a screenshot of a preferred testbench builder toolbar.

A Design Window preferably permits the display of several views of the design including Blocks, Processes, Symbols, the symbol editor, and the Test Bench Builder. FIG. 21 shows a preferred design window format having toolbars with menu buttons to facilitate the design process. As shown in FIG. 22, a toolbar is preferably included to supports general functions such as opening files, cut and paste, zooming, and printing. FIG. 23 shows a preferred navigation tool bar with the menu-buttons labeled. As shown in FIG. 23, a navigation toolbar is preferably included to assist a user to quickly traverse the design hierarchy and switch between different pages in a multi-page design. Additionally, menu buttons are included to generate new symbols (a Symbol Wizard button), to open a symbol shape, and to open a symbol implementation. As shown in FIG. 24, a MAGIC-C Graphical Construct Toolbar is preferably included that allows a user to add MAGIC-C graphical constructs (e.g., finite state machine representations) to the Design Window. As indicated by the icons on each button, a button for each commonly used graphical construct is preferably included to generate the graphical symbol of the construct in the design window. As shown in FIG. 25, a Compiler/Debugger Toolbar is preferably included to generate C++ code, and to control the running and debugging of a simulation. Examples of menu buttons for the Compile/Debugger Toolbar include a code generation button, a run button, a single-step debugging button, a run for n cycles button, a stop button, and a pause button. As shown in FIG. 26, a Test Bench Builder Toolbar is preferably included to represent the test bench controls, such as a LED, LCD, memory viewer, ASCII terminal window, resource meter, or signal button, and the test bench builder, allows a user to quickly add these controls to a test bench. A Symbol Editor Toolbar (not shown) is also preferably includes to facilitate the symbol manipulation functions, to edit and create new symbols using a Symbol Wizard to reduce the symbol creation to a couple of mouse clicks. As shown in FIG. 27, a status bar is preferably included.

Referring to FIG. 30 a Design Browser 3000 is preferably included which comprises a hierarchy browser 3010, signal browser 3020, and signal connectivity browser 3030, allowing in a single click to quickly browse and navigate a design's hierarchy or signal connectivity. The Design Editor preferably supports multiple design browsers allowing the designer to quickly and easily traverse the design depending on interest.

The Hierarchy Browser 3010 shows the hierarchy of a design. For each instance of a document in the design (Process, Block, and symbol) there is an entry in the Design Browser. The Design Browser only shows the instance name of documents. Double-clicking on a specific instance in the Design Browser takes the user to the implementation of the instance.

The Signal Browser 3020 displays the signals that are present at each of the different scopes in the design. It also shows how those signals are being used (Signal-In, Signal-Out, Signal Save, Set Clock, Set Timer). Double-clicking an entity in the Signal Browser opens a Design window with the corresponding signal use. The Signal Browser shows the hierarchy of a design, since each level has its own scope. For each instance of a document in the design (Process, Block and Symbol), there is a "scope" entry in the Signal Browser. An example is given in FIG. 30. FIG. 45 shows a table describing the meaning of each of the icons in the Signal Browser:

The Signal Connectivity Browser 3020 shows the path of one signal in the design, indicating what the Processes are doing with the signal. It is called the Connectivity Browser because it shows the relationship between the sender of a signal and its recipients. It is particularly useful when symbols are used, since the names of the signals connecting the symbols usually do not match the name of the signals, inside the symbols. The Signal Connectivity Browser 3030 is preferably used in conjunction with the Signal Browser. In one embodiment a signal is selected in the Signal Browser from a context menu entitled Show Connectivity. The selected signal is highlighted, and its path is expanded in the Connectivity Browser.

In a preferred embodiment, A Design Rule Checker (DRC) option gives the designer instant feedback on the syntax and semantic correctness of the created MAGIC-C design. The editor supports the powerful feature of back-annotating errors directly on the graphical MAGIC-C constructs when clicking on an error message in the IDE message window.

As illustrated in FIG. 31, A Library Browser is preferably included, as part of the Design Browser Window. Using this browser, a designer can explore different libraries that are currently opened in the design, and inspect which Symbols, Processes and Blocks they contain. By left-clicking on a Symbol, Block or Process, the construct can be opened directly and edited.

A library project manager is also preferably included. In one embodiment, the library is actually a directory and not a file. A design project has a list of libraries (directories or folder), and a primary library (which is the project directory—the directory where the project file resides). Library paths are stored relative to the project directory when they are a child or sibling directory. An example of the Project Library Manager is depicted in FIG. 22.

IV. Preferred GUIs for Debugging, Testing, and Signal Analysis

One benefit of the present invention is that hardware and software may be debugged early in the design cycle and at an execution speed that is fast enough to permit development and debugging of software. Additionally, as described below, the test bench interfaces permit signals or variables to be evaluated at key locations or on a virtual test bench to confirm the proper operation of the system. This further increases the ability of a software development engineer to perform meaningful development and debugging of software early in the design cycle. When performing a co-simulation with a processor model, both the software and the hardware can be debugged simultaneously, with the additional benefit that the designer has full observability into the peripheral hardware, i.e., internal signal can be analyzed which in a physical embedded system do not have pin-outs. The present invention also permits debugging in the hardware domain. Referring to FIG. 34C, hardware breakpoints 3900 can be associated with individual graphical constructs. The simulation can be stepped to individual hardware breakpoints 3900 or single-stepped through the command flow of the hardware FSM. Thus, this permits a form of debugging in which single-stepping can be performed in the hardware domain, while the hardware is fully operational using the FSM graphical debugger as part of the IDE. A conventional software debugger (e.g., an industry standard such as the XRAY from Mentor Graphics Corporation of Wilsonville, Oreg.) can be used to control the software execution (e.g., can be used to select the placing of software breakpoints and to inspect and modify the program stack, registers, and memory).

The IDE preferably features a high-quality C++ code generator, hiding all the details of generating simulation code and giving the designer the freedom to concentrate on the system functionality rather than on the construction of an efficient simulation. It generates C++ code for the FSM description, compiles the generated code, and links in the simulation engine, resulting in a compiled code simulation executable. In another embodiment, the generated C++ code of each symbol can be compiled into a dynamic link library (DLL), capturing the behavior of that component. At run-time, the loader in the simulation engine will load all of the DLLs of the components instantiated in the virtual prototype and start the execution. One benefit of using DLLs for components is that it facilitates the delivery and use of pre-packaged models of components. For example, a DLL may be used to reduce the compilation time of a hardware description. Another benefit of using DLL is that it facilitates storing IP models at a high level of security. The code generator generates a single C source file for every process or Block in a MAGIC-C specification. For a Process, the C source file implements the FSM using a skeleton build around a single 'switch (<state_name>)' statement. Every graphical construct is foreseen of a BREAKPOINT macro that will report the state of the FSM back to the editor (to be displayed during simulation) and to allow placing of breakpoints and single—stepping n the virtual hardware. In a running a simulation, test bench controls communicate directly with variables in the simulation. The simulation variables have functionality that allows them to communicate with graphical test bench controls.

In one embodiment, the code generator generates a static table of each simulation variable. This table is used by the debug interface to find simulation variables. Additionally, referring to FIG. 46, the table may be used in the executing simulation to connect test bench controls and variables. In one embodiment, the test bench editor allows a user to select simulation variables for test benches from the static table and signal names from a list of signal names.

In a preferred embodiment, debugging is fully graphical and interactive, and supports advanced features such as single-stepping, placing of breakpoints, and running for a specific number of cycles. Referring to FIG. 36, in a preferred embodiment breakpoints of execution 3900 may be associated with individual graphical constructs 3980 of a FSM, providing the designer detailed insight as to what is going on in the system. Breakpoints can be placed even while the simulation is running. Concurrent FSMs can be debugged simultaneously by placing them in different debugging windows.

Both single and multi-instance debugging of symbols is supported in which placing of a breakpoint inside a Symbol instance will either only stop at that specific instance, or at all the instances of the Symbol. In addition, a release build can be generated, which does not contain the debugging information and which is optimized for raw system simulation speed.

The breakpoint and single step'debugging support allows the designer to stop the entire system simulation at any point in either the software or hardware domain. When performing a co-simulation with a processor model, both the software and the hardware can be debugged simultaneously using the test bench, waveform viewer, and software debugger, with the additional benefit that the designer has full observability into the peripheral hardware, impossible to achieve when running the embedded software on a development board or on a FPGA.

Simulation executables can be built to either run within the IDE or run stand-alone. The stand-alone mode can be used for (customer) demonstrations or for shipping IP hardware blocks to potential customers for evaluation. Batch mode running is supported in this mode, which can be combined with the use of scripting files to stimulate the simulation.

Logging of simulation signals and variables is supported directly by the simulation engine, and can be selectively enabled/disabled on a per signal basis. Both logging to a file for off-line inspection and direct viewing in a separate Waveform Viewer tool, part of the IDE, are possible, as illustrated by FIG. 33. File format options include ASCII and VCD (Value Change Dump). The latter option allows the generation of test bench stimuli from high-level system models to test and verify hardware blocks being developed as part of the system.

In one embodiment, custom graphical test benches can be created using a Test Bench Builder tool and attached to a simulation, allowing the designer to customize the interaction with the simulator and observe specific specification variables. This tool allows for quick building of the human-machine interface of a system, e.g. the display and keyboard of a PDA, resulting in a natural way to interact with the simulation (rather than be means of off-line scripting files). The full aspect of a system, including hardware, software and man-machine interface, can be modeled within the same environment. In one embodiment, test bench controls preferably use Microsoft's Component Object Model (COM) standard to communicate with the compiled-code simulation executable.

Figure 34A:
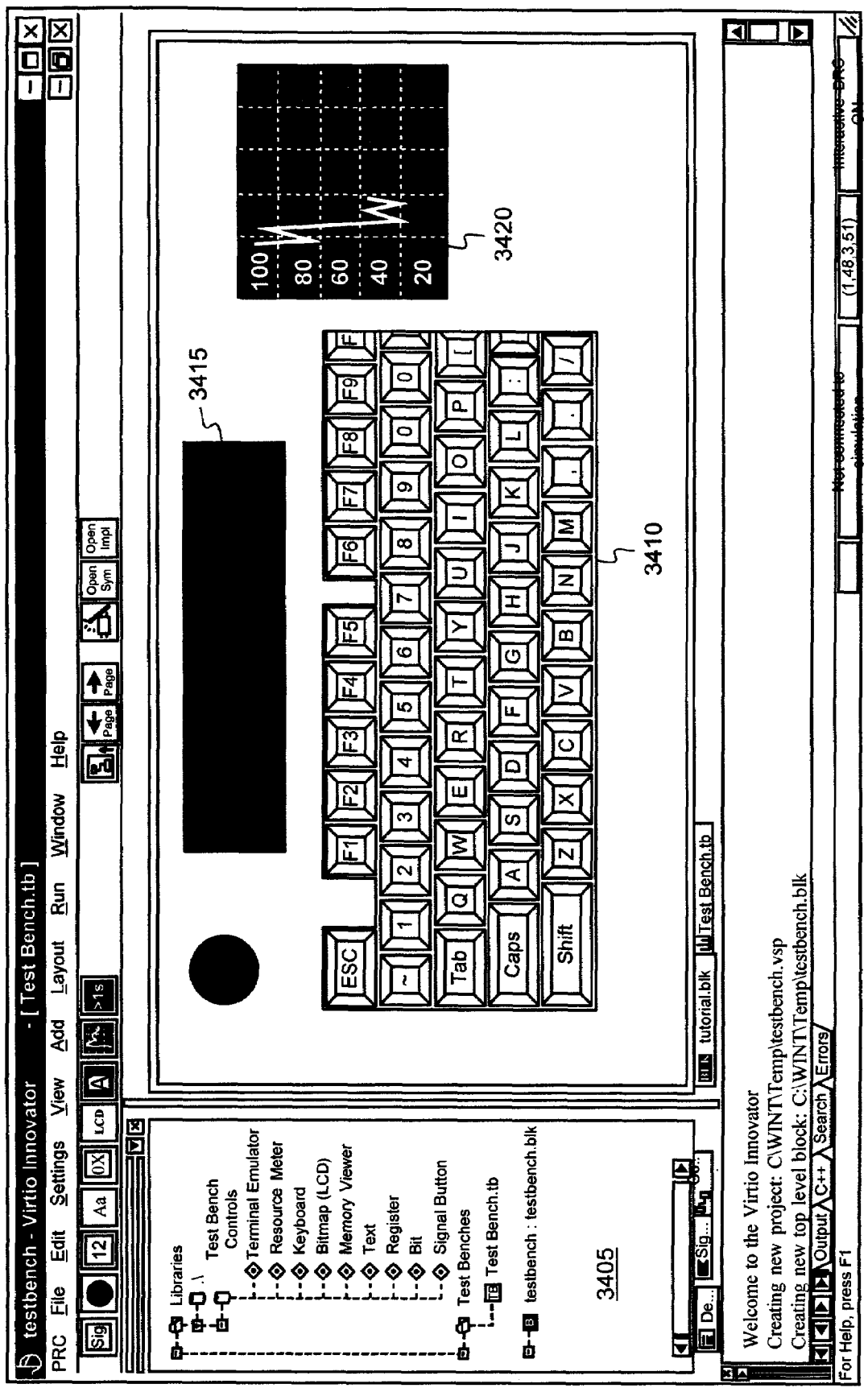
FIG. 34A is a screen shot showing a test bench editor window (right), and a test bench control library (left).
Figure 34B:
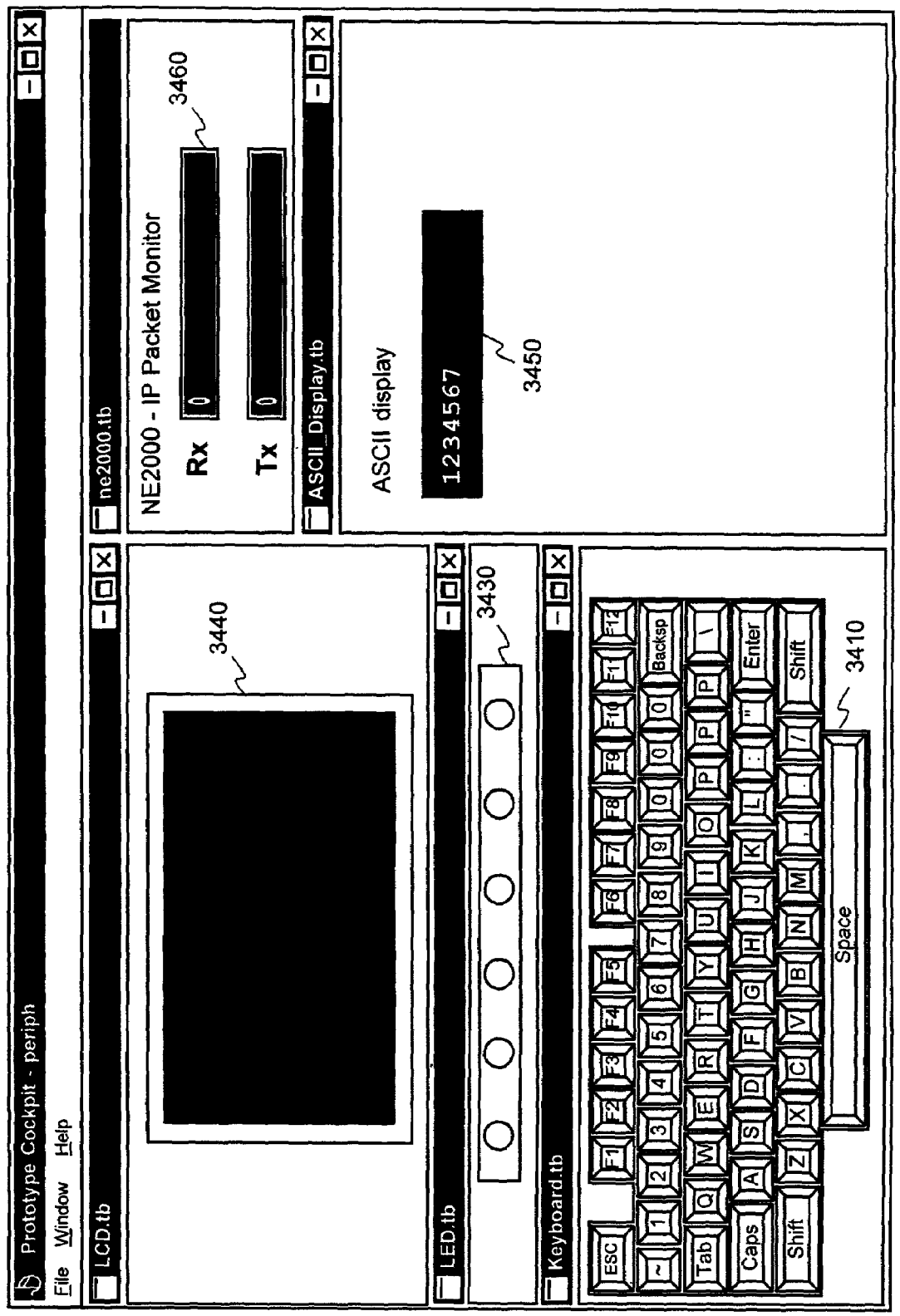
FIG. 34B is a screen shot of a virtual test bench.

As shown in FIG. 34A, in a preferred embodiment uses a drag-and-drop mechanism 3405 of test bench controls drastically shortening the time to create a test bench. Representations of commonly used test benches may be created and re-used. For example, a test bench may include a graphical representation of a keyboard 3410, a graphical representation of a LCD text screen 3415, and a graphical representation of a waveform viewer 3420. FIG. 34B is a screen shot of a virtual test bench having a keyboard, LEDs 3420, LCD screen 3440, ASCII display 3450, and IP packet monitor displays 3460. FIG. 34C is a screen shot of a virtual test bench that included graphical representations of buttons 3470, switches 3475, an ASCII display 3478, and LEDs 3480. In a preferred embodiment, attaching the test benches to a simulation requires no recompilation of the design. Moreover, test benches can be freely attached and detached from a simulation, depending on the designer's observation interest. A preferred test bench implementation uses the ActiveX technology developed by Microsoft. ActiveX® controls use COM technologies to provide interoperability with other types of COM components and services. Some preferred test bench controls include: signal buttons, LEDs, LCDs, Registers, Memory Viewers, a Keyboard, Text, and a Resource Meter.

In one embodiment, a Test Bench is a graphical interface representing a human/machine interface that may include a window portion representing a user input interface and a window portion representing a user display interface. The graphical interface representing a user input interface may include buttons and graphical objects representing a portion of a human/machine interface that allows a designer to send signals to the simulation by pointing and clicking on the button or object. For example, the test bench may include a graphical representation of a keyboard that a user may inject inputs to the simulation. The test bench may also include a window portion having a representation of a liquid crystal display, light emitting diode (LED), personal digital assistant (PDA), or other visual display of a human/machine interface. As one example, the user input interface may be used to control the operation of the simulation (e.g., Run, Step, and Break) and View and change the value of variables and memory. In addition, the simulation can directly interact with graphical objects to display text and graphics, such as a liquid crystal display (LCD) or screen for a simulation of a computer. Custom graphical objects can be created by the designer and used to extend the capability of the Test Bench Builder.

A simulation may have more than one test bench. One approach is to make a separate user interface and debugging test bench. For example, if a designer was designing a cellular phone, the user interface would be similar to a phone (with all the buttons the finished product would have), and the debugging test bench would give access to internal parts of the system.

In a preferred embodiment, Test Benches are created and edited in the Test Bench Builder tool in the IDE, and are added to the Design Browser as a part of a project. In a preferred embodiment, the simulation opens and displays each test bench window when running the simulation. A waveform viewer, as shown in FIG. 33 may be used to show signal occurrences of a variable on a time axis.

FIG. 46 is a block diagram illustrating some of the interactions between the test bench and the simulation. A test bench loader is implemented as a dynamic link library (DLL) linked to the simulation engine. It provides the entire GUI interface for a simulation (including the Simulation Cockpit main window). It runs in the same process as the simulation, but on a separate execution thread. When the simulation starts, the test bench loader is started and passes a pointer to the debug interface. It uses this debug interface for all communication and control of the simulation. When the test bench loader starts, it reads the project file from disk to get the names of the test benches. It then opens and reads each test bench file. In one embodiment the test bench is a MFC Document, using the document-view architecture. In one embodiment, the test bench editor and loader both use the same document and main view. The editor also places another transparent view on top of the main view to capture mouse and keyboard input to allow editing. The test bench controls are implemented as object linking and embedding (OLE) controls. They can be written with any development tool that can create OLE controls, such Microsoft Visual C++ using ATL (active template library).

In a preferred embodiment, test bench controls implement OLE property pages and must provide property pages to allow the user to configure them. Referring to the flow chart of FIG. 47, in one embodiment, each test bench control implement has an interface to allow it to be used with the simulation using the debug interface. A control normally also implements one or more other interfaces that are used to communicate with the simulation. To send signals and get simulation variables, each control needs a pointer to the Debug Interface. This is done with a COM interface to the connection point. The test bench asks each control for it's connection point interface, and uses this to give the control a pointer to the debug interface. The control can then use this to connect to a variable and to send signals.

V. Simulation Cockpit

It is desirable that a user has a convenient means to monitor the progress of a simulation. Referring to FIG. 35, a simulation cockpit is preferably included. As indicated in FIG. 35, a user design specification is linked together with the simulation engine and a test bench loader into a single executable. In another embodiment, components are linked together as DLLs, which the simulation loader loads before starting the execution of the simulation. The Simulation Cockpit will take care of the dynamic loading of the test bench control DLLs.

In addition, the generated simulation executable preferably contains the necessary hooks to talk to the Simulation Cockpit, allowing to display the user with information messages on the status and progress of the simulation on the one hand, and displaying the user test benches in separate windows.

The Simulation Cockpit preferably includes a message window to display information messages on the status and progress of the simulation. The Message Window displays textual information messages on the status and progress of a simulation, its connectivity state to processor models (i.e. in hardware/software co-simulation) and the opening of trace files.

Both system messages and user messages are displayed in the same Message Window. System Messages are generated by the simulation engine which is linked in with the compiled user's MAGIC-C design specification. The following messages exist: (1) Trace file status messages, (2) Co-simulation (with processor model) Messages. User messages are messages generated by the user, using a specific print instruction inside his MAGIC-C specification.

The simulation's test bench runs in the same process (but in a different thread) as the simulation, so communication between the test bench and a running simulation is very fast (the same as an indirect function call).

VI. Security Of IP Blocks

The present invention permits users to create models of hardware components and virtual platforms. It is desirable that users have a variety of security options that facilitate sharing virtual hardware components and prototypes with others. In one embodiment, the high-level models developed are delivered as packaged binary DLL objects, protecting valuable IP. In a preferred embodiment, the IP author can select to make the internals of a design invisible (what the inventors' call "black box models") at a selected level of hierarchy in the specification. For example, an IP author of an IP hardware sub-system may desire that others only be able to view the IP component as a symbol having pins for coupling signals to other IP components (e.g., as a "black box") whose operation is to be understood with respect to the output signals it generates in response to input signals. Alternately, as another example, an IP author may desire that other be able to view an IP hardware component as symbols and blocks within symbols but not at the level of individual graphical constructs. Moreover, the visibility of the function of IP components at a selected level of hierarchy can be accurately controlled by choosing the location and number of test bench hooks.

In addition, a user can specify a password for a specific design block or process allowing protect a person's or company's IP. Alternatively, this password can be used to provide access to only a limited set of (trusted) users, by handing out the key only to these users.

In the context of virtual components or platforms exchanged with others, a user preferably is permitted to select layers of hierarchy that are non-viewable or non-editable. For example, a user may desire to provide a virtual prototype of a hardware component having a complex FSM representation and to provide access only to a symbol representation with virtual pins.

VII. Network-Based Embodiments

The present invention may reside on a computer system coupled to a computer network, such as a local area network, wide area network, Intranet, or Internet. In a preferred embodiment, a persistent virtual channel is formed between the computer hosting the IDE and the client computer. In this embodiment, the simulation may be run on a high-speed network server. However, it will be understood that if the client computer has sufficient local resources that the simulation may also be run on the client computer, e.g., files from the network server (e.g., instruction set accurate simulators) may be transferred to the client computer for use on the client computer. Alternately, an executable file of a virtual embedded system may be formed on the network server and sent to the client computer.

Referring to FIGS. 5-8 and FIGS. 41-44, a preferred embodiment of the present invention is as a web-based service coupled to client computers either directly or indirectly via the Internet. In one embodiment, a network server of the web-based service runs the IDE application and the simulation, reducing the resources required by the client computer.

As previously described, the IDE of present invention includes a design language at a high enough level of abstraction to permit models of embedded systems to be rapidly created and also has a sufficient execution speed to evaluate develop, and debug software on a virtual embedded system. The level of abstraction is also high enough that hardware implementation details required for the final end-use product are not required, which minimizes the risk associated with sharing or providing access to models of embedded system components, sub-systems, and platforms. Consequently, these features permit a class of new web-based services for embedded systems that were previously impractical. Some of the applications of a web-based service in accord with the present invention include: providing the IDE as a service running on a high-speed server to facilitate the evaluation of IP blocks and the design of an architecture definition; generating virtual prototypes or virtual components that may be shared by user groups; aggregating IP from a plurality of suppliers into libraries and permitting a user to select and evaluate IP components or virtual platforms from the library; providing virtual test boards to market IP components; and providing a tool for a user or a vendor to create IDE files that may be used as executable specifications as part of a procurement process.

A preferred client-server implementation of a web-based service may be understood with reference to FIGS. 41-42 and 44. Referring to FIGS. 41-42, in a preferred embodiment a persistent virtual channel 4105 (e.g., using a CITRIX METAFRAME application, produced by Citrix Systems, Inc. of Fort Lauderdale, Fla.) couples an application server 4110 of an application computer farm 4102 to a user's client computer 4104 (e.g., using a JAVA applet). The persistent virtual channel 4105 is initiated responsive to the user initiating a HTTP request 4104 to a web server 4106. An authentication server 4120 is preferably included to provide security. Referring to FIG. 41, the IDE may be coupled to a wide area network (WAN), local area network (LAN) or intranet. In an intranet, LAN, or WAN environment only minimal security measures may be required to limit access to authenticated users. However, for a web-based service, the network topology across which the data traffic between client and application server, and between client and web server preferably has firewalls 4205 on both sides of the Internet, as depicted in FIG. 42. A Secure Socket Layer (SSL) encryption on top of the HTTP protocol for the web server to/from client communication is preferably used. Additionally, the persistent communication channel (also known as a "virtual channel") between the client computer and the application farm is preferably encrypted, such as by using a conventional 40-bit, 56-bit, or 128-bit standard encryption technique. A load balancing server 4140 is preferably used to balance the demands of multiple client user sessions.

FIG. 44 shows the architecture and software modules of a preferred embodiment supporting collaborative development and design project management. In one embodiment, there is a user repository 4405, library repository 4410, and design repository 4415. Each repository includes a memory for storing data, such as disk storage units. The embodiment of FIG. 44 may also be used for procurement and marketing. The user respository 4405 is a database for storing user profiles. The user profile data may include the name, account, password and other background information of a user along with user interests, sign-up date, and design projects of users. The Library Repository 4410 stores records for each embedded system design block (e.g., processor cores, hardware symbols, or hardware sub-systems) and groups the records into libraries. A block record may contain the directory location and name of the block for accessing the physical storage side of the repository. A library record contains the name of the library, owner information, creation date, description, but most important the list of sub-blocks it consists of.

The Design Repository 4415 stores existing virtual embedded systems that are created by vendors or embedded system designers. The designs are preferably stored using library elements. A design record may contain the name of the design, the owner(s) user information, creation date, description, list of team members—each with their permissions for the design—and the list of blocks the design uses. In addition, it contains a directory and filename(s) of the design, so the reference with the physical design files as stored on the storage entity in the design repository can be made easily. Note that the design repository file system accessible by the application server farm. The databases in the three repositories are preferably coupled to permit them to share information.

A collaborative design manager 4430 is preferably included to facilitate the implementation of a project management environment, and may include features such as version control, locking of design (elements) being edited, and advanced editing permission control. The collaborative design manager preferably resides on the application server or the web-server 4480 and in one embodiment includes a library manager module 4450, a design manager module 4460, and a user authentication manager module 4470 on the web server side to a web server daemon 4490 (e.g., by a CGI interface) as conceptually depicted in FIG. 44. Different technology options are available for this back-end implementation, JAVA servlets, CGI scripts (e.g. in Perl), Microsoft's Active Server Pages (ASP), possibly combined with COM and distributed component object model (DCOM) applications. The modules 4450, 4460, and 4470 preferably interact with each other by means of function calls to each other, which permits them to work interactively to implement a particular function such as looking up a name from a list of names associated with a design so that the user authentication manager 4470 can determine if access to a version of a design is appropriate. The library manager module 4450 is a module that maintains the libraries and the design blocks of the library. It preferably supports functions related to the creation, editing, deleting, moving of a design block/library, changing of attributes (e.g. user access and edit permissions), and locking of libraries/design blocks when a specific user edits a directory. Additionally, it preferably supports version control of design blocks and libraries. The User Authentication and Manager module 4470 preferably supports the function of authenticating users when they login into the web site, providing information on user information like team membership and user permissions, adding/deleting approved users, and changing the attributes or privileges of users. The design manager module 4460 manages the designs stored in the design library, and the files they consist of. In a preferred embodiment, designs can be added/deleted, attributes changed, and modification made to the privileges of users in the design team. In one embodiment, each design may be assigned an administrator(s), who controls the user privileges.

The interaction with the application server farm occurs when a user wants to open one of his existing designs or wants to create a new design. The design management web pages on the client side will typically show all the user's design in a tabular format, listing basic info as design name, date create, date last accesses etc. When clicking on one of the design names in this table—which are also hyperlinks—will send a request to the web server to open the design. The HTTPD daemon forwards this address to the Design Manager module which consults the design database of find the ID/string as which the design is known by the application farm. This string is send back in the HTTP response by the web server; the client will pass this information as parameter to the JAVA applet, who will include this as a message when negotiating the setup of a new virtual channel with the application farm. The farm will accept the ID/string and start a new session, in which it will start the IDE with the design opened. Note that the application farm will fetch the design data from the design repository physical storage, as depicted in FIG. 34. If desired, other elements that can be included for collaborative sharing include message boards and discussion threads per design, as well as e-mail between team members or the sending of notes, which further promote collaborative working.

Referring to FIG. 8, one benefit of the present invention is that a user may create a virtual embedded system as a basis for the procurement process related to an embedded system instead of a conventional written description of the embedded system. The level of hierarchy of the hardware description may be set by the designer at a level appropriate for a particular good or service. For example, the level of hierarchy may be set at a part level, e.g., with symbols or blocks representing parts shown. Alternately, the level of hierarchy may be set to assist a vendor understand a net component list. Test benches may be configured by the designer to show signals or interactions of interest to a vendor. Moreover, in one embodiment a designer may select software to be executed on the virtual embedded system by potential vendors. If desired, the virtual embedded system may be provided in a view-only mode. The virtual embedded system and its associated software thus serve as a functional executable specification in that a vendor may use the design window view of the hardware (e.g., as symbols of major parts) and use a virtual test bench to understand the function of the embedded system related to the good or service provided by the vendor. Referring to FIG. 8, a vendor may open up a design 860, view a part list 862, and observe the operation of the embedded system as a basis for a quote 864, such as a private RFQ 866 or a pubic RFQ 868. As one example, referring to FIG. 29 a virtual embedded system including an interrupt counter may be formed at level of hierarchy in which one or more of the symbols 2920, 2930 correspond to parts required for the embedded system. A virtual test bench may be configured to interact with the simulation and reveal signals related to the operated of one of the parts. Consequently, a vendor accessing the virtual embedded system would have a functional block diagram appropriate for understanding the operation of a part and be able to execute the simulation to understand the function of the part in the embedded system.

The virtual embedded system may be stored as an executable file or a set of component DLLs capable of running the simulation or as DLL to the simulation, although any conventional means for providing access to a simulation of the virtual embedded system may be used. A link to the executable file or the simulation may be provided in a variety of different ways, such as providing a link on a portion of a web site hosted by the web-based service from which a user may launch the simulation and examine the function of the embedded system (e.g., by using the test benches or waveform viewer). Referring again to FIG. 8 a web-based service may be used to invite sellers to provide a quote for a specific design, in a request-for-quote (RFQ) scenario. In a RFQ embodiment, an executable specification of an embedded system is created 805 by a user using the tools of the IDE as described above. In a public RFQ embodiment 810 a user published an RFQ to a bill board that includes access (e.g., a link) to the design file. In a private RFQ embodiment 815, a user selects the vendors and sends the selected vendors the RFQ and access (e.g., a link) to the design. A user can then search for information on suppliers 813 from a user and supplier database 811 and then select 812 from specific suppliers to send an RFQ 814 via RFQ database 850. Vendors, for example, may post information on their capabilities and interests permitting a manual search. Alternatively, this process can be upgraded to an automatic match making, by using a matching engine 820, based on a selectable set of criteria. Vendor/seller profile data may be used to classify providers and create directories that permit automatic matching between buyers and sellers based upon a standardized set of criteria. In one embodiment, the provider of the web-based service can take an active roll in rating the different sellers and service providers, based e.g. on their history, track record and the user feedback. This rating can be used as an (additional) input for the match making. The matching making engine would be fourth software module (not shown in FIG. 44), which would interact with the web-server, the User Manager and the Design Manager modules.

In another embodiment, a bidding board 840 permits bids to be placed on designs. For example, a seller may review a board category 869 of a bidding board 840 for designs that they want to receive a RFQ on. In another embodiment sellers and vendors can subscribe 868, 872 to certain bidding boards (e.g., by category), and receive an automatic update (e.g., by e-mail notification or by a personal message box hosted by the web-service), whenever a new bidding opportunity is posted on the bidding board. A bidding board can be implemented as a database element, acting as a container for different bidding board listings, each pointing a single design or sub-design. In addition, it may contain the bidding history (i.e. the bids made, with all their attributes, including price, description and deliverable dates.

Note that other information desirable for a RFQ or a bid may also be associated with a simulation. For example, additional annotations for the design (e.g. power consumption and timing constraints, process technology preferences, deadlines) may be associated with a design. Additionally, a virtual embedded system may be used for an RFQ or bid for only one sub-system or component of the embedded system. Any conventional web-based method on-line mechanism may be included for a seller to collect, overview, select and accept submitted quotes.

Referring to FIG. 6, one application of a web-based service is as a website for the of evaluation IP components A web-based service permits access to virtual embedded systems and IP blocks to a large potential audience at a low incremental cost and with minimal support. For example, the virtual embedded system may be a simulation of an evaluation board for evaluating a processor core that is uploaded 650 by an IP vendor to the web-hosted service. For this embodiment, the virtual embedded system eliminates the need of a processor core vendor to send physical evaluation boards to prospective customers. Providing access to a virtual embedded system may be used to replace the traditional practices of sending of data sheets and physical evaluation kits, boards, or samples to prospective customers to evaluate an IP component of an embedded system. Instead, access is granted to prospective customers to on-line virtual prototypes of the vendors' offering. With these prototypes, the vendor can demonstrate the competitive edge of his offering by a real experience of the product by potential customers. In this embodiment, a vendor creates a virtual embedded system for the electronic system a vendor wants to market, (e.g., using the graphical design language described above) having instruction set simulators and "live" test benches of a human/machine interface to interact with the simulation. The virtual prototype is hosted on an application server (farm), accessible through the Internet network. The virtual prototype is made accessible to customers by publishing a web page or hyperlink, which can execute the prototype on the application farm. Prospective customers are allowed to inspect and navigate the virtual prototype in their browser, by starting the IDE from their browser to run on the application farm. As described below in more detail, a walkthrough function may be included to describe the attributes and function of virtual embedded system.

Referring to FIG. 6, in a preferred embodiment of an evaluation service, a user may search 652 IP and platform libraries for potential suppliers. A user may select 656 individual IP elements 636 or a complete virtual platform including a desired IP components and other components of a virtual embedded system from a library of virtual evaluation platforms 638. The user can then customize the virtual platform, such as by adding or configuring virtual test benches 640. If desired, the user can modify one or more components of the virtual platform, such as hardware component, using the IDE. In a preferred embodiment, the user can store a customized virtual platform 642 for later use. The user can then upload benchmark software 660 to evaluate the operation of the embedded system. The evaluation process may include the use of the virtual test bench, debugger, and profiling data associated with the instruction set simulator of the target processor. The user may then run the benchmark software 662 on the customized virtual platform and evaluated its performance using the virtual test benches and/or software tools 644. This permits the user to select suppliers 664.

One benefit to vendors is that a web-based service for marketing IP using virtual embedded systems can include web-based usage tracking and reporting 646. Moreover, user selections from the library of IP elements 636 and virtual platforms 638 may also be recorded to form market intelligence data. Mechanisms for usage tracking and reporting may include access statistics, traffic and user profile and demographics of the traffic to the platform offering, customer feedback, clicking-through statistics on advertisements posted on the web-site, and design leads of registered users. This report can be in printed or electronic format, the latter allowing it to be sent out by mail directly. Standard web statistic gathering techniques, amongst others using a combination of web server logging, cookie placement on the client computer, and user profile data collected during user registration and web analysis programs can be used. For example, statistical techniques may be used to determine popular virtual platforms and/or modification to platforms. Thus, in addition to the low incremental cost of using virtual prototypes as a marketing tool for IP blocks, a vendor of IP components may also acquire valuable marketing data at a low incremental cost. One way that an IP vendor can use data on on-line usage is to determine processor cores and hardware peripherals that user's desire in reference evaluation boards. For example, an IP vendor could provide a virtual reference evaluation board and track how users modify the hardware peripherals to provide feedback useful for creating new virtual reference evaluation boards. Another way that an IP vendor can use data on on-line usage is to determine market trends, i.e. use data on the interaction of users with the hosted IP components as an indicator of market trends. For example, a web-based service may have a library of IP components that includes a variety of different types of processor cores (e.g., for different embedded system applications) and/or models of hardware components. Virtual test boards for the different IP components may also be included in the library. Data on which IP components and virtual test boards are selected for evaluation by users may be used as marketing data for predicting future demand.

Referring to FIG. 7, another aspect of the present invention is that it provides a way for two parties to share an executable functional system specification from which two parties may agree (sign off) to the design specification or otherwise coordinate their efforts. One problem in conventional embedded system design is reaching agreement on a high-level design specification that coordinates and binds the efforts of different groups. The groups may be in house (e.g., a hardware group) or more commonly, it may include external vendors, such as hardware suppliers (e.g., memory providers) and silicon fabrication companies. Conventionally, the documentation of a paper specification upon which different groups can sign off is a time consuming process, particularly if documentation for several different versions of a design need to be created. Using the present invention, a virtual prototype 704 can be used to replace paper specifications typically used to this process, by an executable functional; specification. Existing blocks can be put in on-line libraries accessible to be used by the specifying party to compose and configure his system, or to be modified to make them custom for his application. Non-existing blocks can be created on-line in the IDE from scratch. In all cases these models serve as medium to communicate between specifiers and implementions and to sign off 395 on behavior of the system, sub-system, IP or SOC before the implementation starts. Appropriate test benches may be included for interacting with the system at a desired level of hierarchy.

Referring again to FIG. 7, in one embodiment of the present invention, an executable specification may be used to facilitate the collaborative development of electronic systems, sub-systems, IP and SOCs between geographically distributed user groups. For example, an embedded system project may include engineers who work in different divisions of a single company or be a collaborative effort of several companies and/or subcontractors (e.g., an embedded system project with design groups in Silicon Valley and in Washington state). Conventionally, collaborative development of embedded systems has been hindered by communication problems and by the need of software developers for convenient access to physical prototypes to develop software. In accordance with the present invention, a web-hosted virtual prototype may be used as a communication vehicle/means for communicating information between different design teams, documenting designs, and coordinating design efforts. As one example, a virtual prototype may be made accessible to a geographically distributed design team by publishing a web page or hyperlink, which can start the virtual prototype software on the application farm. The design team members may select and open of libraries they want to use, and create their own libraries, with privileges they select. Design team members may be allowed to compose their own virtual prototype by instantiating existing blocks from the library, and to inspect, to navigate and to configure, and to customize these blocks. They may also create new blocks using the on-line virtual prototyping IDE. The design team members may be allowed to store and share with other design teams these newly created prototype designs on-line, e.g. on an on-line design repository file server. The design team members may be allowed to interact with a live model of the system, by executing the prototype on the application server farm and interacting with it through a desktop browser. In one embodiment, a design sharing and revision control mechanism permits a design team member to selectively share parts of the prototype or the full prototype with a list of other users he can select. The sharing can happen by sharing the design, test bench and result files or by transferring a hyperlink (possibly with a password) to the virtual prototype to the selected users. Another benefit of hosting a virtual prototype as a web-based service is that software developers have access to the most recent updates to the virtual prototype. Since the present invention permits early software development 352, continued software development 354, and early software integration 358 performed using a virtual prototype, the delays associated with shipping prototypes (or hardware emulators) between different teams is eliminated. Using the present invention one virtual prototype (or sub-versions thereof) may be shared by a comparatively large number of hardware or software developers, which facilitates collaborative development of geographically dispersed teams having a large number of members.

Referring again to FIG. 7, a benefit of using a web-based service for collaborative development is that the virtual prototype may be used by geographically distribute hardware developers and geographically distributed software developers. As previously discussed, the virtual prototype 704 permits: (1) the ability to start the development of embedded software early, and to develop the software concurrently with the hardware, promoting shorter design cycles, because of this concurrent engineering; (2) integration of (low-level) software with the hardware can happen before actual physical hardware is available. A web-based embodiment provides the further advantage that the simulation can be ran on the server-end using a high speed computer.

As previously described, in one embodiment of a web-based service a user may upload software for execution on a virtual embedded system via the Internet from a client computer. This allows software developers to interact with a live model of the system, by executing and debugging the software on top of the virtual prototype on the application farm and interacting with it through a desktop browser. The on-line infrastructure to compile, link and load the user's embedded software can be implemented in different ways. A preferred technique is to run the software development tool suite of the target processor in the same CITRIX METAFRAME session on the application server farm as the virtual prototyping environment. This will cause the software tool chain to be directly available in the METAFRAME, with minimal effort to adapt the software development tools. Two additional features are provided, namely the upload and download of source and object code to the users desktop (which both can be implemented with a transparent FTP connection). The upload will allow users to type in source code on their desktop first, and is especially useful for existing code, like e.g. benchmarks, which a user might want to execute on a new processor. The download allows users to locally store the source code they have typed in the METAFRAME window.

In one embodiment, a walkthrough may be created for a platform that is an interactive presentation of the platform to the user. A walkthrough may be created for any virtual platform, although in one embodiment of a web-bases service a walk-through is included to explain the operation of a virtual evaluation platform 638 component 636. FIG. 48 is a block diagram of an embodiment including a content viewer 4802, walkthrough content 4805, and an interface 4810 to a platform 4820. It performs a function similar to a person presenting a platform to the user. A walkthrough may be build from conventional web-based technology. The user navigates the walkthrough as a small web site tailored for the platform and audience. The walkthrough can have many pages. Each page can present any web content supported by the target browser. In addition, walkthrough pages can interact with and control programs outside the walkthrough, such as the modeling and simulation tools. A walkthrough provides a means for the platform designer to communicate the function, capabilities, and significance of a platform to the user. The walkthrough is a software application that displays web page content to the user, and allows the user to interact with a platform. In one embodiment, the walkthrough includes a content viewer, walkthrough content, and interface components that provide the link between the walkthrough content and the virtual platform that allows the walkthrough to interact with the platform. The interface components are generally custom pieces of software (such as an Active X control) that can be used by all walkthroughs. The content viewer may be any conventional content viewer, such as the HTA (an HTML application which is a web-page having an HTA file extension) or a web browser that supports the interface components and walkthrough pages, that can be used to display the walkthrough.

As one example, the walkthrough may demonstrate setting a breakpoint in the simulation and running to that breakpoint.

The interface component provides the mechanism for the walkthrough to set the breakpoint and run the simulation. The walkthrough content may be interactive, using scripting technology to interact with both the user and the simulation. The interface component can provide bi-directional communication between the walkthrough content and the rest of the platform. The walkthrough content can contain ActiveX controls like graph displays, integer register viewers and others.

Figure 49A:
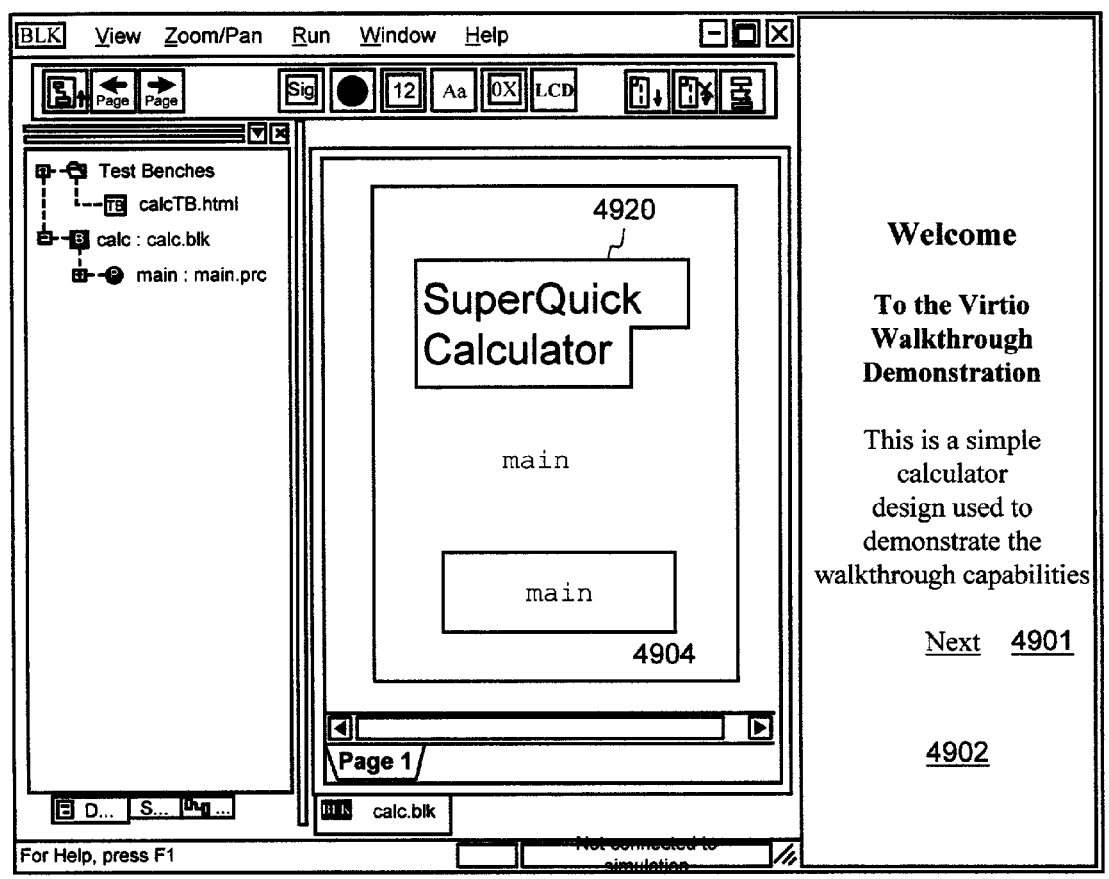
FIGS. 49A-49J are screen shots of an interactive walkthrough of an embedded system.
Figure 49B:
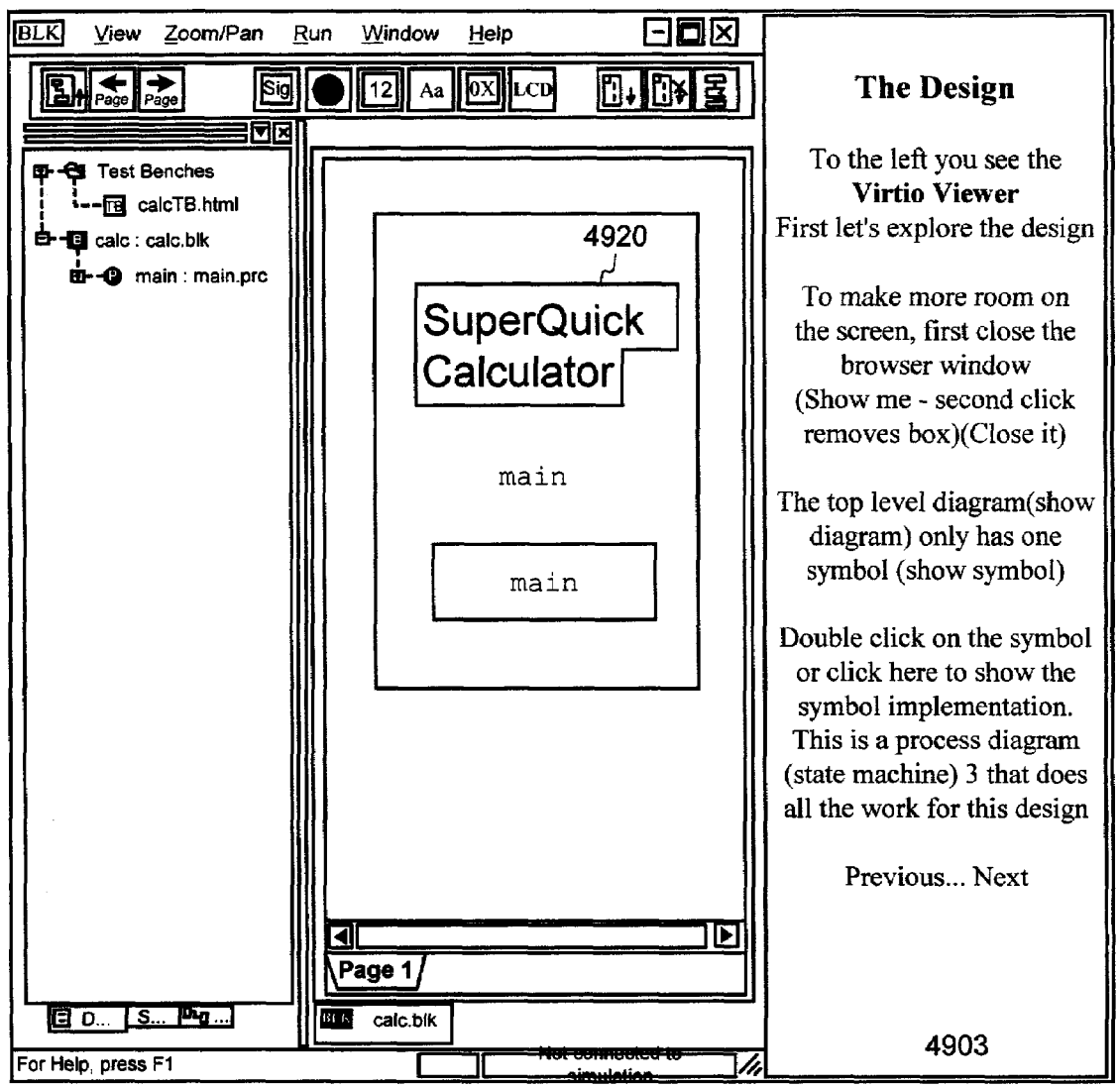
Figure 49C:
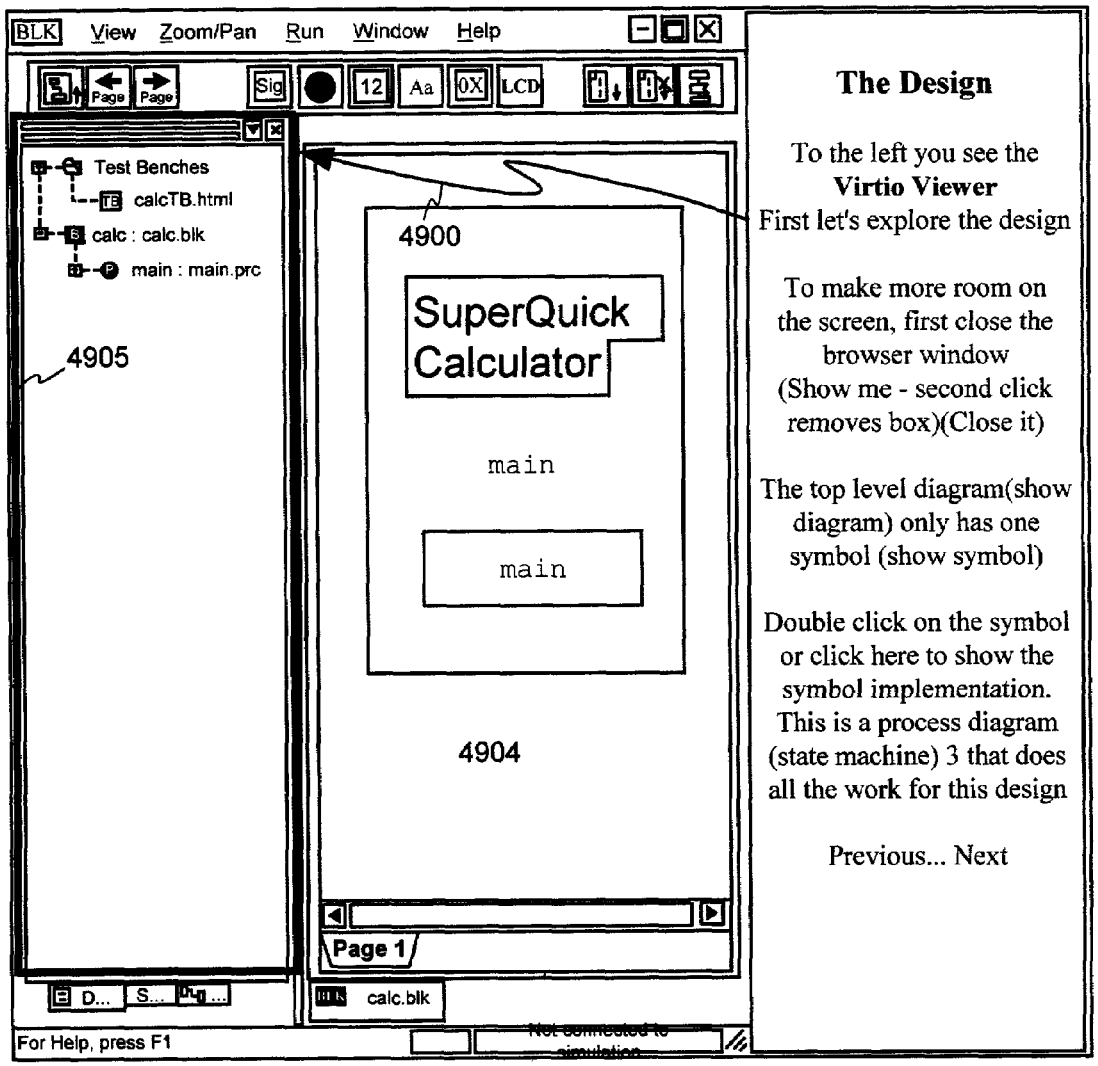
Figure 49D:
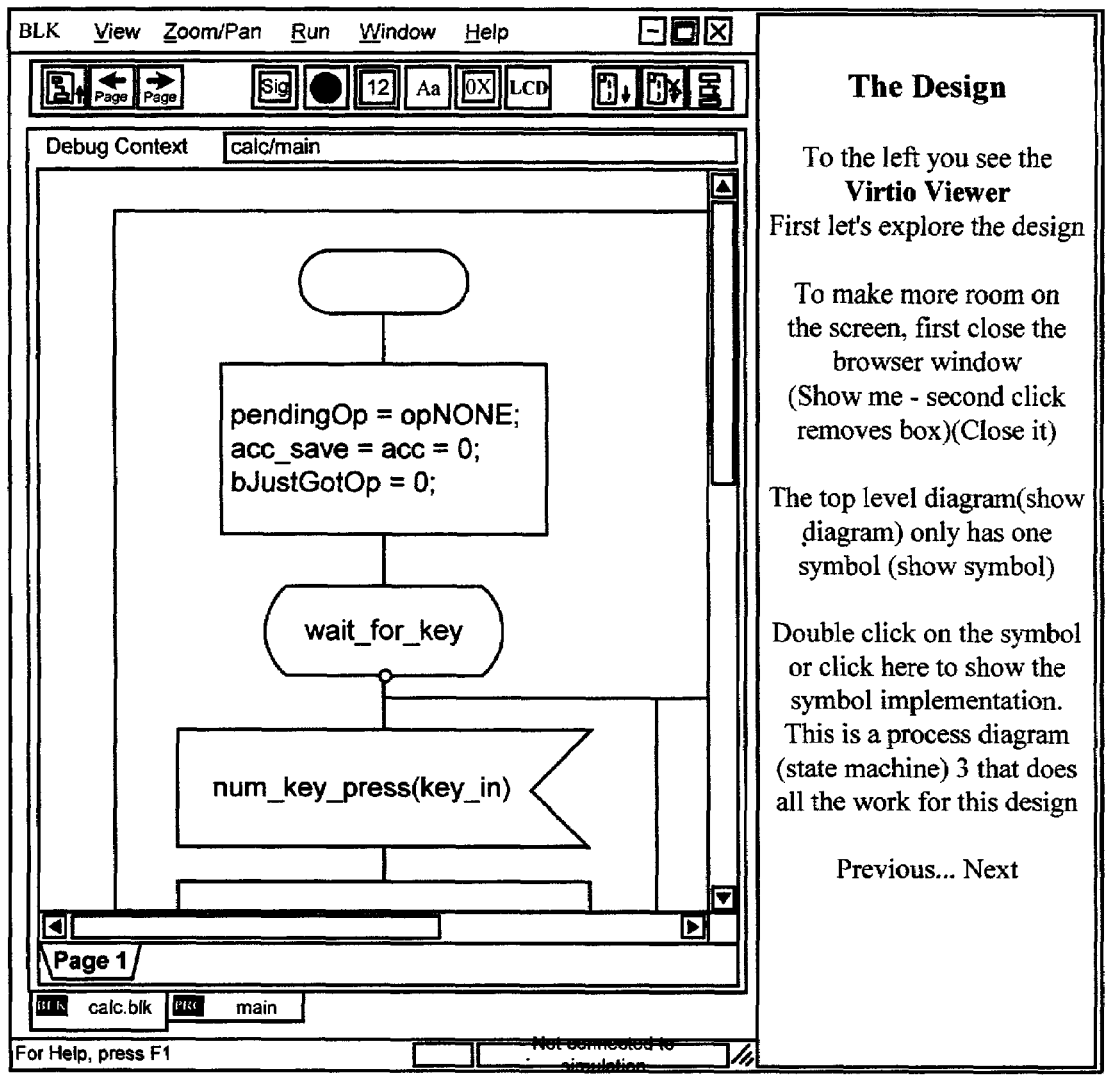
Figure 49E:
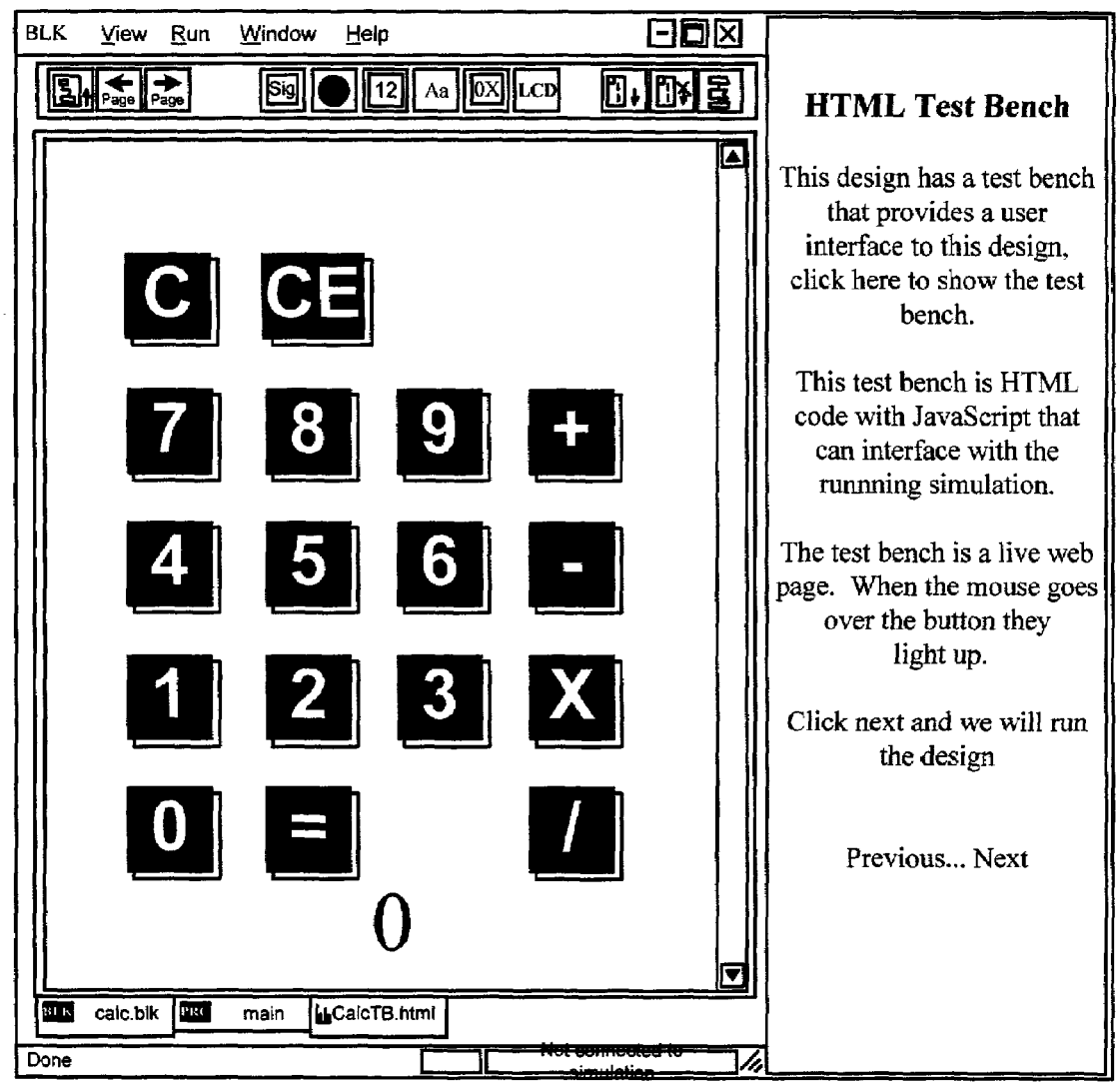
Figure 49F:
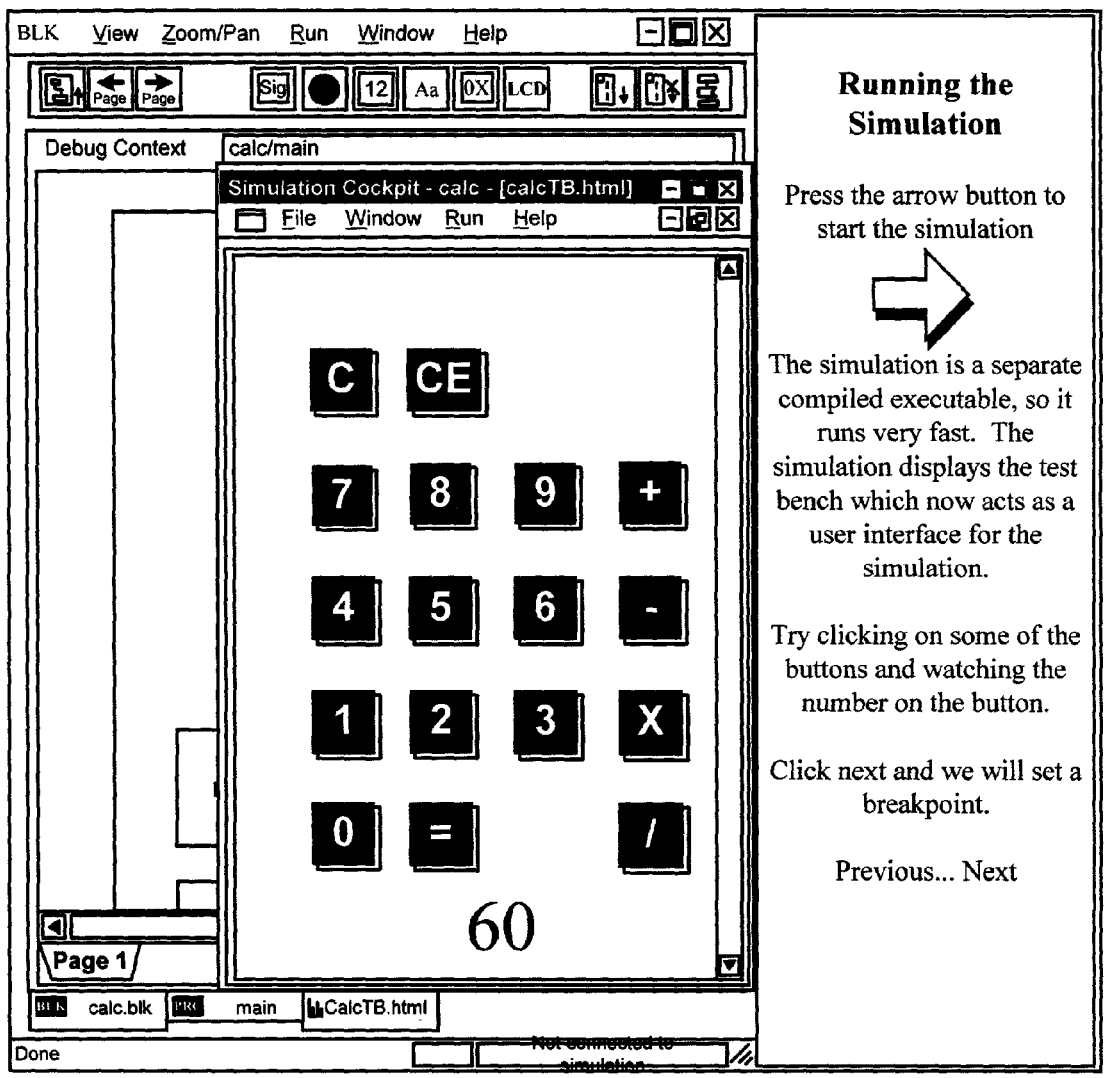

FIGS. 49A-49J are illustrative screenshots of one example of an interactive walkthrough used as a tutorial. FIG. 49A shows content introducing a tool known as a "SuperQuick Calculator." Each page of the walkthrough 4902 may include a control, such as a "next" link 4901 to navigate the walkthrough. The content 4902 may be displayed next to a design window. Referring to FIG. 49B, the walkthrough may encourage a user to interact with a design 4920 in the design window 4904, such as by clicking upon a symbol 4925. As shown in FIG. 49C, a graphical application may be included to permit portion of the design window 4904 to be outlined 4905 or arrows 4906 added to connect the content 4902 with portions of the design window. FIG. 49D is an example of design window opened to reveal a lower level of hierarchy, such as the graphical constructs of a FSM, by pressing upon a link in the walkthrough content. In one embodiment, JavaScript in the Walkthrough is configured to call on an ActiveX control contained in the header of the Walkthrough HTML page. The ActiveX control then communicates with the IDE (e.g., using a COM technique) to request the design at the selected level of hierarchy. FIG. 49E shows a walkthrough content describing the operation of a virtual test bench that is a calculator. FIG. 49F is an example of a walkthrough page explaining how the virtual test bench may be used as human/machine interface to interact with a simulation. In the illustrative example, a user may click upon a button of the virtual test bench to input a number or command. The resultant "60" is displayed as a result of the user clicking upon the following buttons in order: "1", "2", "X", "5" "=" (representing the equation 12×5=60). The "equals" button is shown highlighted since it is the last button in the sequence that the user clicks upon. The test bench page may be implemented as a HTML page with an ActiveX control having JavaScript in the HTML configured to permit communication with a running simulation.

Figure 49G:
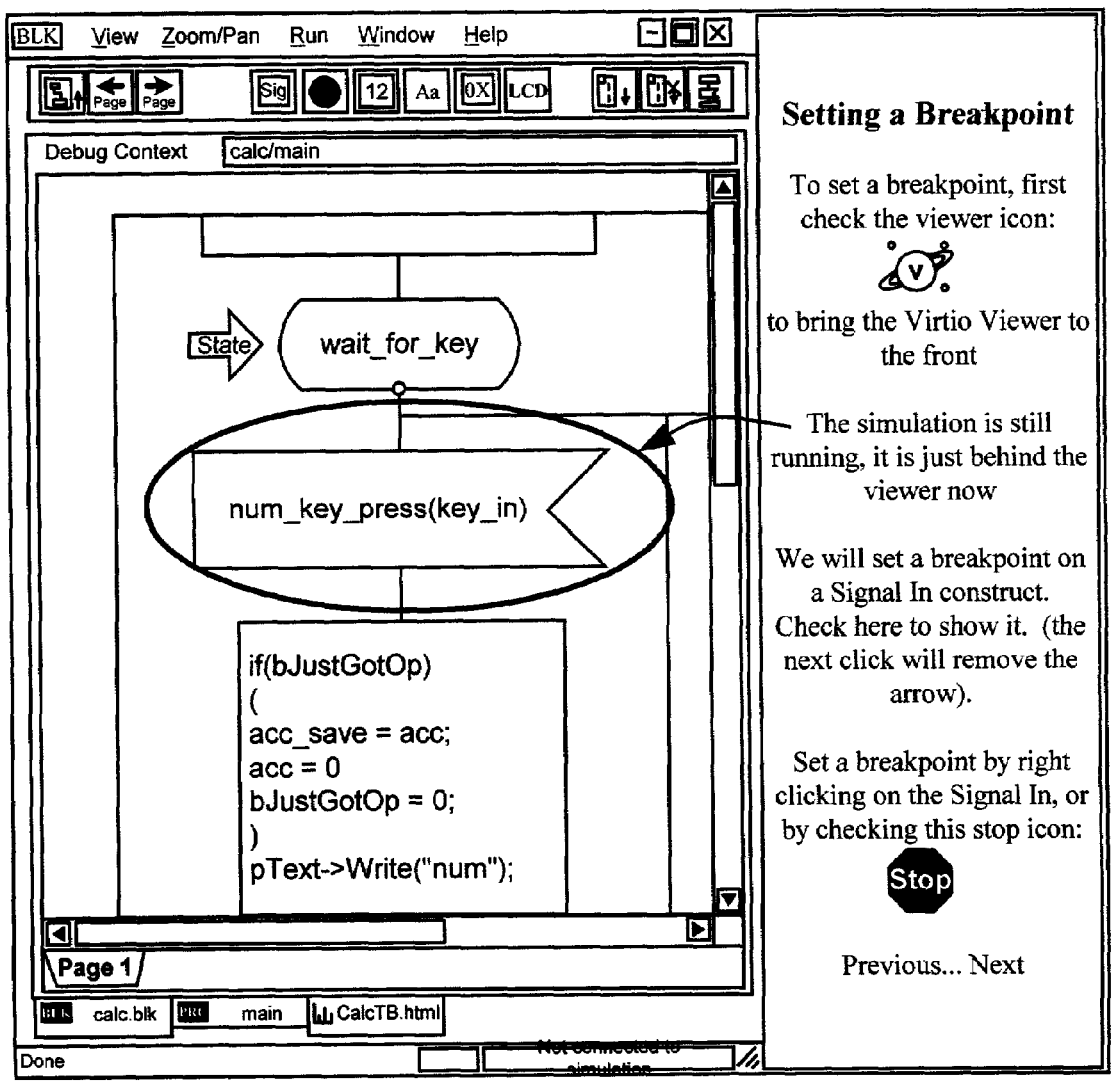
Figure 49H:
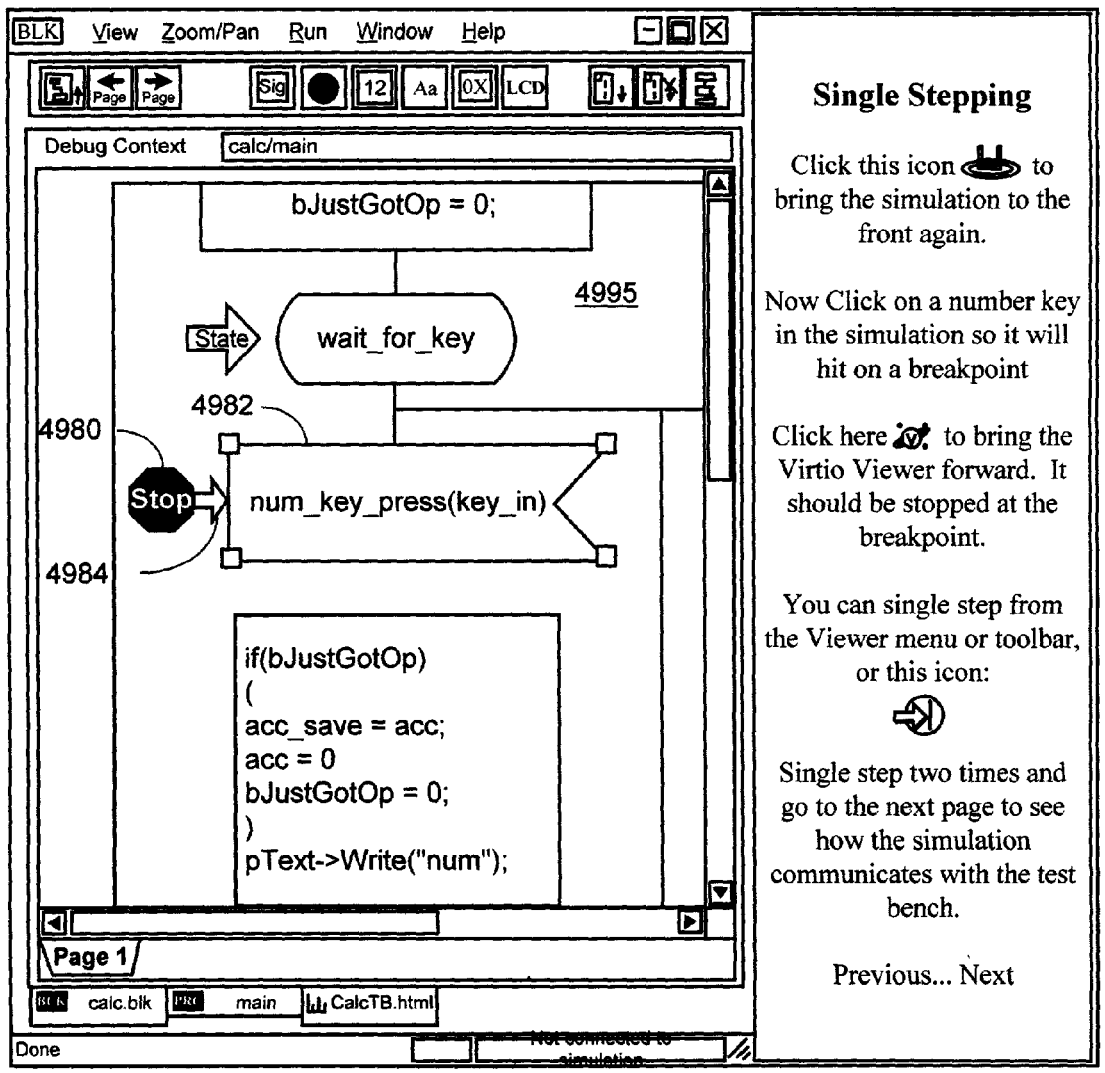
Figure 49I:
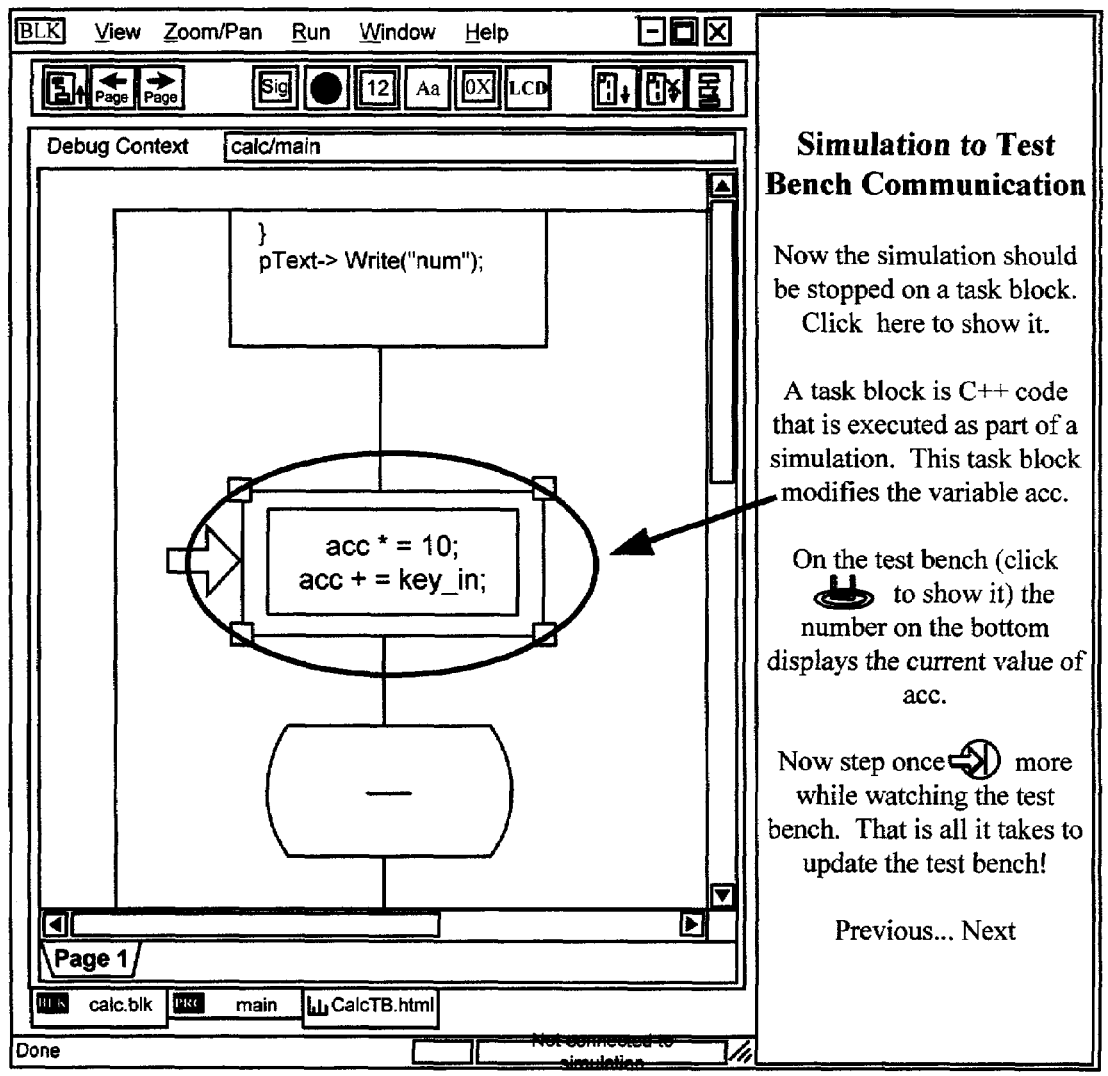
Figure 49J:
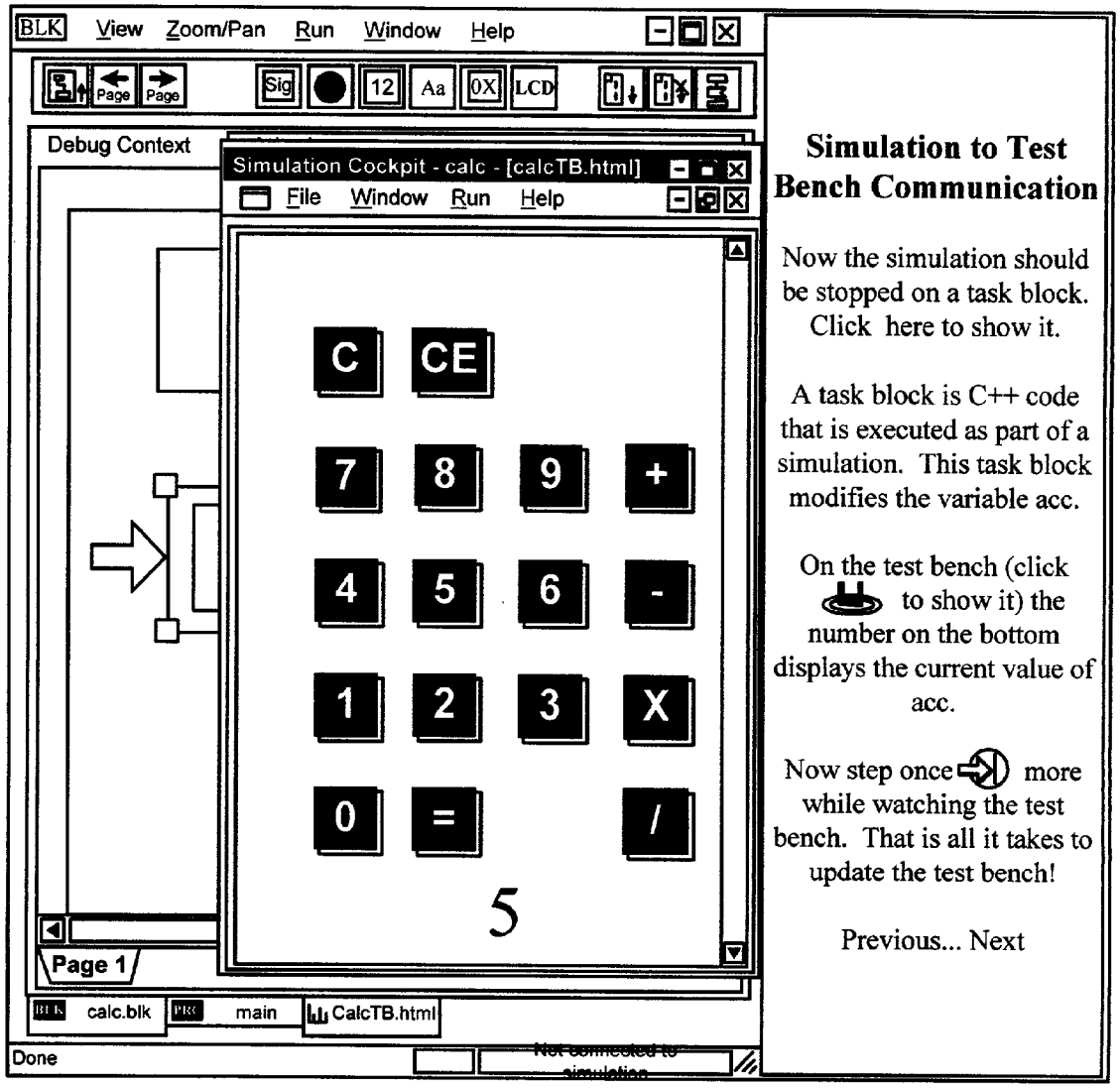

Note that FIGS. 49A-49F present a user with a high level representation of the function of a system (here a calculator). If desired, FSM implementation details and debugging interface may be provided to a user, along with interactive walkthrough content. FIG. 49G is an example of an interactive walkthrough page explaining how a breakpoint of execution may be associated with a graphical construct. FIG. 49H is an example of an interactive walkthrough page explaining how a simulation may be executed until it stops at one of the breakpoints associated with the command flow of the FSM reaching the breakpoint. As shown in FIG. 49H, in a preferred embodiment, a stop symbol 4980 is used to represent a breakpoint of execution and is associated with a graphical construct 4982 of a FSM 4995 representation of hardware using an arrow symbol. 4984. FIG. 49I is an example of a walkthrough content page explaining how a breakpoint of execution may be associated with a task block representing a simulation variable "acc." The arrow in the process diagram indicates the current execution point. as the simulation has stopped on a breakpoint of execution. FIG. 49J is an illustrative screen shot demonstrating the communication of the test bench with the simulation. In the example, the test bench displays the value of the simulation variable "acc." Whenever "acc" changes in value in the simulation, the change is displayed on the test bench.

An interactive walkthrough can be used in several different ways. In one embodiment, an interactive walkthrough is used as marketing tool. An interactive walkthrough may be used to provide an interactive guided tour of an electronic system, sub-system, or IP component. As one example, content may be created to explain a feature of the virtual platform while the interface to the platform may be used by the user to observe an active simulation of the platform.

Figure 51:
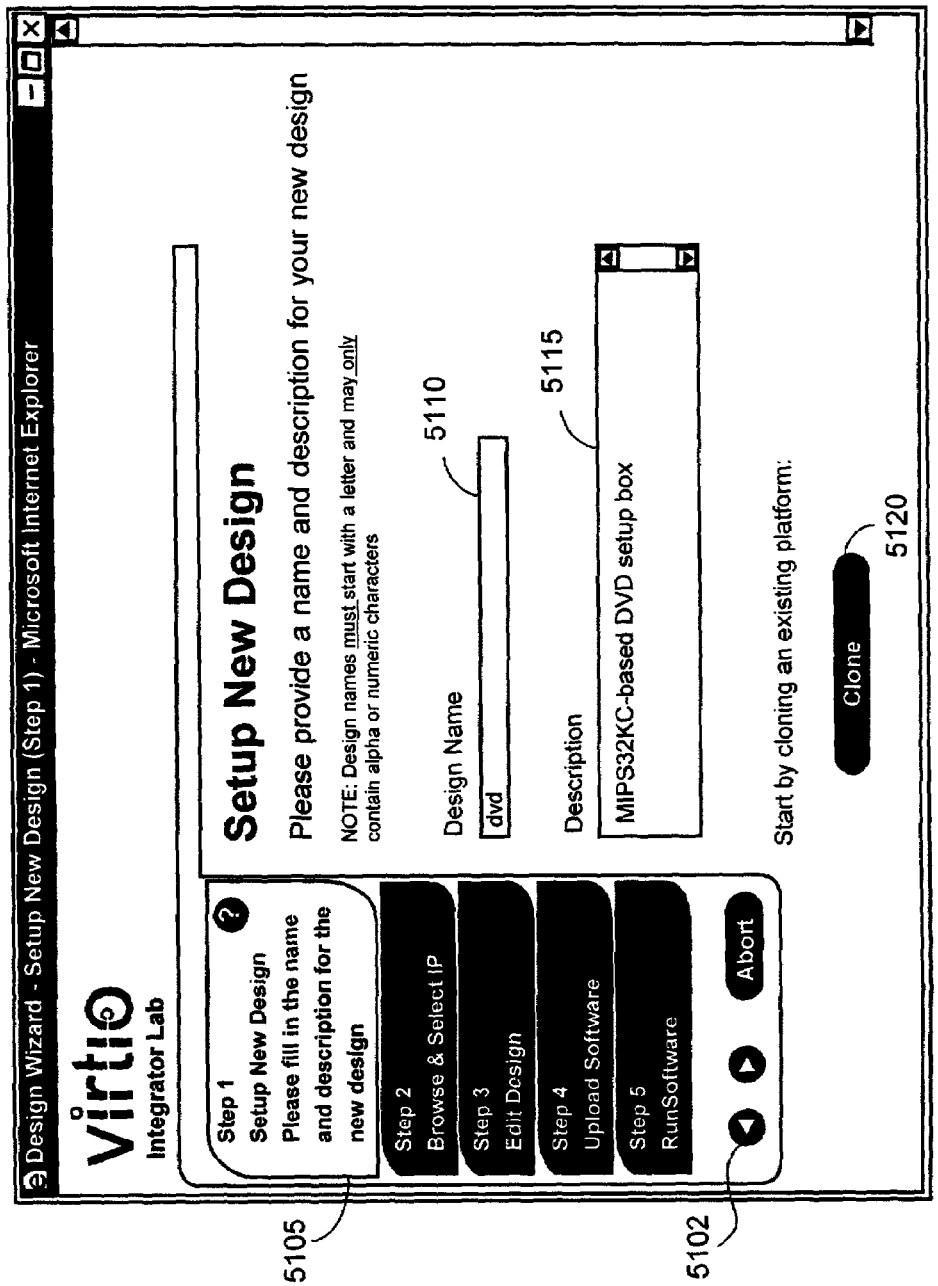
Figure 52:
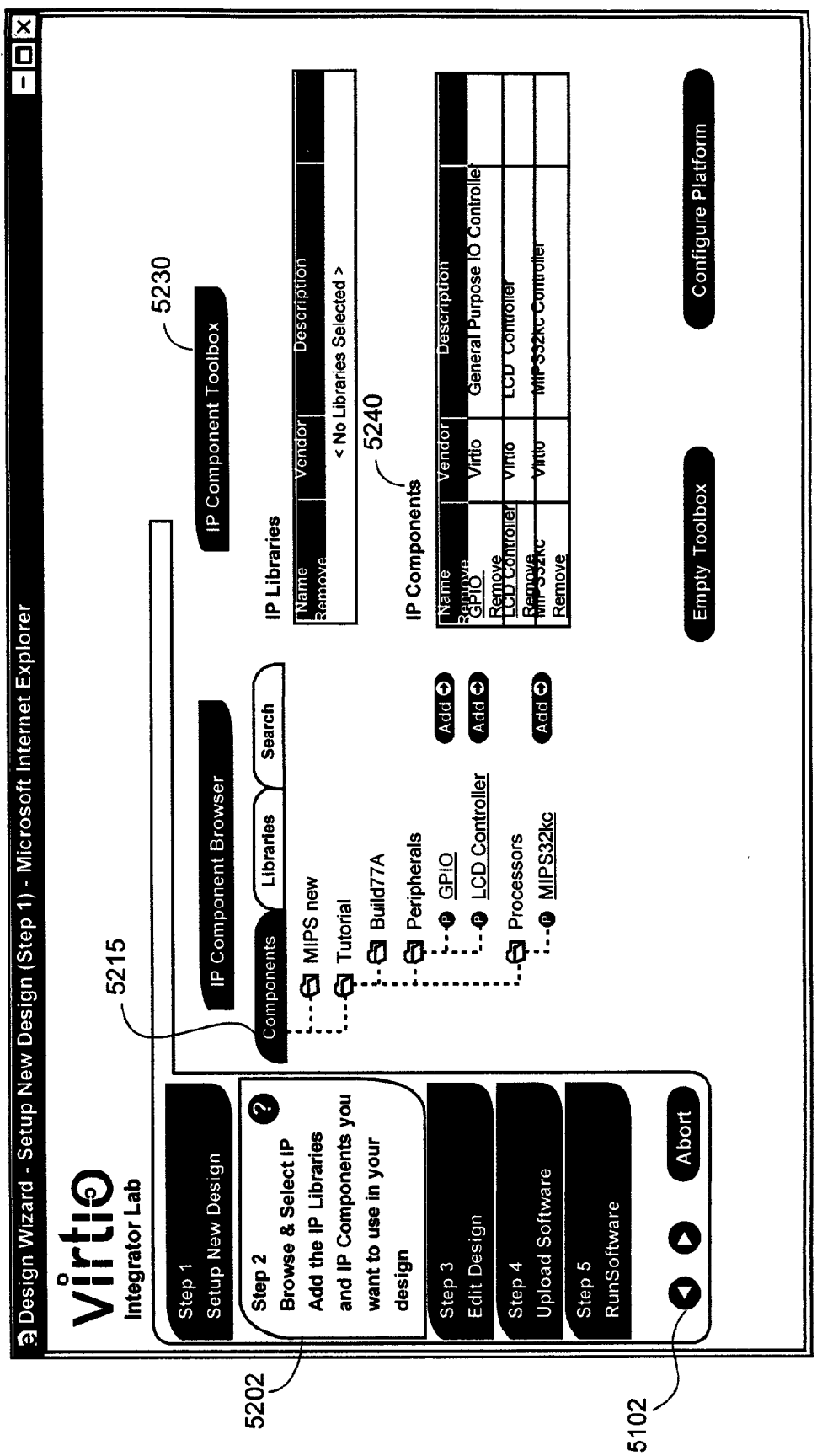

FIGS. 50-55 are screen shots showing examples of an on-line embodiment. Referring to FIG. 50, a design manager may display a list of designs a user has stored in the design repository, such as design name, creation date, edit dates, or a description of the design. Referring to FIG. 51, a design creation wizard 5102 may request 5105 a user to provide a design name 5110 or design description 5125. In one embodiment, a user is given the option to clone (copy) a pre-existing virtual embedded system from the design repository as the basis for a new design. Referring to FIG. 52, the design creation wizard 5102 preferably permits a user to browse and select IP components. 5202. In one embodiment, a user is permitted to select components 5215 from a library repository. In the example of FIG. 52, the components 5215 in the library may include a MIPS processor, a LCD controller, and a GPIO peripheral. The user is preferably provided with a toolbox 5230 to select components for use in a platform. In the illustrative example, a user has selected as IP components 5240 a general purpose input/output controller (GPIO), a LCD controller, and a MIPS32 kc microcontroller.

Figure 53:
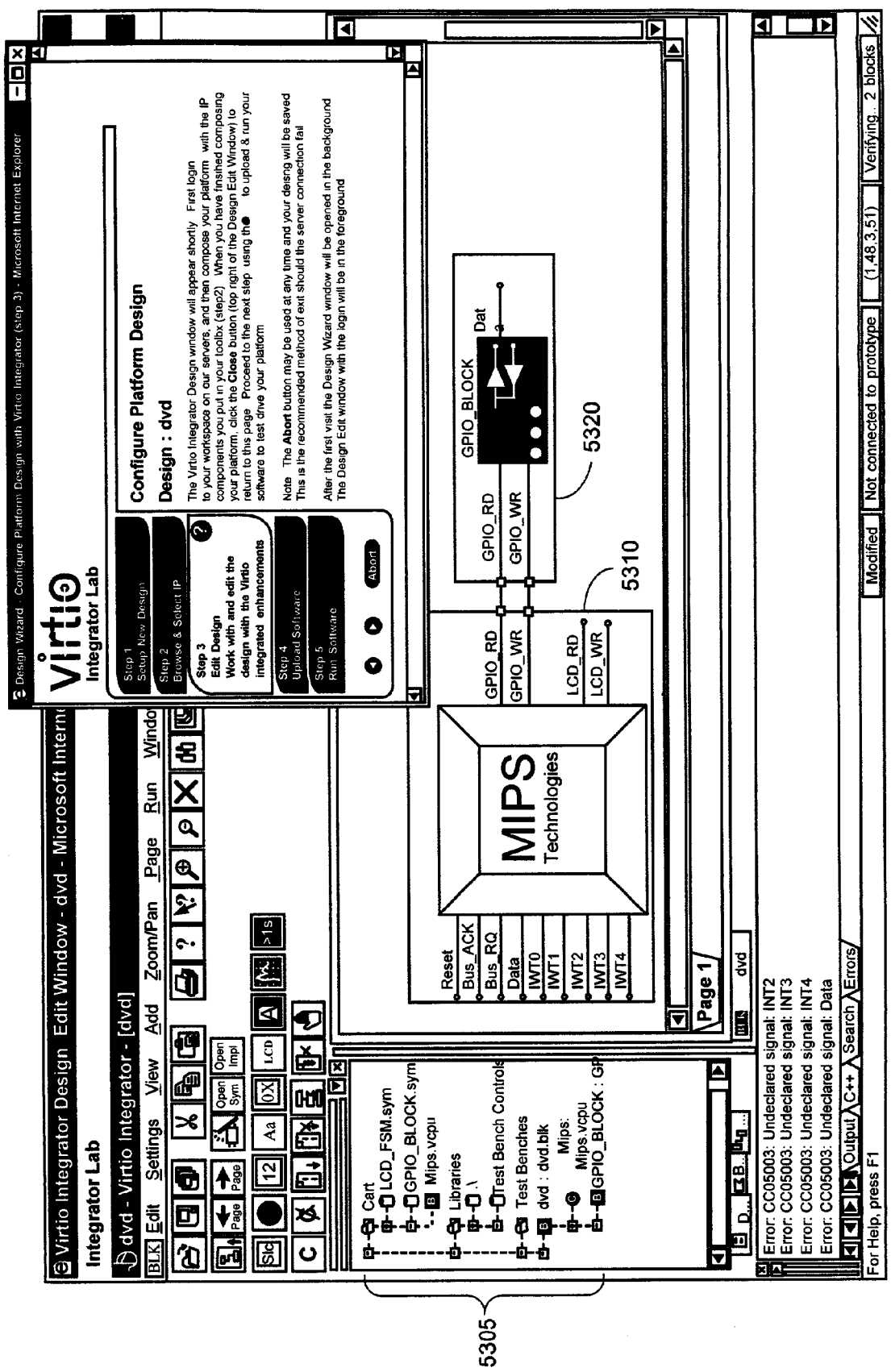
Figure 54:
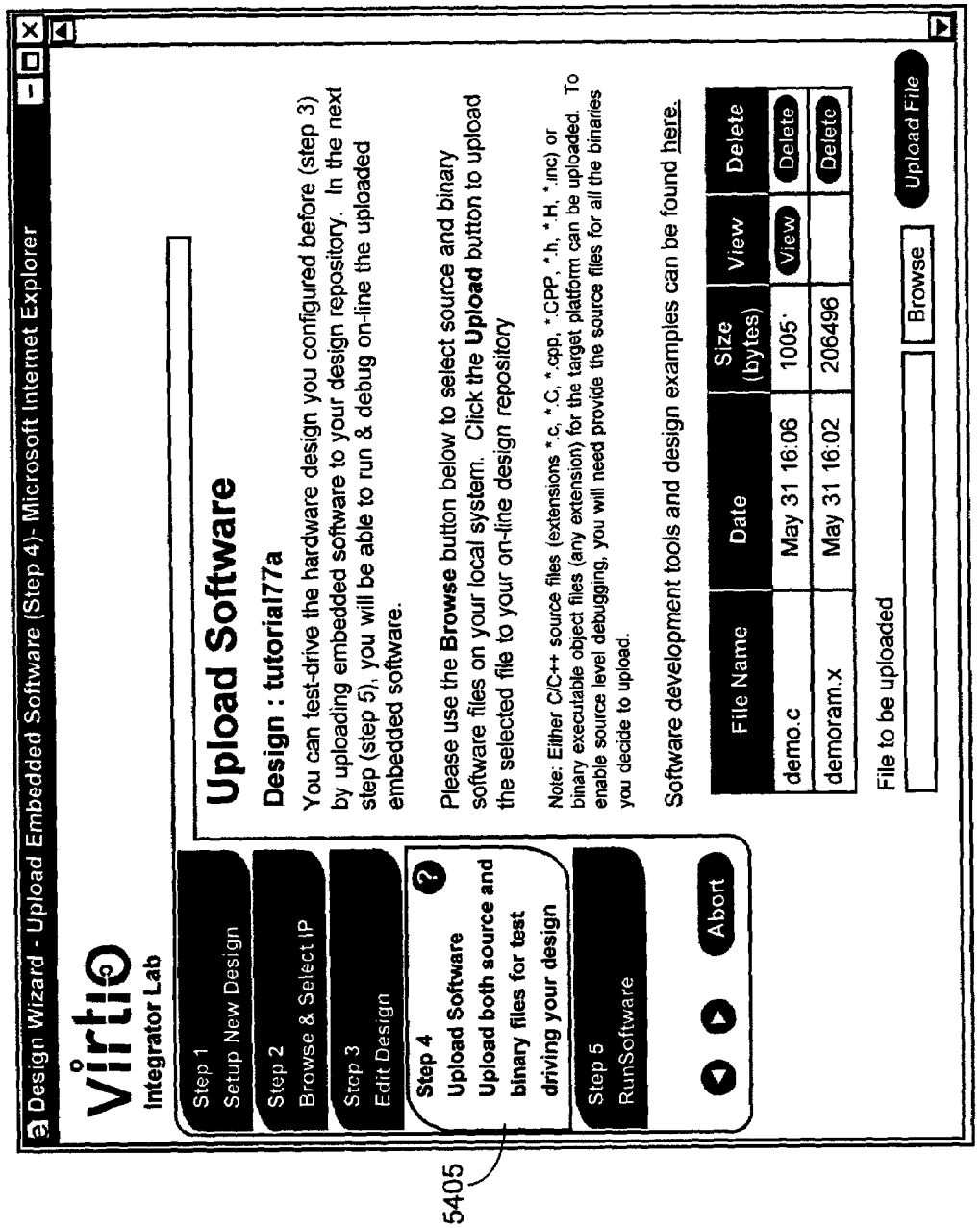
Figure 55:
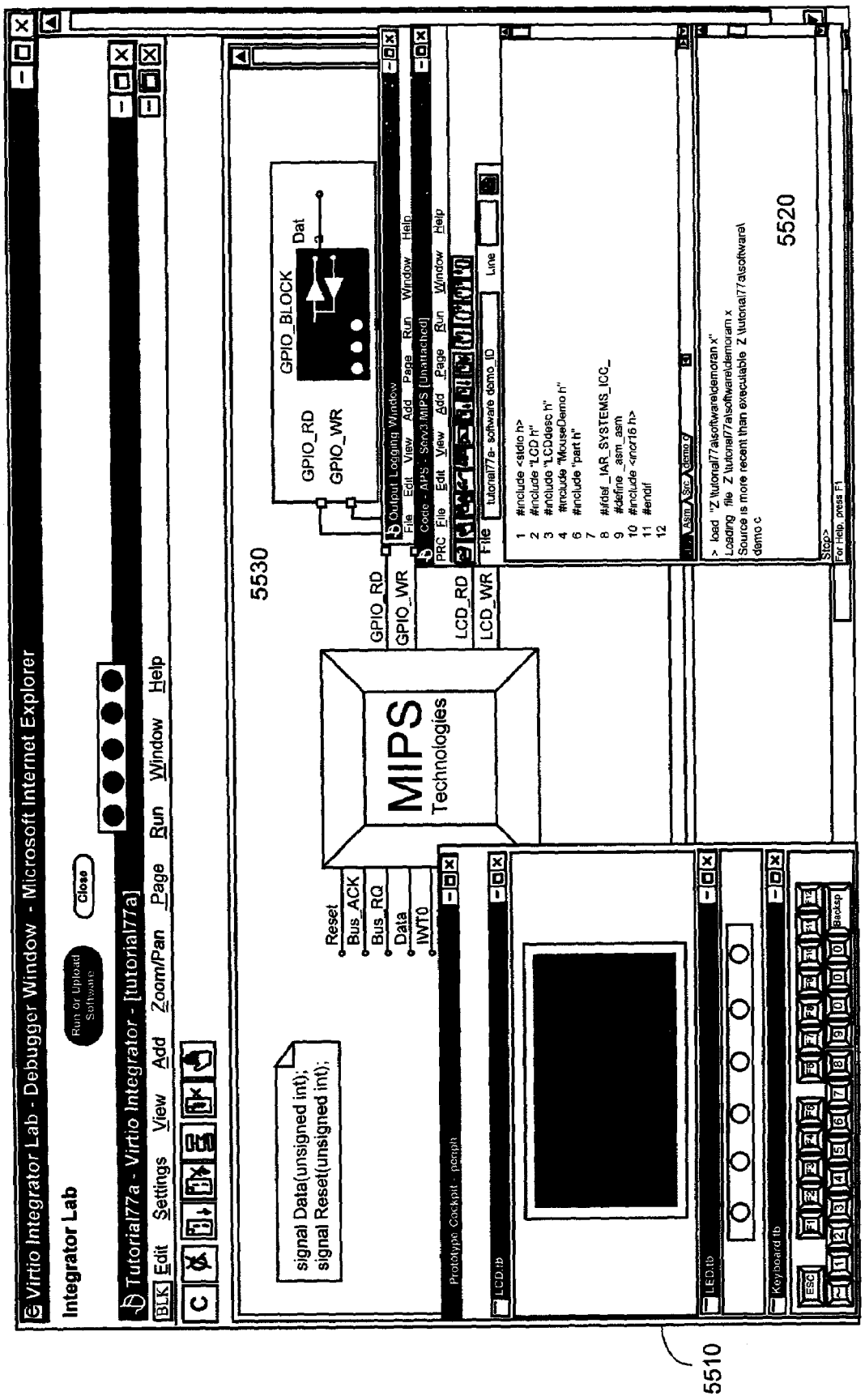

As shown in FIG. 53, a browser window 5305 may display a list of the IP components and other design information, as described above. In the illustrative example of FIG. 53, a user has selected a processor simulator corresponding to a MIPS processor 5310 and a GPIO controller 5320. The user may then compose an embedded system using the IP components in the IP toolbox as starting point. If a suitable IP component for a particular application does not exist in the library repository, a user may create a FSM model of the component. The embedded system design may be completed by making appropriate connections of signals. Referring to FIG. 54, a user may then be presented with the option 5405 to upload software for execution on the virtual embedded system. The uploaded file executable binary file for the target processor (i.e., the processor selected for the embedded system). In an alternate embodiment, the uploaded file may be a source file for the target processor, which may be converted into an executable binary file by the service provider. After the software is uploaded, the user may select to run the simulator. As shown in FIG. 55, in one embodiment a user may then be presented with a window showing a test bench 5510, a software debugger window 5520, with the embedded system design 5530 shown in the background.

While one preferred implementation of the present invention is as a web-based service, it will be understood that the IDE of the present invention may be used as stand-alone application running a simulation on a local computer or local network computer. For a stand-alone embodiment, the IDE may be stored on a computer readable medium (e.g., a compact disc (CD) along with other IP components (e.g., processor cores) for use with the IDE. Thus, it will be understood that the IDE may be used in off-line embodiments. Additionally, it will be understood that while the Internet is an especially efficient communication medium that other communication methods may be used to exchange data files. In particular, some of the functions of a web-based service may be emulated by using computer readable medium to exchange data files. As one example, the IDE may be stored on a computer readable medium, such as a compact disk (CD), along with one or more ISA processor cores. An embedded system designer would then couple the computer readable medium to a local computer system to use the IDE to design an embedded system. As another example, the IDE of the present invention may be used to form virtual platforms representing evaluation boards. The virtual platforms may then be stored on a computer readable medium (e.g., a CD) and provided to embedded system designers for executing a simulation of the operation of the virtual evaluation platform. As still another example, a virtual prototype of an embedded system may be created using the IDE of the present invention and stored on a computer readable medium (e.g., a CD) and the computer readable medium shipped to another party for understanding the operation of the embedded system, e.g., for collaborative development of geographically dispersed teams or for procurement of a good or service related to the embedded system. Moreover, it will be understood that some of the functions of a web-based central service may be emulated using e-mail between individual computers or network servers. As one example, an embedded system designer may send a link to a data file of a virtual prototype stored in their network server to a vendor.

Moreover, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a computer system having a graphical interface (GUI) and a design language for forming a finite state machine (FSM) representation of a hardware partition of an embedded system, a method of designing an embedded system, the method comprising:
    forming a library of processor cores including an instruction set accurate simulator for each of the processor cores in the library;
    responsive to a first sequence of user commands, selecting at least one of the processor cores from the library as a target processor core;
    responsive to a second sequence of user commands, forming a virtual embedded system including an instruction set accurate simulator of a target processor core and coupling read, write, and interrupt signals of the instruction set accurate simulator with an FSM simulation of at least one hardware element, wherein generating said FSM simulation comprises applying a design language having at least one graphical symbol and adapted to form a finite state machine representation of electronic hardware, each graphical symbol of the design language having a graphical portion and a user-definable textual portion defining the behavior of the graphical symbol;
    responsive to a request from the user, loading an executable binary file of a software application compiled for the target processor;
    executing a simulation of the virtual embedded system running the software application; and
    responsive to a user request, displaying on the GUI a graphical representation of the execution of the software application on the virtual embedded system that includes a software debugger interface to debug the loaded software and a virtual test-bench associated with the GUI and adapted to interact with the simulation, wherein the virtual test-bench is created using a test-bench builder for generating a graphical representation of at least one interactive test-bench and for selecting signals or variables associated with the FSM and to be coupled to a graphical representation of a user interface for each interactive test-bench, to emulate user input to and device output from the virtual embedded system.

2. The method of claim 1, wherein the design language includes a plurality of graphical symbols with each graphical symbol having a graphical semantic portion and a textual semantic portion.

3. The method of claim 2, wherein the design language includes:
    a start object defining a starting point of the finite state machine at an initialization time, the start object having an output connector activated when the start object is initialized;
    a task object including a field for inputting computer code in the C language for defining a behavior of the task object and a connector port for coupling the task object to other objects;
    a state object for representing a state of the finite state machine;
    a decision object having an evaluation field for directing a flow of execution based on a result of an expression in the decision field;
    a signal-out object for sending a communication signal;
    a signal-in object for receiving a communication signal;
    a connector object for connecting control flow;
    a symbol object having at least one user-definable pin connector and containing a block or process object;
    a block object for describing the behavior of one or more processes; and
    a process object for representing a finite state machine process.

4. The method of claim 1, further comprising:
    storing the virtual embedded system as a design in a design repository coupled to a server; and
    providing access privileges to the design to a selected individual or group.

5. The method of claim 4, further comprising:
    responsive to a user command, providing access privileges to the design to a group of vendors.

6. The method of claim 5, wherein the design is accessible from an online bidding board.

7. The method of claim 5, wherein access privileges to the design are provided to a group of vendors selected by the user.

8. The method of claim 4, wherein the design is accessible by an embedded system design team.

9. The method of claim 4, further comprising a design manager application, the method further comprising:
    permitting one or more members of a design team to select edit privileges of at least one version of the design.

10. The method of claim 9, further comprising:
    permitting one or more members of the design team to load onto the design and execute a binary program executable of a software application compiled for the target processor core.

11. The method of claim 9, further comprising:
    providing version control and regulating editing access to maintain a consistent version of the design.

12. The method of claim 1, further comprising:
    storing a plurality of virtual embedded systems in a library; and responsive to a user request, providing the user a copy of one of the virtual embedded systems stored in the library.

13. The method of claim 2, wherein the graphical user interface is configured to permit a user to associate a breakpoint of execution with a graphical symbol, the method further comprising:
   responsive to a user input, associating a breakpoint of execution with a graphical symbol;
   receiving a request to debug software; and
   stopping the simulation responsive to a command flow of the FSM representation of the hardware element reaching the graphical symbol of the breakpoint of execution.

14. The method of claim 13, further comprising:
   responsive to a user request, single-stepping the simulation to sequential breakpoints of execution in the command flow of the FSM representation of hardware elements.

15. The method of claim 13, further comprising:
   responsive to a user request, single-stepping the simulation by a pre-selected number of time units.

16. A computer implemented method of embedded system design, the method comprising:
   selecting an instruction set accurate simulator of a target processor core;
   generating a virtual hardware component that is a finite state machine (FSM) representation of at least one hardware component, said generating comprising applying a design language having at least one graphical symbol and adapted to form an FSM representation of electronic hardware, each graphical symbol of the design language having a graphical portion and a user-definable textual portion defining the behavior of the graphical symbol;
   linking read, write, and interrupt signals of the instruction set accurate simulator of the target processor core with corresponding signals of the at least one virtual hardware component to form a virtual embedded system;
   creating a virtual test bench using a test bench builder for generating a graphical representation of at least one interactive test bench and for selecting signals or variables to be coupled to a graphical representation of a user interface for each interactive test bench;
   coupling the virtual test bench to at least one signal or variable of the virtual embedded system to simulate a human/machine interface; and
   coupling a software debugger to the virtual embedded system that is configured to load and run on the virtual embedded system at least one binary program executable of a software application compiled for the target processor core.

17. The method of claim 16, further comprising:
   selecting the target processor core simulator from a library having a plurality of instruction set accurate simulators for a plurality of processor cores.

18. The method of claim 16, further comprising:
   selecting the virtual hardware component from a library of virtual hardware components.

19. The method of claim 18, further comprising:
   modifying the virtual hardware component.

20. The method of claim 16, further comprising:
   loading onto the software debugger benchmark software in an evaluation phase of an embedded system project and running a simulation of the virtual embedded system executing the benchmark software.

21. The method of claim 16, further comprising:
   loading binary program executables of development software compiled for the target processor core in a development phase of an embedded systems project and running a simulation of the virtual embedded system executing the binary program executables.

22. The method of claim 21, further comprising:
   debugging the development software using a software debugger.

23. The method of claim 16, further comprising:
   storing the virtual embedded system in a design repository as a design having at least one executable file.

24. The method of claim 23, wherein the design is stored on a server accessible to a user-group.

25. The method of claim 24, wherein the user-group is a geographically distributed embedded system project team.

26. The method of claim 23, further comprising:
   providing a version of the design to a vendor offering a good or service related to the virtual embedded system.

27. The method of claim 26, wherein the design is stored on a server and a vendor is provided access to the design via a network connection.

28. A method of designing an embedded system, the method comprising:
   defining a system architecture of the embedded system;
   generating a finite state machine (FSM) representation of at least one hardware element, said generating comprising applying a design language having at least one graphical symbol and adapted to form a finite state machine representation of electronic hardware, each graphical symbol of the design language having a graphical portion and a user-definable textual portion defining the behavior of the graphical symbol;
   designing a virtual prototype of the embedded system having an instruction set accurate simulator of a processor core and coupling read, write, and interrupt signals of the instruction set accurate simulator with said FSM representation of at least one hardware element;
   creating a virtual test bench having a graphical representation of a human/machine interface for interacting with the embedded system using a test bench builder for generating a graphical representation of at least one interactive test bench and for selecting signals or variables associated with the FSM and to be coupled to a graphical representation of a user interface for each interactive test bench;
   coupling the virtual prototype to a software debugger having a debugging interface and to the virtual test bench;
   developing at least one software application for the processor core;
   loading binary program code compiled from the at least one software application for execution on the virtual prototype; and
   initiating a simulation of the virtual prototype executing the at least one software application.

29. The method of claim 28, further comprising:
   developing a hardware implementation using the virtual prototype as a functional specification describing a hardware partition.

30. The method of claim 29, further comprising:
   evaluating the operation of the embedded system executing the at least one software application; and
   responsive to a result of the evaluation, modifying a hardware or software component of the embedded system.

31. The method of claim 28, wherein the step of defining the system architecture comprises:
   selecting at least one embedded system component for evaluation;
   forming a virtual evaluation platform including the selected embedded system component;

loading a benchmark software application for execution on the virtual evaluation platform; and evaluating performance of the virtual evaluation platform executing the benchmark software application.

32. A method of providing information to potential suppliers for procuring a good or service associated with an embedded system, the method comprising:

defining a system architecture of the embedded system;

designing a virtual prototype of the embedded system, the virtual prototype having an instruction set accurate simulator of a target processor core and a finite state machine (FSM) representation of a hardware element within the embedded system, the FSM representation configured to couple memory read/write requests and interrupt signals with the instruction set accurate simulator of the target processor core, wherein generating said FSM representation comprises applying a design language having at least one graphical symbol and adapted to form a finite state machine representation of electronic hardware, each graphical symbol of the design language having a graphical portion and a user-definable textual portion defining the behavior of the graphical symbol;

creating a virtual test bench having a graphical representation of a human/machine interface for interacting with the embedded system using a test bench builder for generating a graphical representation of at least one interactive test bench and for selecting signals or variables associated with the FSM and to be coupled to a graphical representation of a user interface for each interactive test bench;

coupling the virtual prototype to the virtual test bench for emulating user interaction with the embedded system;

publishing the virtual prototype as a functional specification from which a vendor may initiate a simulation of the operation of the embedded system.

33. The method of claim 32, wherein the virtual prototype is stored on a computer readable medium and publishing the virtual prototype comprises sending the computer readable medium to a vendor.

34. The method of claim 32, wherein the virtual prototype is published by posting the virtual prototype as a design hosted on a database coupled to a network server.

35. The method of claim 34, wherein the virtual prototype is published to a bulletin board of the database.

36. The method of claim 35, wherein the bulletin board is a bidding board.

37. The method of claim 34, wherein the virtual prototype is published to a database having a matching engine.

38. A computer-implemented method for a vendor to acquire information for the procurement of a good or service related to an embedded system project, the method comprising:

accessing a database of virtual prototypes of embedded systems, each of the virtual prototypes having a processor simulator, a finite state machine (FSM) representation of hardware peripherals, and a virtual test bench emulating a human/machine interface for interacting with a simulation of the operation of the virtual prototype, wherein generating said FSM representation comprises applying a design language having at least one graphical symbol and adapted to form a finite state machine representation of electronic hardware, each graphical symbol of the design language having a graphical portion and a user-definable textual portion defining the behavior of the graphical symbol, and wherein the virtual test bench is created using a test bench builder for generating a graphical representation of at least one interactive test bench and for selecting signals or variables associated with the FSM and to be coupled to a graphical representation of a user interface for the interactive test bench;

instantiating an instance of one of the virtual prototypes; and evaluating the virtual prototype.

39. The method of claim 38, further comprising:

submitting a quote for a good or service related to the embedded system simulated by the virtual prototype.

40. The method of claim 38, wherein the virtual prototype is configured to show a parts list.

41. The method of claim 38, wherein the virtual prototype is configured to show a component net list.

42. The method of claim 38, wherein the database of virtual prototypes is hosted on a network server accessible by a client computer.

43. The method of claim 29, further comprising the step of interacting at runtime with the virtual prototype to simulate an application of the embedded system.

* * * * *

UNITED STATES PATENT AND TRADEMARK OFFICE
CERTIFICATE OF CORRECTION

PATENT NO. : 7,613,599 B2　　　　　　　　　　　　　　　　　　　　　　　　　　　Page 1 of 1
APPLICATION NO. : 09/872435
DATED : November 3, 2009
INVENTOR(S) : Stephen L. Bade et al.

It is certified that error appears in the above-identified patent and that said Letters Patent is hereby corrected as shown below:

Item (75) Inventors:

Amend "Stephen L Bade" to -- Stephen L. Bade --,

"Marcelo E Montoreano" to -- Marcelo E. Montoreano --,

"Filip C Theon" to -- Filip C. Thoen --, and

"Dean C Wills" to -- Dean C. Wills --.

Column 48, line 42 claim 43, amend "29" to -- 28 --.

Signed and Sealed this

Twentieth Day of July, 2010

David J. Kappos
*Director of the United States Patent and Trademark Office*